US012761135B2

(12) United States Patent
Mage

(10) Patent No.: US 12,761,135 B2
(45) Date of Patent: Oct. 13, 2026

(54) METHODS AND SYSTEMS FOR ASSESSING THE SUITABILITY OF A FLUOROCHROME PANEL FOR USE IN GENERATING FLOW CYTOMETER DATA

(71) Applicant: Becton, Dickinson and Company, Franklin Lakes, NJ (US)

(72) Inventor: Peter Mage, San Jose, CA (US)

(73) Assignee: Augusta SpinCo Corporation, Milford, MA (US)

( * ) Notice: Subject to any disclaimer, the term of this patent is extended or adjusted under 35 U.S.C. 154(b) by 808 days.

(21) Appl. No.: 18/201,679

(22) Filed: May 24, 2023

(65) Prior Publication Data

US 2023/0393049 A1 Dec. 7, 2023

Related U.S. Application Data

(60) Provisional application No. 63/347,848, filed on Jun. 1, 2022.

(51) Int. Cl.
*G01N 15/14* (2024.01)
*G01N 15/1434* (2024.01)
*G01N 15/10* (2006.01)

(52) U.S. Cl.
CPC . *G01N 15/1434* (2013.01); *G01N 2015/1026* (2024.01)

(58) Field of Classification Search
None
See application file for complete search history.

(56) References Cited

U.S. PATENT DOCUMENTS

| | | | |
|---|---|---|---|
| 4,704,891 | A | 11/1987 | Recktenwald et al. |
| 4,777,133 | A | 10/1988 | Picciolo et al. |
| 4,845,653 | A | 7/1989 | Conrad et al. |

(Continued)

FOREIGN PATENT DOCUMENTS

| | | |
|---|---|---|
| AU | 2014228537 | 8/2015 |
| AU | 2018206722 | 8/2018 |

(Continued)

OTHER PUBLICATIONS

International Search Report for International Application No. PCT/US2015/014681 dated Apr. 15, 2015, 7 pages.

(Continued)

*Primary Examiner* — Brian R Gordon

(74) *Attorney, Agent, or Firm* — Bret E. Field; Bozicevic, Field & Francis LLP

(57) ABSTRACT

Methods of assessing the suitability of a fluorochrome panel for use in generating flow cytometer data are provided. Methods of interest include obtaining a fluorochrome panel, an instrument identifier and a spectral matrix associated with the fluorochrome panel and the instrument identifier. The subject methods also include calculating an inverse matrix from the obtained spectral matrix, and identifying fluorochromes in the fluorochrome panel that would be associated with variance in flow cytometer data generated using the fluorochrome panel by analyzing the calculated inverse matrix to assess the suitability of the fluorochrome panel for use in generating the flow cytometer data. Systems and non-transitory computer readable storage media for practicing the invention are also provided.

23 Claims, 54 Drawing Sheets

(56) References Cited

U.S. PATENT DOCUMENTS

| | | | |
|---|---|---|---|
| 4,857,451 A | 8/1989 | Schwartz et al. | |
| 5,093,234 A | 3/1992 | Schwartz et al. | |
| 5,599,932 A | 2/1997 | Bieniarz et al. | |
| 5,627,040 A | 5/1997 | Bierre et al. | |
| 5,658,751 A | 8/1997 | Yue et al. | |
| 5,739,000 A | 4/1998 | Bierre et al. | |
| 5,784,162 A | 7/1998 | Cabib et al. | |
| 5,795,727 A | 8/1998 | Bierre et al. | |
| 5,962,238 A | 10/1999 | Sizto et al. | |
| 6,014,904 A | 1/2000 | Lock | |
| 6,897,954 B2 | 5/2005 | Bishop et al. | |
| 6,944,338 B2 | 9/2005 | Lock et al. | |
| 7,674,598 B2 | 3/2010 | Paul et al. | |
| 7,932,503 B2 | 4/2011 | Parks et al. | |
| 8,116,984 B2 | 2/2012 | Davis et al. | |
| 8,214,323 B2 | 7/2012 | Zigon | |
| 8,309,306 B2 | 11/2012 | Nolan et al. | |
| 8,364,418 B2 | 1/2013 | Davis et al. | |
| 8,380,541 B1 | 2/2013 | Homes | |
| 8,538,774 B2 | 9/2013 | Michelson et al. | |
| 8,731,844 B2 | 5/2014 | Herzenberg et al. | |
| 10,215,685 B2 | 2/2019 | Zigon et al. | |
| 10,235,429 B2 | 3/2019 | Meehan et al. | |
| 10,502,678 B2 | 12/2019 | Kapinsky | |
| 10,876,953 B2 | 12/2020 | Ren | |
| 12,347,525 B2 | 7/2025 | Nakagawa | |
| 2004/0119974 A1 | 6/2004 | Bishop et al. | |
| 2008/0240988 A1 | 10/2008 | Wakamiya et al. | |
| 2009/0142231 A1 | 6/2009 | Shibuya et al. | |
| 2010/0228491 A1 | 9/2010 | Gutierrez | |
| 2010/0256943 A1 | 10/2010 | Donnenberg et al. | |
| 2010/0302536 A1 | 12/2010 | Ball et al. | |
| 2011/0204259 A1 | 8/2011 | Rogers et al. | |
| 2011/0282870 A1 | 11/2011 | Herzenberg et al. | |
| 2012/0245889 A1 | 9/2012 | Zhu et al. | |
| 2013/0078621 A1 | 3/2013 | Nolan et al. | |
| 2013/0322825 A1 | 12/2013 | Sekino et al. | |
| 2014/0309782 A1 | 10/2014 | Sharpe et al. | |
| 2015/0134315 A1 | 5/2015 | Sarmiento | |
| 2015/0140577 A1 | 5/2015 | Li et al. | |
| 2016/0025621 A1 | 1/2016 | Kapinsky | |
| 2016/0123980 A1 | 5/2016 | Evans et al. | |
| 2018/0231452 A1 | 8/2018 | Ren et al. | |
| 2019/0383725 A1 | 12/2019 | Petersen | |
| 2020/0132594 A1 | 4/2020 | Kapinsky | |
| 2021/0239592 A1 | 8/2021 | Halpert | |
| 2021/0263019 A1 | 8/2021 | Martin | |
| 2021/0349004 A1 | 11/2021 | Halpert | |
| 2021/0404939 A1 | 12/2021 | Hage et al. | |
| 2022/0082488 A1* | 3/2022 | Jaimes | G01N 15/0205 |
| 2022/0082489 A1* | 3/2022 | Jaimes | G01N 15/1434 |
| 2022/0108774 A1 | 4/2022 | Seay | |
| 2022/0381671 A1 | 12/2022 | Nishimaki | |
| 2023/0243735 A1* | 8/2023 | Mage | G01N 15/1429 436/172 |
| 2024/0027447 A1 | 1/2024 | Edinger | |
| 2024/0027457 A1* | 1/2024 | Chang | G01N 33/56972 |
| 2024/0133791 A1 | 4/2024 | Bai | |
| 2024/0337581 A1* | 10/2024 | Park | G01N 33/52 |

FOREIGN PATENT DOCUMENTS

| | | |
|---|---|---|
| CN | 108474728 A | 8/2018 |
| CN | 110579435 A | 12/2019 |
| CN | 111537426 A | 8/2020 |
| EP | 1431745 | 6/2004 |
| EP | 0774113 B1 | 9/2005 |
| EP | 2711713 A | 4/2012 |
| EP | 2843418 A | 3/2015 |
| EP | 2347352 A | 11/2019 |
| EP | 2972213 A | 5/2020 |
| EP | 4141419 B1 | 2/2025 |
| FR | 2994740 A1 | 3/2015 |
| JP | 2003083894 A | 3/2003 |
| JP | 2004163312 A | 6/2004 |
| JP | 2009109218 A | 5/2009 |
| JP | 2010156679 A | 7/2010 |
| JP | 2012052985 A | 3/2012 |
| JP | 2016517000 A | 6/2016 |
| KR | 20110058715 A | 6/2011 |
| WO | WO2013134491 A1 | 9/2013 |
| WO | WO2014029743 A1 | 2/2014 |
| WO | WO2014063247 A1 | 5/2014 |
| WO | WO2014144826 | 9/2014 |
| WO | WO2014188170 A1 | 11/2014 |
| WO | WO2019245709 | 12/2019 |
| WO | WO2019245709 A1 | 12/2019 |
| WO | WO2022019016 A1 | 1/2022 |
| WO | WO2022049913 A1 | 3/2022 |
| WO | WO2023235203 A1 | 12/2023 |

OTHER PUBLICATIONS

International Search Report and Written Opinion mailed Oct. 20, 2016, received in PCT/US2016/042083, 8 pages.

Baumgarth, "A practical approach to multicolor flow cytometry for immunophenotyping", J Immunol Methods. Sep. 21, 2000 ;243(1-2):77-97.

Matthias, "Selectivity in multicomponent analysis", Analytica Chimica Acta, vol. 180, 1986, pp. 445-456.

Bauer, et al. (eds.), Clinical Flow Cytometry: Principles and Applications, Williams & Wilkins (1993).

Biosciences, B.D. "An Introduction to Compensation for Multicolor Assays on Digital Flow Cytometers." BDbiosciences.com (2009).

Biosciences, B.D. "Introduction to Flow Cytometry: A learning guide." Manual Pati 1 (2000).

Jaroszeski, et al. (eds.), Flow Cytometry Protocols, Methods in Molecular Biology No. 91, Humana Press (1997).

Lan Day, et al. (eds.), Clinical Flow Cytometry, Annals of the New York Academy of Sciences vol. 677 (1993).

Ormerod (ed.), Flow Cytometry: A Practical Approach, Oxford Univ. Press (1997).

Pawley (ed.), Handbook of Biological Confocal Microscopy, 2nd Edition, Plenum Press (1989).

Shapiro, Howard M. Practical flow cytometry, 4th ed. John Wiley & Sons, 2003.

Ferrer-Font, et al., "Panel Design and Optimization for High-Dimensional Immunophenotyping Assays Using Spectral Flow Cytometry", Current Protocols in Cytometry, 2020, vol. 92, No. 1, Article No. e70, pp. 1-25.

BD Biosciences, "BD Horizon™ Guided Panel Solution (GPS) tool", https://igxorigin.bdbiosciences.com/en-eu/applications/research-applications/multicolor-flow-cytometry/product-selection-tools/horizon-gps-tool, Accessed Jan. 9, 2022, 4 pages.

Chromacyte, "Flow Cytometry Antibodies & Reagents—Antibody Search", www.chromocyte.com, Accessed on Jan. 9, 2022, 2 Pages.

Thermofisher Scientific, "Flow Cytometry Panel Builder", https://www.thermofisher.com/us/en/home/life-science/cell-analysis/flow-cytometry/antibodies-for-flow-cytometry/flow-cytometry-panel-builder.html, Accessed Jan. 10, 2022, 4 Pages.

FluoroFinder, "FluoroFinder Experiment Design Platform", https://fluorofinder.com, Accessed Jan. 9, 2022, 10 Pages.

Chattopadhyay, et al. "Immune monitoring for immuno-oncology applications", The Journal of Immunology, vol. 204, Issue 1, 2020, 5 Pages.

Biolegend, "Multicolor Panel Selector", https://www.biolegend.com/en-us/panel-selector, Accessed Jan. 10, 2022, 3 Pages.

Chattopadhyay, "The Colorful Future of Cell Analysis by Flow Cytometry", Discov Med . . . Oct. 2004;4(23):255-62.

Nguyen, Richard, et al. "Quantifying spillover spreading for comparing instrument performance and aiding in multicolor panel design." Cytometry Part A 83.3 (2013): 306-315.

Pyne, Saumyadipta, et al. "Automated high-dimensional flow cytometric data analysis." Proceedings of the National Academy of Sciences 106.21 (2009): 8519-8524.

(56) References Cited

OTHER PUBLICATIONS

Chattopadhyay, "Color Wheel: An Automated Tool for Instrument Setup and Panel Design in Polychromatic Flow Cytometry", NYU Langone Health, NYU School of Medicine, 2018, 34 pages.

Thermo Fisher Scientific—NI: "Spectral 1-15 Flow Cytometry Fundamentals", Jun. 22, 2019 (Jun. 22, 2019), XP055721454, Retrieved from the Internet:URL:https://www.thermofisher.com/nl/en/home/life-science/cell-analysis/flow-cytometry/flow-cytometry-learning-center/flow-cytometry-resource-library/flow-cytometry-methods/spectral-flow-cytometry-fundamentals.html [retrieved on Mar. 27, 2026].

ISAC, "Data File Standard for Flow Cytometry—Version 4.0", 2016, 69 Pages.

Thermo Fisher Scientific, "Flow Cytometry Panel Builder", www.thermofisher.com/us/en/home.html, Downloaded May 3, 2023, 3 pages.

Thermo Fisher Scientific, "Flow Cytometry Panel Builder", www.thermofisher.com/us/en/home.html, Downloaded May 3, 2023, 4 pages.

Panelbuilder, http://angularjs.org, Downloaded Oct. 28, 2021, 2429 Pages.

Fontana, "Individual-level trait diversity predicts phytoplankton community properties better than species richness or evenness", The Isme Journal Nature Publishing Group, vol. 12, No. 2, 2017, pp. 356-366.

Kalivas, "Assessing Spectral Orthogonality."Applied Spectroscopy Reviews, vol. 25., No. 03 / 04.,1989, pp. 229-259.

* cited by examiner

| | | | | | |
|---|---|---|---|---|---|
| 1- BUV395 | 8- BUV421 | 14- BV605 | 21- BB630 | 28-RY586 | 35- APC |
| 2- BUV496 | 9- VioBlue | 15- BV650 | 22-PerCP | 29-PE-CF594 | 36-SparkNIR685 |
| 3- BUV563 | 10- BV480 | 16- BV711 | 23-BB660 | 30-PE-Cy5 | 37- R718 |
| 4- BUV615 | 11- BV510 | 17- BV750 | 24-BB700 | 31-PE-Fire700 | 38- APC-Cy7 |
| 5- BUV661 | 12-Amethyst Orange | 18- BV786 | 25-BB755 | 32–NovaFluorY730 | 39-APC-Fire810 |
| 6- BUV737 | | 19- BB515 | 26-RB780 | 33-PE-Cy7 | 40-Unstained1 |
| 7- BUV805 | 13- BV570 | 20-cFluorB532 | 27- PE | 34-VioR667 | |

FIG. 5D

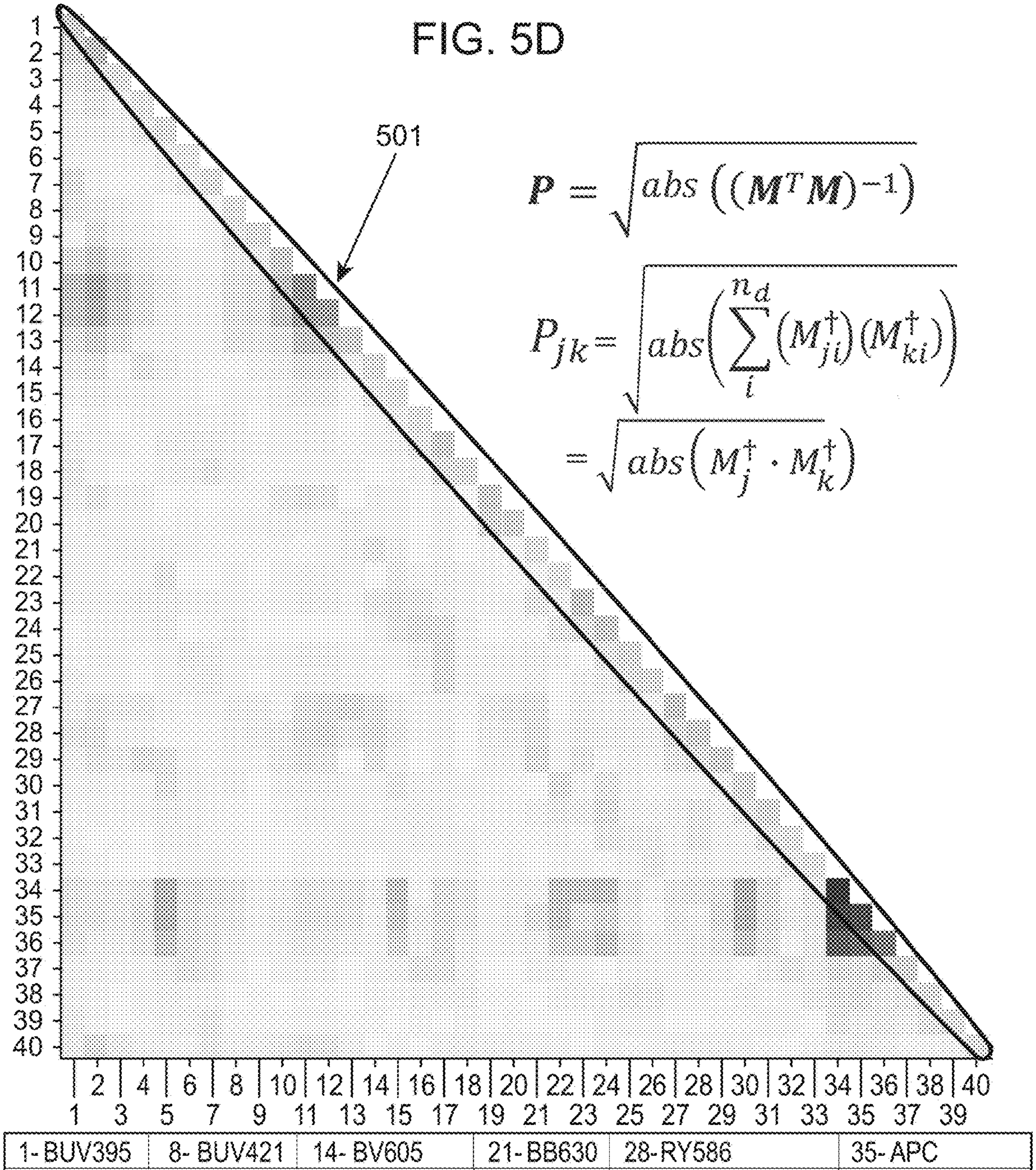

$$P = \sqrt{abs\left(\left(M^T M\right)^{-1}\right)}$$

$$P_{jk} = \sqrt{abs\left(\sum_{i}^{n_d}\left(M_{ji}^{\dagger}\right)\left(M_{ki}^{\dagger}\right)\right)} = \sqrt{abs\left(M_j^{\dagger}\cdot M_k^{\dagger}\right)}$$

| | | | | | |
|---|---|---|---|---|---|
| 1- BUV395 | 8- BUV421 | 14- BV605 | 21- BB630 | 28-RY586 | 35- APC |
| 2- BUV496 | 9- VioBlue | 15-BV650 | 22-PerCP | 29-PE-CF594 | 36-SparkNIR685 |
| 3- BUV563 | 10- BV480 | 16-BV711 | 23-BB660 | 30-PE-Cy5 | 37- R718 |
| 4- BUV615 | 11- BV510 | 17-BV750 | 24-BB700 | 31-PE-Fire700 | 38-APC-Cy7 |
| 5- BUV661 | 12-Amethyst Orange | 18-BV786 | 25-BB755 | 32-NovaFluorY730 | 39-APC-Fire810 |
| 6- BUV737 | | 19-BB515 | 26-RB780 | 33-PE-Cy7 | 40-Unstained1 |
| 7- BUV805 | 13- BV570 | 20-cFluorB532 | 27- PE | 34-VioR667 | |

| | | | | | |
|---|---|---|---|---|---|
| 1- BUV395 | 8- BUV421 | 14- BV605 | 21- BB630 | 28-RY586 | 35- APC |
| 2- BUV496 | 9- VioBlue | 15- BV650 | 22-PerCP | 29-PE-CF594 | 36-SparkNIR685 |
| 3- BUV563 | 10- BV480 | 16- BV711 | 23-BB660 | 30-PE-Cy5 | 37- R718 |
| 4- BUV615 | 11- BV510 | 17-BV750 | 24-BB700 | 31-PE-Fire700 | 38- APC-Cy7 |
| 5- BUV661 | 12-Amethyst Orange | 18- BV786 | 25-BB755 | 32-NovaFluorY730 | 39-APC-Fire810 |
| 6- BUV737 | | 19- BB515 | 26-RB780 | 33-PE-Cy7 | 40-Unstained1 |
| 7- BUV805 | 13- BV570 | 20-cFluorB532 | 27- PE | 34-VioR667 | |

To FIG. 7B

| | | | | | |
|---|---|---|---|---|---|
| 1- BUV395 | 8- BUV421 | 14- BV605 | 21- BB630 | 28-RY586 | 35- APC |
| 2- BUV496 | 9- VioBlue | 15- BV650 | 22- PerCP | 29-PE-CF594 | 36-SparkNIR685 |
| 3- BUV563 | 10- BV480 | 16- BV711 | 23- BB660 | 30-PE-Cy5 | 37- R718 |
| 4- BUV615 | 11- BV510 | 17- BV750 | 24- BB700 | 31-PE-Fire700 | 38- APC-Cy7 |
| 5- BUV661 | 12-Amethyst Orange | 18- BV786 | 25- BB755 | 32–NovaFluorY730 | 39-APC-Fire810 |
| 6- BUV737 | | 19- BB515 | 26- RB780 | 33-PE-Cy7 | 40-Unstained1 |
| 7- BUV805 | 13- BV570 | 20-cFluorB532 | 27- PE | 34-VioR667 | |

| | | | | | |
|---|---|---|---|---|---|
| 1- BUV395 | 8- BUV421 | 14- BV605 | 21- BB630 | 28-RY586 | 35- APC |
| 2- BUV496 | 9- VioBlue | 15- BV650 | 22-PerCP | 29-PE-CF594 | 36-SparkNIR685 |
| 3- BUV563 | 10- BV480 | 16-BV711 | 23-BB660 | 30-PE-Cy5 | 37- R718 |
| 4- BUV615 | 11- BV510 | 17-BV750 | 24-BB700 | 31-PE-Fire700 | 38-APC-Cy7 |
| 5- BUV661 | 12-Amethyst Orange | 18-BV786 | 25-BB755 | 32-NovaFluorY730 | 39-APC-Fire810 |
| 6- BUV737 | | 19-BB515 | 26-RB780 | 33-PE-Cy7 | 40-Unstained1 |
| 7- BUV805 | 13- BV570 | 20-cFluorB532 | 27- PE | 34-VioR667 | |

FIG. 7D
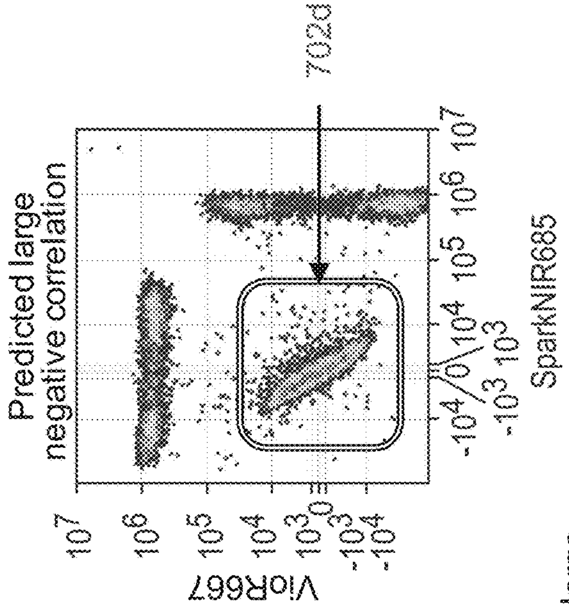
FIG. 7C
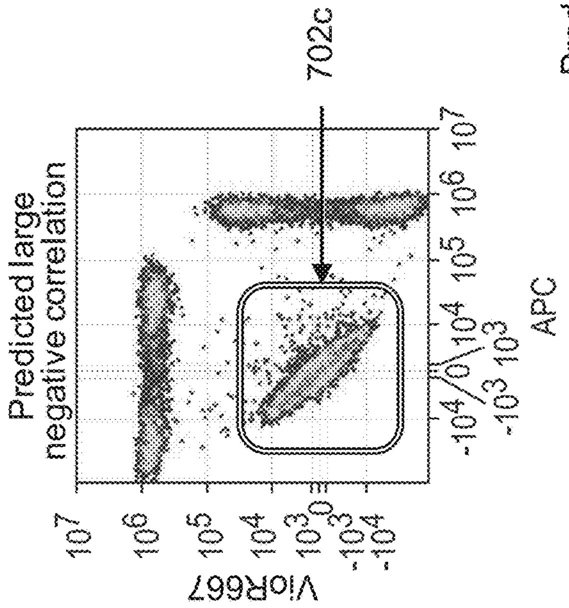
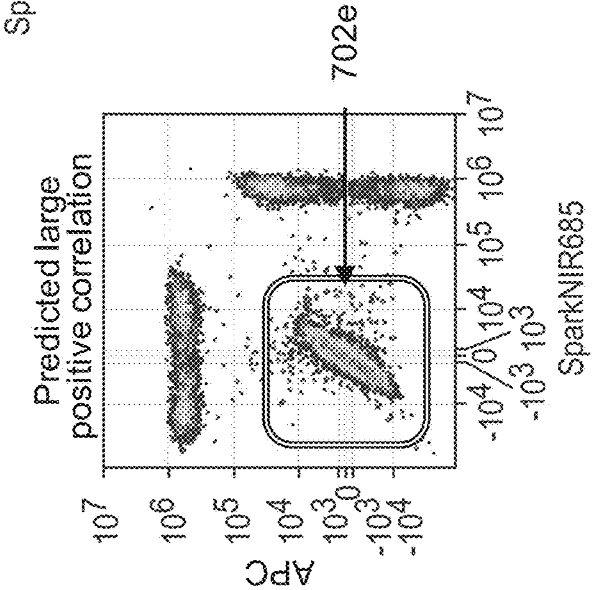
FIG. 7E

Pair + AF only

SparkNIR685 / APC

Pair + AF only

SparkNIR685 / VioR667

Pair + AF only

APC / VioR667

39C Panel A

SparkNIR685 / APC

39C Panel A

SparkNIR685 / VioR667

39C Panel A

APC / VioR667

39C Panel B

SparkNIR685 / APC

Pair + AF only

BB700 / PerCP

Pair + AF only

BB700 / PerCP-Cy5.5

Pair + AF only

PerCP / PerCP-Cy5.5

39C Panel A

BB700 / PerCP

39C Panel B

BB700 / PerCP

Full 39C panel

| | | | | | |
|---|---|---|---|---|---|
| 1-BUV395 | 8-BUV421 | 14-BV605 | 21-BB630 | 28-RY586 | 35-APC |
| 2-BUV496 | 9-VioBlue | 15-BV650 | 22-PerCP | 29-PE-CF594 | 36-SparkNIR685 |
| 3-BUV563 | 10-BV480 | 16-BV711 | 23-BB660 | 30-PE-Cy5 | 37-R718 |
| 4-BUV615 | 11-BV510 | 17-BV750 | 24-BB700 | 31-PE-Fire700 | 38-APC-Cy7 |
| 5-BUV661 | 12-Amethyst Orange | 18-BV786 | 25-BB755 | 32-NovaFluorY730 | 39-APC-Fire810 |
| 6-BUV737 | | 19-BB515 | 26-RB780 | 33-PE-Cy7 | 40-Unstained1 |
| 7-BUV805 | 13-BV570 | 20-cFluorB532 | 27-PE | 34-VioR667 | |

| | | | | | |
|---|---|---|---|---|---|
| 1- BUV395 | 8- BUV421 | 14- BV605 | 21- BB630 | 28-RY586 | 35- APC |
| 2- BUV496 | 9- VioBlue | 15- BV650 | 22-PerCP | 29-PE-CF594 | 36-SparkNIR685 |
| 3- BUV563 | 10- BV480 | 16- BV711 | 23-BB660 | 30-PE-Cy5 | 37- R718 |
| 4- BUV615 | 11- BV510 | 17- BV750 | 24-BB700 | 31-PE-Fire700 | 38- APC-Cy7 |
| 5- BUV661 | 12-Amethyst Orange | 18- BV786 | 25-BB755 | 32-NovaFluorY730 | 39-APC-Fire810 |
| 6- BUV737 | | 19- BB515 | 26-RB780 | 33-PE-Cy7 | 40-Unstained1 |
| 7- BUV805 | 13- BV570 | 20-cFluorB532 | 27- PE | 34-VioR667 | |

| | | | | | |
|---|---|---|---|---|---|
| 1- BUV395 | 8- BUV421 | 14- BV605 | 21- BB630 | 28-RY586 | 35- APC |
| 2- BUV496 | 9- VioBlue | 15- BV650 | 22-PerCP | 29-PE-CF594 | 36-SparkNIR685 |
| 3- BUV563 | 10- BV480 | 16- BV711 | 23-BB660 | 30-PE-Cy5 | 37- R718 |
| 4- BUV615 | 11- BV510 | 17- BV750 | 24-BB700 | 31-PE-Fire700 | 38- APC-Cy7 |
| 5- BUV661 | 12-Amethyst Orange | 18- BV786 | 25-BB755 | 32-NovaFluorY730 | 39- APC-Fire810 |
| 6- BUV737 | | 19- BB515 | 26-RB780 | 33-PE-Cy7 | 40- Unstained1 |
| 7- BUV805 | 13- BV570 | 20-cFluorB532 | 27- PE | 34-VioR667 | |

Panel A: CN = 69.8

| | | | | | |
|---|---|---|---|---|---|
| 1- BUV395 | 8- BUV421 | 14- BV605 | 21- BB630 | 28-RY586 | 35- APC |
| 2- BUV496 | 9- VioBlue | 15- BV650 | 22-PerCP | 29-PE-CF594 | 36-SparkNIR685 |
| 3- BUV563 | 10- BV480 | 16- BV711 | 23- BB660 | 30-PE-Cy5 | 37- R718 |
| 4- BUV615 | 11- BV510 | 17- BV750 | 24- BB700 | 31-PE-Fire700 | 38- APC-Cy7 |
| 5- BUV661 | 12-Amethyst Orange | 18- BV786 | 25- BB755 | 32-NovaFluorY730 | 39-APC-Fire810 |
| 6- BUV737 | | 19- BB515 | 26- RB780 | 33- PE-Cy7 | 40-Unstained1 |
| 7- BUV805 | 13- BV570 | 20-cFluorB532 | 27- PE | 34-VioR667 | |

| | | | | | |
|---|---|---|---|---|---|
| 1- BUV395 | 8- BUV421 | 14- BV605 | 21- BB630 | 28-RY586 | 35- APC |
| 2- BUV496 | 9- VioBlue | 15- BV650 | 22-PerCP | 29-PE-CF594 | 36-SparkNIR685 |
| 3- BUV563 | 10- BV480 | 16- BV711 | 23-BB660 | 30-PE-Cy5 | 37- R718 |
| 4- BUV615 | 11- BV510 | 17- BV750 | 24-BB700 | 31-PE-Fire700 | 38- APC-Cy7 |
| 5- BUV661 | 12-Amethyst Orange | 18- BV786 | 25-BB755 | 32-NovaFluorY730 | 39-APC-Fire810 |
| 6- BUV737 | | 19- BB515 | 26-RB780 | 33-PE-Cy7 | 40-Unstained1 |
| 7- BUV805 | 13- BV570 | 20-cFluorB532 | 27- PE | 34-VioR667 | |

Panel A: CN = 69.8

| | | | | | |
|---|---|---|---|---|---|
| 1- BUV395 | 8- BUV421 | 14- BV605 | 21- BB630 | 28-RY586 | 35- APC |
| 2- BUV496 | 9- VioBlue | 15- BV650 | 22-PerCP | 29-PE-CF594 | 36-SparkNIR685 |
| 3- BUV563 | 10- BV480 | 16- BV711 | 23-BB660 | 30-PE-Cy5 | 37- R718 |
| 4- BUV615 | 11- BV510 | 17- BV750 | 24-BB700 | 31-PE-Fire700 | 38- APC-Cy7 |
| 5- BUV661 | 12-Amethyst Orange | 18- BV786 | 25-BB755 | 32-NovaFluorY730 | 39-APC-Fire810 |
| 6- BUV737 | | 19- BB515 | 26-RB780 | 33-PE-Cy7 | 40-Unstained1 |
| 7- BUV805 | 13- BV570 | 20-cFluorB532 | 27- PE | 34-VioR667 | |

Panel B: CN = 67.0

| | | | | | |
|---|---|---|---|---|---|
| 1- BUV395 | 8- BUV421 | 14- BV605 | 21- BB630 | 28-RY586 | 35- APC |
| 2- BUV496 | 9- VioBlue | 15- BV650 | 22-PerCP | 29-PE-CF594 | 36-SparkNIR685 |
| 3- BUV563 | 10- BV480 | 16- BV711 | 23- BB660 | 30-PE-Cy5 | 37- R718 |
| 4- BUV615 | 11- BV510 | 17- BV750 | 24- BB700 | 31-PE-Fire700 | 38- APC-Cy7 |
| 5- BUV661 | 12-Amethyst Orange | 18- BV786 | 25- BB755 | 32-NovaFluorY730 | 39-APC-Fire810 |
| 6- BUV737 | | 19- BB515 | 26- RB780 | 33- PE-Cy7 | 40-Unstained1 |
| 7- BUV805 | 13- BV570 | 20-cFluorB532 | 27- PE | 34-VioR667 | |

Panel A: CN = 69.8

| | | | | | |
|---|---|---|---|---|---|
| 1- BUV395 | 8- BUV421 | 14- BV605 | 21- BB630 | 28-RY586 | 35- APC |
| 2- BUV496 | 9- VioBlue | 15- BV650 | 22-PerCP | 29-PE-CF594 | 36-SparkNIR685 |
| 3- BUV563 | 10- BV480 | 16- BV711 | 23- BB660 | 30-PE-Cy5 | 37- R718 |
| 4- BUV615 | 11- BV510 | 17- BV750 | 24- BB700 | 31-PE-Fire700 | 38- APC-Cy7 |
| 5- BUV661 | 12-Amethyst Orange | 18- BV786 | 25- BB755 | 32-NovaFluorY730 | 39- APC-Fire810 |
| 6- BUV737 | | 19- BB515 | 26- RB780 | 33- PE-Cy7 | 40- Unstained1 |
| 7- BUV805 | 13- BV570 | 20-cFluorB532 | 27- PE | 34- VioR667 | |

| | | | | | |
|---|---|---|---|---|---|
| 1- BUV395 | 8- BUV421 | 14- BV605 | 21- BB630 | 28-RY586 | 35- APC |
| 2- BUV496 | 9- VioBlue | 15- BV650 | 22-PerCP | 29-PE-CF594 | 36-SparkNIR685 |
| 3- BUV563 | 10- BV480 | 16- BV711 | 23- BB660 | 30-PE-Cy5 | 37- R718 |
| 4- BUV615 | 11- BV510 | 17- BV750 | 24- BB700 | 31-PE-Fire700 | 38- APC-Cy7 |
| 5- BUV661 | 12-Amethyst Orange | 18- BV786 | 25- BB755 | 32-NovaFluorY730 | 39- APC-Fire810 |
| 6- BUV737 | | 19- BB515 | 26- RB780 | 33-PE-Cy7 | 40-Unstained1 |
| 7- BUV805 | 13- BV570 | 20-cFluorB532 | 27- PE | 34-VioR667 | |

| | | | | | |
|---|---|---|---|---|---|
| 1- BUV395 | 8- BUV805 | 14- BV570 | 21-cFluorB532 | 28- PE | 35- APC |
| 2- BUV496 | 9- BUV421 | 15- BV605 | 22- BB630 | 29- RY586 | 36-SparkNIR685 |
| 3- BUV563 | 10- VioBlue | 16- BV650 | 23- PerCP | 30- PE-CF594 | 37- R718 |
| 4- BUV615 | 11- BV480 | 17- BV711 | 24- BB660 | 31- PE-Cy5 | 38- APC-Cy7 |
| 5- BUV661 | 12- BV510 | 18- BV750 | 25- BB700 | 32- PE-Fire700 | 39- APC-Fire810 |
| 6- BUV737 | 13- Amethyst Orange | 19- BV786 | 26- BB755 | 33- NovaFluorY730 | 40- Unstained1 |
| 7-QDot800 | | 20- BB515 | 27- RB780 | 34- PE-Cy7 | |

Panel A-2:
CN = 24.8

| | | | | | |
|---|---|---|---|---|---|
| 1-BUV395 | 8-QDot800 | 14-BV570 | 21-cFluorB532 | 28-PE | 35-APC |
| 2-BUV496 | 9-BUV805 | 15-BV605 | 22-BB630 | 29-RY586 | 36-SparkNIR685 |
| 3-BUV563 | 10-BUV421 | 16-BV650 | 23-PerCP | 30-PE-CF594 | 37-R718 |
| 4-BUV615 | 11-VioBlue | 17-BV711 | 24-BB660 | 31-PE-Cy5 | 38-APC-Cy7 |
| 5-BUV661 | 12-BV480 | 18-BV750 | 25-BB700 | 32-PE-Fire700 | 39-APC-Fire810 |
| 6-QDot705 | 13-Amethyst Orange | 19-BV786 | 26-BB755 | 33-NovaFluorY730 | 40-Unstained1 |
| 7-BUV737 | | 20-BB515 | 27-RB780 | 34-PE-Cy7 | |

| | | | | | |
|---|---|---|---|---|---|
| 1- BUV395 | 8- BUV421 | 14- BV605 | 21- BB630 | 28-RY586 | 35- APC |
| 2- BUV496 | 9- VioBlue | 15- BV650 | 22-PerCP | 29-PE-CF594 | 36-SparkNIR685 |
| 3- BUV563 | 10- BV480 | 16- BV711 | 23- BB660 | 30-PE-Cy5 | 37- R718 |
| 4- BUV615 | 11- BV510 | 17- BV750 | 24- BB700 | 31-PE-Fire700 | 38- APC-Cy7 |
| 5- BUV661 | 12-Amethyst Orange | 18- BV786 | 25- BB755 | 32-NovaFluorY730 | 39-APC-Fire810 |
| 6- BUV737 | | 19- BB515 | 26- RB780 | 33-PE-Cy7 | |
| 7- BUV805 | 13- BV570 | 20-cFluorB532 | 27- PE | 34-VioR667 | |

| | | | | | |
|---|---|---|---|---|---|
| 1- BUV395 | 8- BUV421 | 14- BV605 | 21- BB630 | 28-RY586 | 35- APC |
| 2- BUV496 | 9- VioBlue | 15-BV650 | 22-PerCP | 29-PE-CF594 | 36-SparkNIR685 |
| 3- BUV563 | 10- BV480 | 16-BV711 | 23-BB660 | 30-PE-Cy5 | 37- R718 |
| 4- BUV615 | 11- BV510 | 17-BV750 | 24-BB700 | 31-PE-Fire700 | 38- APC-Cy7 |
| 5- BUV661 | 12-Amethyst Orange | 18-BV786 | 25-BB755 | 32-NovaFluorY730 | 39-APC-Fire810 |
| 6- BUV737 | | 19-BB515 | 26-RB780 | 33-PE-Cy7 | |
| 7- BUV805 | 13- BV570 | 20-cFluorB532 | 27- PE | 34-VioR667 | |

1. VioR667, APC, SparkNIR685

2.BV480, BV510, Am.Orange

3. PE-Cy5 and VioR667, APC, SparkNIR685

4. BV480 and SparkNIR685

METHODS AND SYSTEMS FOR ASSESSING THE SUITABILITY OF A FLUOROCHROME PANEL FOR USE IN GENERATING FLOW CYTOMETER DATA

CROSS-REFERENCE TO RELATED APPLICATIONS

This application claims priority to the filing date of U.S. Provisional Patent Application Ser. No. 63/347,848 filed on Jun. 1, 2022; the disclosure of which application is incorporated herein by reference.

INTRODUCTION

The characterization of analytes in biological fluids has become an important part of biological research, medical diagnoses and assessments of overall health and wellness of a patient. Detecting analytes in biological fluids, such as human blood or blood derived products, can provide results that may play a role in determining a treatment protocol of a patient having a variety of disease conditions.

Particle analysis (e.g., flow cytometry) is a technique used to characterize and often times sort biological material, such as cells of a blood sample or particles of interest in another type of biological or chemical sample. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. To characterize the components of the flow stream, the flow stream is irradiated with light. Variations in the materials in the flow stream, such as morphologies or the presence of fluorescent labels, may cause variations in the observed light and these variations allow for characterization and separation. To characterize the components in the flow stream, light must impinge on the flow stream and be collected. Light sources in flow cytometers can vary and may include one or more broad spectrum lamps, light emitting diodes as well as single wavelength lasers. The light source is aligned with the flow stream and an optical response from the illuminated particles is collected and quantified.

The parameters measured using a particle analyzer typically include light at the excitation wavelength scattered by the particle in a narrow angle along a mostly forward direction, referred to as forward-scatter (FSC), the excitation light that is scattered by the particle in an orthogonal direction to the excitation laser, referred to as side-scatter (SSC), and the light emitted from fluorescent molecules or fluorescent dye. Different cell types can be identified by their light scatter characteristics and fluorescence emissions resulting from labeling various cell proteins or other constituents with fluorescent dye-labeled antibodies or other fluorescent probes. Forward-scattered light, side-scattered light and fluorescent light are detected by photodetectors that are positioned within the particle analyzer.

Where flow cytometry protocols include the detection of fluorescent light, experimental design generally involves the identification of a fluorochrome panel, i.e., a collection of fluorochromes to be used together in a given flow cytometric workflow. The process of fluorochrome panel design is necessary because biological resolution (i.e., the ability to distinguish between different components of interest within or between particles of interest) is directly impacted both by the measurement variance of the "raw" flow cytometry data and by the mathematical process of spectral compensation or unmixing. Both of these factors depend strongly on the choice of fluorochromes in the panel. First, measurement variance (i.e., noise) in flow cytometry arises from a wide range of sources including constant baseline measurement noise in the cytometer's electronics, optical shot noise that varies linearly with signal intensity, and multiplicative measurement noise arising from random fluctuations in the cytometer's lasers and fluidics which varies quadratically with signal intensity. The measurement noise itself depends on the choice of fluorochromes. For example, brighter fluorochromes will induce more shot noise than dim fluorochromes, and dim fluorochromes will have a smaller signal magnitude compared to the constant "noise floor" of the instrument's optics and electronics. Second, raw measurement noise in "detector space" (having a number of dimensions equal to the number of detectors in the instrument) propagates to the final biological data in "compensated space" or "unmixed space" (having a number of dimensions equal to the number of fluorochromes in the sample) through the mathematical process of fluorescence compensation (in conventional cytometers) or spectral unmixing (in full-spectrum cytometers). Variance in "unmixed space" is important because it is the space in which the final biological analysis of interest (e.g., gating, clustering, sorting, marker quantitation, etc.) is performed. This mathematical mapping of noise into biological space depends strongly on the spectral signatures of the fluorochromes themselves.

The presence of significant spectral overlap in a flow cytometry panel can lead to unacceptable levels of unmixed data variance (a.k.a. noise or spread), resulting in reduced unmixed signal-to-noise and the inability to resolve differences in biological marker expression in a multicolor flow cytometry experiment. Unmixing-dependent spread manifests in three primary ways: i) Increased unmixed variance on unstained particles, independent of fluorochrome expression (i.e., "negative spread"), ii) increased unmixed variance of one fluorochrome due to intensity-dependent photon noise arising from expression of one or more other fluorochromes (i.e., "spillover spreading"), and iii) increased covariance between unmixed fluorochromes (most noticeable as "tilted diagonal double negatives" on unstained populations). In a given panel, unmixing-dependent spread will tend to impact certain fluorochromes much more than other fluorochromes. As the number of fluorophores and total degree of spectral overlap in a panel increase, unmixing-dependent spread places an effective upper limit on the number of fluorochromes that may be simultaneously used in a single flow cytometry experiment. Practitioners must practice extreme care in designing their fluorochrome panels to avoid or mitigate this unmixing-dependent spread.

There are currently two metrics for predicting unmixing-dependent spread in a panel: cosine similarity (i.e., a "similarity index"), and a spectral matrix condition number (i.e., a "complexity score"). Cosine similarity is a pairwise metric that describes the spectral overlap between two fluorochromes. It can predict pairs of fluorochromes that are most likely susceptible to spillover spreading and can be used to "rule out" nearly-identical pairs that cannot be used together. The spectral matrix condition number is a single scalar metric describing the numerical stability with which the spectral unmixing problem can be solved for a given full panel of fluorochromes. It can roughly predict panels that are expected to have more unmixing-dependent spread or less unmixing-dependent spread.

Conventional flow cytometry, in which discrete photodetectors are dedicated to dye-specific fluorescence emission bands, places a hard limit on the number of fluorochromes that may be used simultaneously in a flow experiment: the number of fluorochromes may not exceed the number of fluorescence detection channels on the instrument. In contrast, full-spectrum flow cytometers use more detectors than fluorochromes by definition, and commercially available full-spectrum flow cytometers are available with over 180 fluorescence channels.

SUMMARY

The present inventors have realized that a practical limit exists for the number of fluorochromes that may be used simultaneously in a flow cytometry experiment. In spite of the commercial availability of nearly 100 distinct fluorochrome molecules for flow cytometry, panel sizes remain limited. This practical limit arises from the unavoidable spectral overlap and similarity of the fluorochromes used. In addition, it has been found that conventional methods for fluorochrome analysis are insufficient. For example, cosine similarity does not account for a fluorophore's performance in the context of a full panel, and it does not provide a quantitative prediction of the severity of unmixing spread. In addition, a condition number does not provide any indication of which fluorochromes are most affected by unmixing-dependent spread, and does not indicate which fluorochromes are the source of the problem. Unmixed spread may vary widely for the same fluorochrome in two different panels with nearly identical condition numbers. In general, one panel may have a high degree of unmixed spread "focused" on one or two fluorochromes, while another panel with a nearly identical condition number may have a lower degree of unmixed spread more evenly distributed across more fluorochromes in the panel. Condition numbers across panels with different sizes cannot be compared meaningfully. Alternative metrics such as the spillover-spreading matrix (SSM) and total spreading matrix (TSM) can be calculated empirically from measured data such as single-stained particles. However, collecting such data is labor intensive, and unmixing analysis must be repeated for each candidate panel, leading to high computational complexity that precludes rapid calculations (such as would be required for automated panel design algorithms)

In view of the above, it has been realized that there is a need for new panel performance metrics that both provide information about panel-dependent unmixing spread (like the condition number) and provide information about fluorochrome-specific performance and fluorochrome-fluorochrome interactions (like cosine similarity) while requiring minimal experimental overhead or computational complexity. Accordingly, methods and systems for assessing and selecting suitable fluorochrome panels are desirable. Embodiments of the present invention satisfy this desire.

Aspects of the invention include methods of assessing the suitability of a fluorochrome panel for use in generating flow cytometer data. Methods of interest include obtaining a fluorochrome panel, an instrument identifier and a spectral matrix associated with the fluorochrome panel and the instrument identifier. In addition, methods of the invention include calculating an inverse matrix from the obtained spectral matrix, and identifying fluorochromes in the fluorochrome panel that would be associated with variance in flow cytometer data generated using the fluorochrome panel by analyzing the calculated inverse matrix to assess the suitability of the fluorochrome panel for use in generating the flow cytometer data. In some embodiments, the fluorochromes in the fluorochrome panel that would be associated with variance in the flow cytometer data would contribute to variance in the flow cytometer data. In additional embodiments, the fluorochromes in the fluorochrome panel that would be associated with variance in the flow cytometer data would be affected by variance in the flow cytometer data. The inverse matrix may include, for example, a pseudoinverse matrix (e.g., a Moore-Penrose pseudoinverse matrix). In some instances, the inverse matrix is a gramian inverse matrix. Analyzing the calculated inverse matrix may include, in certain instances, deriving a quantitative metric (e.g., matrix norm, vector norm) from the inverse matrix. Embodiments of the subject methods also include optimizing the fluorochrome panel based on the assessment of the suitability of the fluorochrome panel for use in generating the flow cytometer data. In select instances, optimizing the fluorochrome panel comprises the use of a panel optimization algorithm. In certain versions, optimizing the fluorochrome panel comprises adjusting the fluorochromes in the fluorochrome panel and assessing the suitability of the adjusted fluorochrome panel for use in generating flow cytometer data. The flow cytometer data may, in embodiments, include a number of dimensions that is equal to the number of fluorochromes in the plurality of fluorochromes (e.g., it is spectrally unmixed or compensated). In some cases, the variance comprises noise in the flow cytometer data. Methods may further include producing a visualization of the assessed suitability of the fluorochrome panel for use in generating the flow cytometer data, such as where the visualization highlights fluorochromes in the fluorochrome panel that would be associated with variance in the flow cytometer data generated using the fluorochrome panel.

Aspects of the invention also include systems for practicing the subject methods (e.g. as described above). Systems of interest include a processor configured to obtain a fluorochrome panel, an instrument identifier, and a spectral matrix associated with the fluorochrome panel and the instrument identifier. The processor described herein is also configured to calculate an inverse matrix from the obtained spectral matrix, and identify fluorochromes in the fluorochrome panel that would be associated with variance in flow cytometer data generated using the fluorochrome panel by analyzing the calculated inverse matrix to assess the suitability of the fluorochrome panel for use in generating the flow cytometer data. The processor may additionally be configured to optimize the fluorochrome panel based on the assessment of the suitability of the fluorochrome panel for use in generating the flow cytometer data. In some embodiments, the processor is configured to produce a visualization of the assessed suitability of the fluorochrome panel for use in generating the flow cytometer data, for example, where the visualization highlights fluorochromes in the fluorochrome panel that would be associated with variance in the flow cytometer data generated using the fluorochrome panel. In some such embodiments, the system includes a display configured to portray the visualization.

Aspects of the invention additionally include a non-transitory computer readable storage medium comprising instructions stored thereon for assessing the suitability of a fluorochrome panel for use in generating flow cytometer data by a method of the invention (e.g., as described above). As discussed above, methods include obtaining a fluorochrome panel, an instrument identifier and a spectral matrix associated with the fluorochrome panel and the instrument identifier. Methods performed by the non-transitory computer readable storage medium also include identifying fluorochromes in the fluorochrome panel that would be associated with variance in flow cytometer data generated using the fluorochrome panel by analyzing the calculated inverse matrix to assess the suitability of the fluorochrome panel for use in generating the flow cytometer data.

BRIEF DESCRIPTION OF THE FIGURES

The invention may be best understood from the following detailed description when read in conjunction with the accompanying drawings. Included in the drawings are the following figures:

FIG. 5A-5D depict a panel hotspot matrix according to embodiments of the invention as well as an exemplary process for the calculation thereof.

FIG. 7A-7E depict a spread correlation matrix according to embodiments of the invention as well as an exemplary process for the calculation thereof.

DETAILED DESCRIPTION

Figure 1:
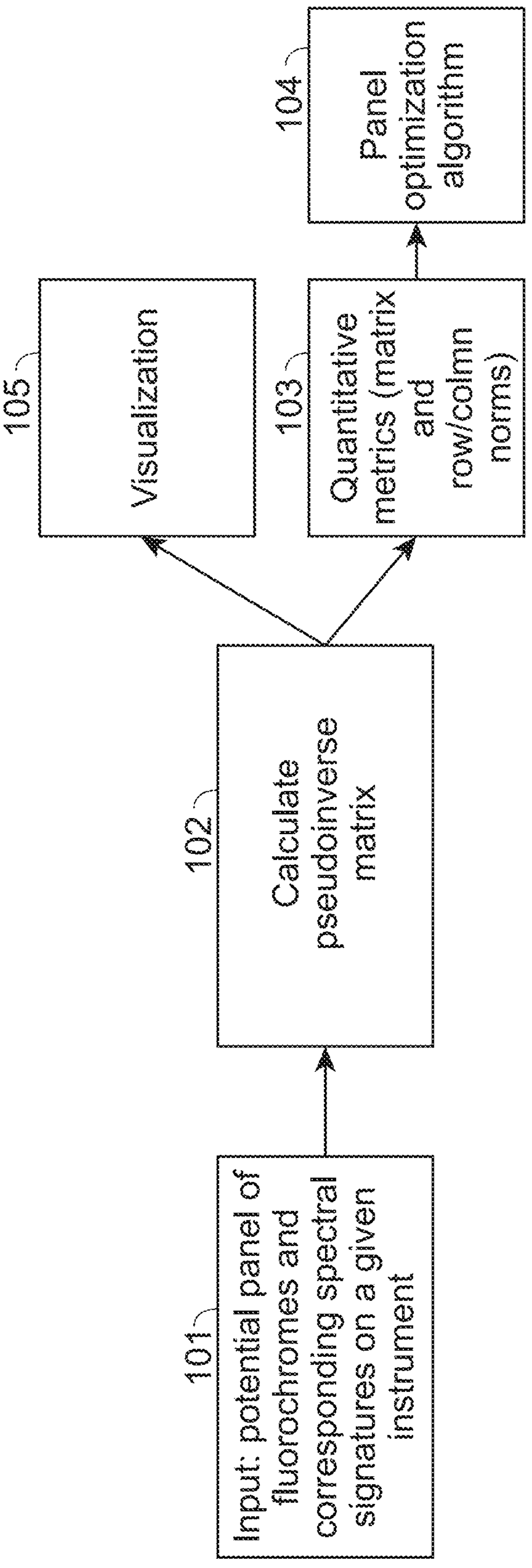
FIG. 1 depicts a flowchart for practicing a method for assessing a fluorochrome panel according to certain embodiments.

Methods of assessing the suitability of a fluorochrome panel for use in generating flow cytometer data are provided. Methods of interest include obtaining a fluorochrome panel, an instrument identifier and a spectral matrix associated with the fluorochrome panel and the instrument identifier. The subject methods also include calculating an inverse matrix from the obtained spectral matrix, and identifying fluorochromes in the fluorochrome panel that would be associated with variance in flow cytometer data generated using the fluorochrome panel by analyzing the calculated inverse matrix to assess the suitability of the fluorochrome panel for use in generating the flow cytometer data. Systems and non-transitory computer readable storage media for practicing the invention are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the system and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Methods of Assessing a Fluorochrome Panel

As discussed above, aspects of the invention include methods of assessing the suitability of a fluorochrome panel for use in generating flow cytometer data. Methods of interest include receiving a fluorochrome panel. As discussed herein, a "fluorochrome panel" refers to a set of different fluorescent molecular substances (i.e., dyes) that may be used to identify particles in a sample or particular moieties or components associated therewith. The "fluorochrome panel" discussed herein may also refer to a set of identifiers (e.g., digital identifiers) that uniquely refer to and are associated with particular fluorescent molecular substances. Such identifiers may be referred to herein as "fluorochrome identifiers". Distinct fluorochromes within the fluorochrome panel may differ with respect to properties such as absorption spectra, extinction coefficients, emission spectra, and quantum efficiency (i.e., the number of photons emitted for every photon absorbed), or combinations thereof. As such, different or distinct fluorochromes may differ from each other in terms of chemical composition and/or in terms of one or more properties of the dyes. For example, a given pair of fluorochromes may be considered distinct if they differ from each other in terms of excitation and/or emission maximum, where the magnitude of such difference is, in some instances, 5 nm or more, such 10 nm or more, including 15 nm or more, wherein in some instances the magnitude of the difference ranges from 5 to 400 nm, such as 10 to 200 nm, including 15 to 100 nm, such as 25 to 50 nm.

In certain cases, the method is performed without evaluating antigen data. By "antigen data" it is meant information regarding the antigens being evaluated in a given flow cytometric protocol for which a fluorochrome panel is desired. In other words, in contrast to methods that take into consideration the characteristics of the antigens to which fluorochromes will be associated and selects fluorochromes accordingly, embodiments of the subject methods are instead directed to providing a set of fluorochromes (i.e., a "color palette") that are suitable for use in the same flow cytometric protocol. In these cases, sample antigenicity is not considered during the identification and/or assessment of the fluorochrome panel. In certain versions, after the subject fluorochrome panel is identified, methods may optionally also include assigning the fluorochromes within the identified panel to particular antigens (e.g., via antibodies targeted to the relevant antigens, etc.).

Methods of the invention include also receiving an instrument identifier. By "instrument identifier" it is meant information or data that refers to a particular instrument (e.g., particle analyzer, flow cytometer). In certain cases, the instrument identified via the instrument identifier is a flow cytometer. Any convenient flow cytometer configured to analyze fluorescent particle-modulated light may be employed. In certain instances, flow cytometers of interest include those produced by BD Biosciences. Exemplary flow cytometers include BD Biosciences FACSCanto™ flow cytometer, BD Biosciences FACSCanto™ II flow cytometer, BD Accuri™ flow cytometer, BD Accuri™ 06 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSR-Fortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

Methods of the invention additionally include obtaining a spectral matrix associated with the fluorochrome panel and the instrument identifier. As described herein, a "spectral matrix" refers to a matrix containing information about the spectral properties of a set of fluorochromes. In embodiments, spectral matrices of interest include a set of spectral signatures associated with each fluorochrome identifier in a set of fluorochrome identifiers. A "spectral signature" refers to the characteristics of an individual fluorochrome's fluorescent spectrum represented as one or more numerical values. Two entities may be described as "associated with" one another if they are linked and/or related to one another in data space. Put another way, the spectral matrix associated with the instrument identifier (also referred to herein as the "input" or "original" spectral matrix) may represent the "palette" of possible fluorochromes or dyes that the subject fluorochrome panel may be selected from. In certain cases, a spectral matrix contains information pertinent to the spectral properties of each fluorophore on an instrument (e.g., flow cytometer) of interest. Such information may vary on different machines. For example, the differences with respect to the number and arrangement of lasers and detection channels among separate instruments may result in different spectral signatures associated with each instrument. Accordingly, embodiments of the subject methods employ a spectral matrix including spectral signatures that are specific to the particular instrument (or class/type of instrument) in which the fluorochromes in the assessed fluorochrome panel would hypothetically be employed. Due to differences between instruments, it is possible that the same fluorochrome panel may be more or less associated with variance in flow cytometer data if the fluorochromes were applied on two different types of machine (e.g., flow cytometer). Obtaining a spectral matrix associated with an instrument identifier allows a fluorochrome panel to be assessed in an instrument-specific context, thereby permitting a one of skill in the art practicing the subject methods to more reliably gain insight into the quality of flow cytometer data if fluorochromes in a given panel were used in a particular instrument.

In some embodiments, the spectral signatures are received from experimental data (i.e., the results of an experiment carried out on a particular instrument). In other cases, the spectral signatures are received from simulated data. The input spectral matrix may be associated with any suitable number of fluorochrome identifiers. In some embodiments, the number of fluorochrome identifiers in the input spectral matrix ranges from 2 to 150, such as 2 to 140, such as 2 to 130, such as 2 to 120, such as 2 to 110, such as 2 to 100, such as 2 to 90, such as 2 to 80, such as 2 to 70, such as 2 to 60, and including 2 to 50. The collection of fluorochrome identifiers employed in a given embodiment of the invention may be referred to as a fluorochrome palette, which collectively refers to the fluorochrome identifiers from which a given fluorochrome panel may be chosen.

In certain instances, the spectral signatures include one or more spillover values. By "spillover value", it is meant a relative amount of signal that a given fluorochrome emits into each detector band. In certain cases, spillover values are normalized to the detector with maximum signal (i.e., the "peak" detector) for that fluorochrome. In some cases, particle-modulated light indicative of a particular fluorochrome is received by one or more detectors in a particle analyzer (e.g., flow cytometer) that are not the peak detector(s) for that fluorochrome. As such, light may "spillover" and be detected by off-peak detectors. In other words, the particular fluorescent labels used for an experiment and their associated fluorescent emission bands may be selected to generally coincide with certain detectors. However, as more detectors are provided, and more labels are utilized, perfect correspondence between certain detectors and fluorescent emission spectra may not be possible. It is generally true that although the peak of the emission spectra of a particular fluorescent molecule may lie within the window of one particular detector, some of the emission spectra of that label will also overlap the windows of one or more other detectors. This may be referred to as spillover.

In some embodiments, the spectral matrix described herein may include one or more autofluorescence spectral signatures. Autofluorescence is the intrinsic fluorescent signal generated by particles such as cells when measured in a flow cytometer. It arises from fluorescently active endogenous molecules such as metabolites in cells. Different cells of the same type (e.g., lymphocytes) may have the same autofluorescence spectrum but at different intensities, e.g., larger cells typically tend to have a larger autofluorescence signal. In certain instances, particles of different types are associated with different autofluorescence spectra. For example, cells of different types (e.g., lymphocytes vs. monocytes) may not only have varying levels of autofluorescence, but may also have different autofluorescence spectra (e.g., the spectral signature of lymphocyte autofluorescence may be distinct from the spectral signature of monocyte autofluorescence). In some cases, such as in spectral cytometry, the spectral signature of autofluorescence is measured by looking at unstained cells, and it is included in the spectral unmixing process as an additional "fluorochrome" parameter or parameters, if multiple autofluorescence spectra are included.

As mentioned above, the obtained spectral matrix is associated with the fluorochrome panel and the instrument identifier. Put another way, the obtained spectral matrix is a submatrix of the input spectral matrix (i.e., the spectral matrix associated with the instrument identifier) that includes spectral signatures for only the fluorochromes in the fluorochrome panel. A "submatrix" is discussed herein in its conventional sense to describe a matrix that is obtained by deleting some combination of rows and/or columns of another matrix.

After the spectral matrix associated with the fluorochrome panel and the instrument identifier is obtained, methods of the invention include calculating an inverse matrix from the obtained spectral matrix. As discussed herein, the term "inverse matrix" may be used to describe the inverse of a matrix in its conventional sense, i.e., the inverse of matrix A being $A^{-1}$ when $AA^{-1}=A^{-1}A=I$, where I is the matrix identity. However, for the purposes of the present disclosure, the term "inverse matrix" may also include other types of inverses, such as the inverses of non-square matrices. For example, in some embodiments, the inverse matrix is a pseudoinverse matrix. Broadly speaking, a "pseudoinverse matrix" is a matrix that generalizes the inverse of a square, invertible matrix for a non-square matrix. In some cases, the pseudoinverse matrix is a Moore-Penrose pseudoinverse matrix. In these cases, the pseudoinverse matrix may be calculated, as follows:

$$A^{+} = (A^{T}A)^{-1}A^{T}$$

where A is an m×n matrix, $A^T$ is the transpose of A, and $A^+$ is the pseudoinverse. General discussions of pseudoinverses (e.g., Moore-Penrose pseudoinverses) may be found in, for example, U.S. Pat. Nos. 7,065,286 and 9,575,162.

Pseudoinverses are suitable for assessing fluorochrome panels because a spectral matrix pseudoinverse determines the mapping of raw variance to unmixed variance. For example, spectral and conventional flow cytometry can both be described as a linear mixture model:

$$y = Mf$$

where y is the [m-by-1] vector of detector signals, M is the [m-by-n] matrix of spectral signatures, and f is the [n×1] vector of fluorophore abundances. Spectral unmixing involves solving this linear system of equations for "f" via a least squares method. For ordinary least squares, the solution can be described as:

$$f = M^{\dagger}y$$

where $M^{\dagger}$ is the Moore-Penrose pseudoinverse of M (or the inverse, in the case of compensation where M is square).

In additional embodiments, the inverse matrix is a gramian inverse matrix (also referred to as an "inverse moment matrix" of the spectral matrix). Gramian matrices are described in, for example, Horn, R. A., & Johnson, C. R. (2012). *Matrix analysis*, the disclosure of which is incorporated by reference herein. In some embodiments, a gramian inverse matrix is calculated according to the following equation.

$$G = (M^TM)^{-1}$$

where G is the gramian inverse matrix, M is the spectral matrix, $M^T$ is the transpose of the spectral matrix.

Linear estimator theory can be used to also calculate the variance-covariance matrix $V_f$ of the unmixed solution, given the variance-covariance matrix $V_y$ of the detector measurements:

$$V_f = M^{\dagger}V_y(M^{\dagger})^T$$

where $^T$ denotes the transpose operator. The diagonal elements of Vy are the per-detector variances or noise terms, and the diagonal elements of $V_f$ are the per-fluorochrome unmixed variances.

From this relation, it is clear that the spectral matrix pseudoinverse $M^{\dagger}$ determines the mapping of raw variance $V_y$ to unmixed variance $V_f$. This is demonstrated in the following proof: Let M denote the [n×m] spectral matrix and $M^{\dagger}$ the [n×m] the spectral matrix pseudoinverse where m is the number of detectors and n is the number of fluorochromes. Let $V_y$ be the [n×m] detector covariance matrix with $$\sigma_{yj}^2$$

denoting the measured variance of detector i. The unmixed fluorochrome covariance matrix $V_f$ of size [n×m] has diagonal entries $$\sigma_{fj}^2$$

denoting the unmixed variance of fluorophore j, and off-diagonal entries $$\sigma_{fjk}^2$$

denoting the unmixed covariance of fluorophores j and k. Then $V_f$ is defined as follows:

$$\begin{aligned} V_f &= M^{\dagger}V_y(M^{\dagger})^T \\ &= (M^TM)^{-1}M^TV_yM(M^TM)^{-1} \end{aligned}$$

$$M^{\dagger} = \begin{bmatrix} - & M_0^{\dagger} & - \\ - & M_j^{\dagger} & - \\ - & M_n^{\dagger} & - \end{bmatrix}$$

$$V_f = \begin{bmatrix} - & M_0^{\dagger} & - \\ - & M_j^{\dagger} & - \\ - & M_n^{\dagger} & - \end{bmatrix} V_y \begin{bmatrix} | & | & | \\ M_0^{\dagger} & M_j^{\dagger} & M_n^{\dagger} \\ | & | & | \end{bmatrix}$$

$$\sigma_{fj}^2 = \begin{bmatrix} - & M_j^{\dagger} & - \end{bmatrix} V_y \begin{bmatrix} | \\ M_j^{\dagger} \\ | \end{bmatrix}$$

$$\sigma_{fjk}^2 = \begin{bmatrix} - & M_j^{\dagger} & - \end{bmatrix} V_y \begin{bmatrix} | \\ M_k^{\dagger} \\ | \end{bmatrix}$$

As shown above, regardless of the structure of $V_y$, fluorophore is unmixed variance depends on the properties of its inverse spectrum $$M_j^{\dagger}.$$

The unmixed covariance of fluorophores j and k depends on both inverse spectra $$M_j^{\dagger} \text{ and } M_k^{\dagger}.$$

If $V_y$ is diagonal (no covariance):

$$V_y = \begin{bmatrix} \sigma_{y0}^2 & & \\ & \sigma_{yi}^2 & \\ & & \sigma_{ym}^2 \end{bmatrix}$$

$$\sigma_{fj}^2 = \sum_i (m_{ij}^{\dagger})^2 \sigma_{yi}^2$$

If one makes the simplifying assumption that detector noise is uncorrelated, then unmixed variance depends only on the magnitudes of the inverse spectrum, which can be summarized with the inverse spectrum's vector norms. If $V_y$ is homoscedastic such that $$V_y = \sigma_y^2 I:$$

$$\sigma_{fj}^2 = \sigma_y^2 \|M_j^{\dagger}\|_2^2$$

$$V_f = \sigma_y^2 (M^TM)^{-1}$$

If one also supposes that detector variance is equal in all channels, then $V_f$ is directly proportional the gramian inverse matrix $(M^TM)^{-1}$. Thus, it is shown that the gramian inverse matrix approximately predicts the true covariance matrix of unmixed data.

Following the calculation of the inverse matrix, embodiments of the method include deriving a quantitative metric from the inverse matrix. In certain cases, the quantitative metric is a matrix norm. In some instances the quantitative metric is a vector norm. In other instances, the quantitative metric is derived from some combination of matrix norms and vector norms, e.g., the sum of vector norms of some subset of columns or rows in the inverse matrix. Suitable norms include, but are not limited to, $L^2$ norms, 1-norms, 2-norms, infinity norms, and Frobenius norms. In some cases, the norm is a L2 norm. In some cases, the norm is a 1-norm. In some cases, the norm is a 2-norm. In some cases, the norm is an infinity norm. In some cases, the norm is a Frobenius norm. Frobenius norms are described in, for example, Golub, G. H. and Van Loan, C. F. (1996) *Matrix Computations,* $3^{rd}$ ed. Baltimore, MD: Johns Hopkins, herein incorporated by reference in its entirety. In certain cases, a Frobenius norm is calculated as follows (adapted from Golub and Van Loan):

$$\|A\|_F = \sqrt{\sum_{i=1}^{m}\sum_{j=1}^{n}|a_{ij}|^2}$$

where A is an m×n matrix.

In some embodiments, methods also include producing a visualization of the assessed suitability of the fluorochrome panel for use in generating the flow cytometer data. Any suitable visualization may be employed. In some embodiments, the visualization includes a plot of flow cytometer data that is simulated based on a given fluorochrome panel. Put another way, the visualization would include exemplary flow cytometer data that would be produced if a sample were run on a particular instrument with a particular fluorochrome panel. In some such embodiments, the visualization may emphasize (e.g., by highlighting, color-coding, grouping together, pointing out with arrows, etc.) flow cytometer data that would be associated with variance if certain fluorochromes in the fluorochrome panel were used to produce said data. In some embodiments, the visualization emphasizes flow cytometer data produced using fluorochromes that contribute to variance in the data. In certain instances, the visualization emphasizes flow cytometer data produced using fluorochromes that are affected by variance in the data. In additional versions, the visualization includes a table or a matrix quantifying the extent to which fluorochromes in the fluorochrome panel are associated with (e.g., contribute to and/or affected by) variance. For example, the table or matrix may be populated by the quantitative metrics discussed above. In some such versions, cells of the table or matrix are color-coded based on the extent to which fluorochromes are associated with (e.g., contribute to and/or are affected by) variance. In select instances, a cell is color-coded with a color having a lighter intensity if the associated fluorochrome is less associated with variance, and color-coded with a color having a heavier intensity if the associated fluorochrome is more associated with variance.

FIG. 1 depicts a flowchart for practicing a method for identifying a fluorochrome panel according to certain embodiments. As shown in FIG. 1, step 101 includes inputting a fluorochrome panel, an instrument identifier, and a spectral matrix associated with the fluorochrome panel and the instrument identifier. Step 102 includes calculating an inverse matrix (e.g., a pseudoinverse matrix). Step 103 includes calculating quantitative metrics, and step 104 includes optimizing the fluorochrome panel based on the quantitative metrics calculated in step 104. A visualization portraying the assessment of the fluorochrome panel may also be created in step 105

Figure 2:
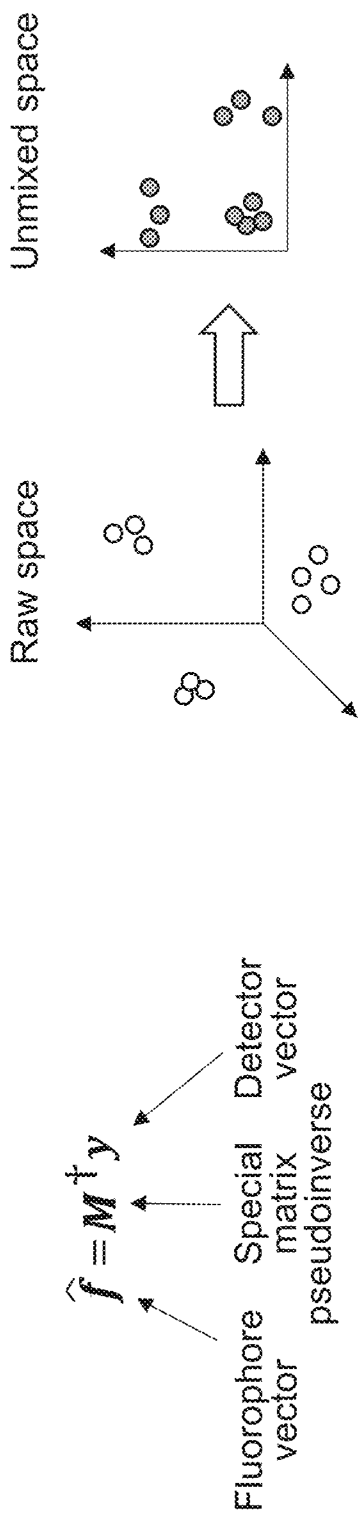
FIG. 2 depicts an underlying principle of the invention according to certain embodiments.
Figure 3:
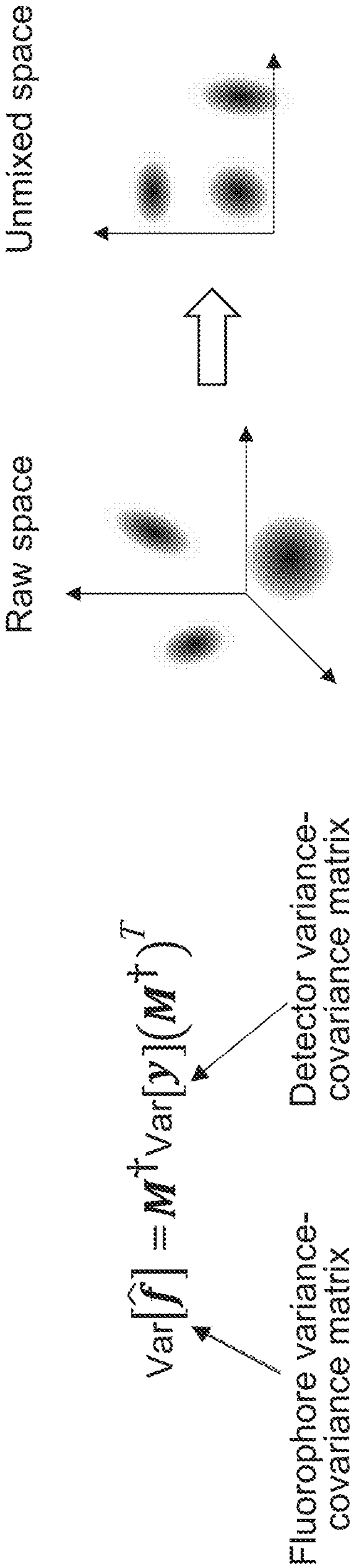
FIG. 3 depicts an underlying principle of the invention according to certain embodiments.

FIGS. 2-3 demonstrate the mapping of flow cytometer data (FIG. 2) and variance (FIG. 3) from "raw" space (i.e., having a number of dimensions equal to the number of detectors in the instrument) to "unmixed space" (i.e., having a number of dimensions equal to the number of fluorochromes in the sample). As shown in FIG. 2, spectral unmixing transforms data from high-dimensional detector space (raw) to a lower-dimensional fluorophore space. As discussed in detail above, spectral and conventional flow cytometry can both be described as a linear mixture model $f=M^{\dagger}y$. As shown in FIG. 3, variance also maps from detector space to fluorophore space. Based on the solution $V[f]=M^{\dagger}V[y](M^{\dagger})^T$, it is clear that the spectral matrix pseudoinverse $M^{\dagger}$ determines the mapping of raw variance V[y] to unmixed variance V[f]. As shown in FIGS. 2-3, the spectral matrix pseudoinverse maps raw detector signals back to unmixed fluorophores. The spectral matrix pseudoinverse also maps raw detector-space noise back to unmixed-space noise, which is ultimately of interest in terms of biological resolution in an experiment.

Figure 4A:
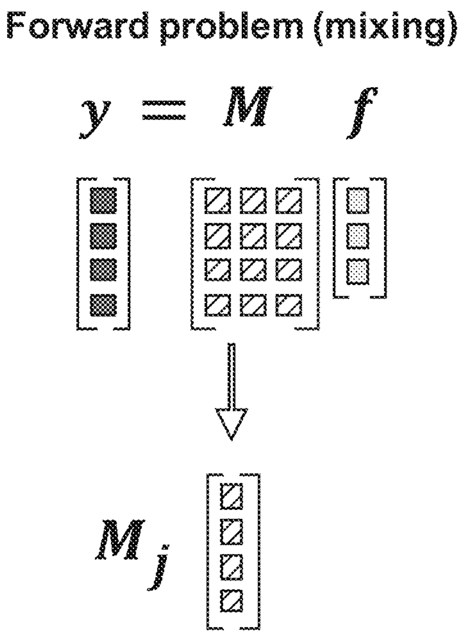
FIG. 4A-4B describe how properties of a pseudoinverse matrix determine spread (noise) in unmixed data.
Figure 4B:
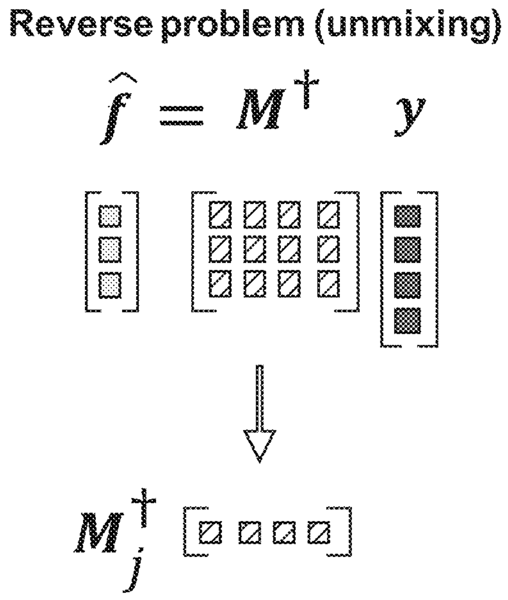

FIG. 4A-4B describe how properties of the pseudoinverse matrix determine spread (noise) in unmixed data. As shown in the forward problem (mixing) depicted in FIG. 4A, column j of the spectral matrix M is the spectrum $M_j$ of fluorophore j. $M_j$ describes how the signal from fluorophore j maps to all detectors. As shown in the reverse problem (unmixing) depicted in FIG. 4B, row j of the spectral matrix pseudoinverse $M^{\dagger}$ is the inverse spectrum $$M_j^{\dagger}$$

of fluorophore j.

$$M_j^{\dagger}$$

describes how detector signals map back to unmixed fluorophore j.

In some embodiments, methods include generating a panel hotspot matrix. As described herein, the "panel hotspot matrix" is a mechanism for mathematically describing and/or visualizing the impact of spread on fluorochromes. In select cases, the panel hotspot matrix serves as the above-described visualization. In some embodiments, the panel hotspot matrix is a diagonal matrix. The panel hotspot matrix may, in some instances, be calculated by obtaining a square root of the absolute value of the inverse matrix (e.g., gramian inverse). In certain cases, the panel hotspot matrix may be calculated, as follows:

$$P = \sqrt{\mathrm{abs}\left((M^TM)^{-1}\right)}$$

$$P_{jk} = \sqrt{\mathrm{abs}\left(\sum_{i}^{n_d}(M_{ji}^{\dagger})(M_{ki}^{\dagger})\right)}$$

$$= \sqrt{\mathrm{abs}\left(M_j^{\dagger}\cdot M_k^{\dagger}\right)}$$

Calculation of a panel hotspot matrix may result in two different metrics for panel suitability: pseudoinverse matrix row norms and off-diagonal entries. Pseudoinverse matrix row norms (i.e., diagonals of the panel hotspot matrix) indicate which fluorochromes are most impacted by unmixing-dependent spread in the full panel. In some cases, diagonal entries are the 2-norm of each fluorophore's pseudoinverse row. In some versions, the pseudoinverse matrix row norms may be represented on a scale corresponding to the factor by which the standard deviation of unmixed data in that fluorophore would be amplified as a result of unmixing in this panel. For example, 1 corresponds to no impact, while 2 corresponds to 2× the spread, and so on. Inspection of off-diagonal entries in the full panel hotspot matrix reveals problematic combinations of fluorochromes in the panel. Off-diagonal entries are the dot product of the corresponding row and column fluorophores' pseudoinverse rows. Off-diagonal values indicate the magnitude of covariance between two fluorophore pseudoinverse matrix entries. For example, in some embodiments, an off-diagonal value of 0 denotes no covariance, while higher values denote correspondingly higher levels of covariance.

Figure 5A:
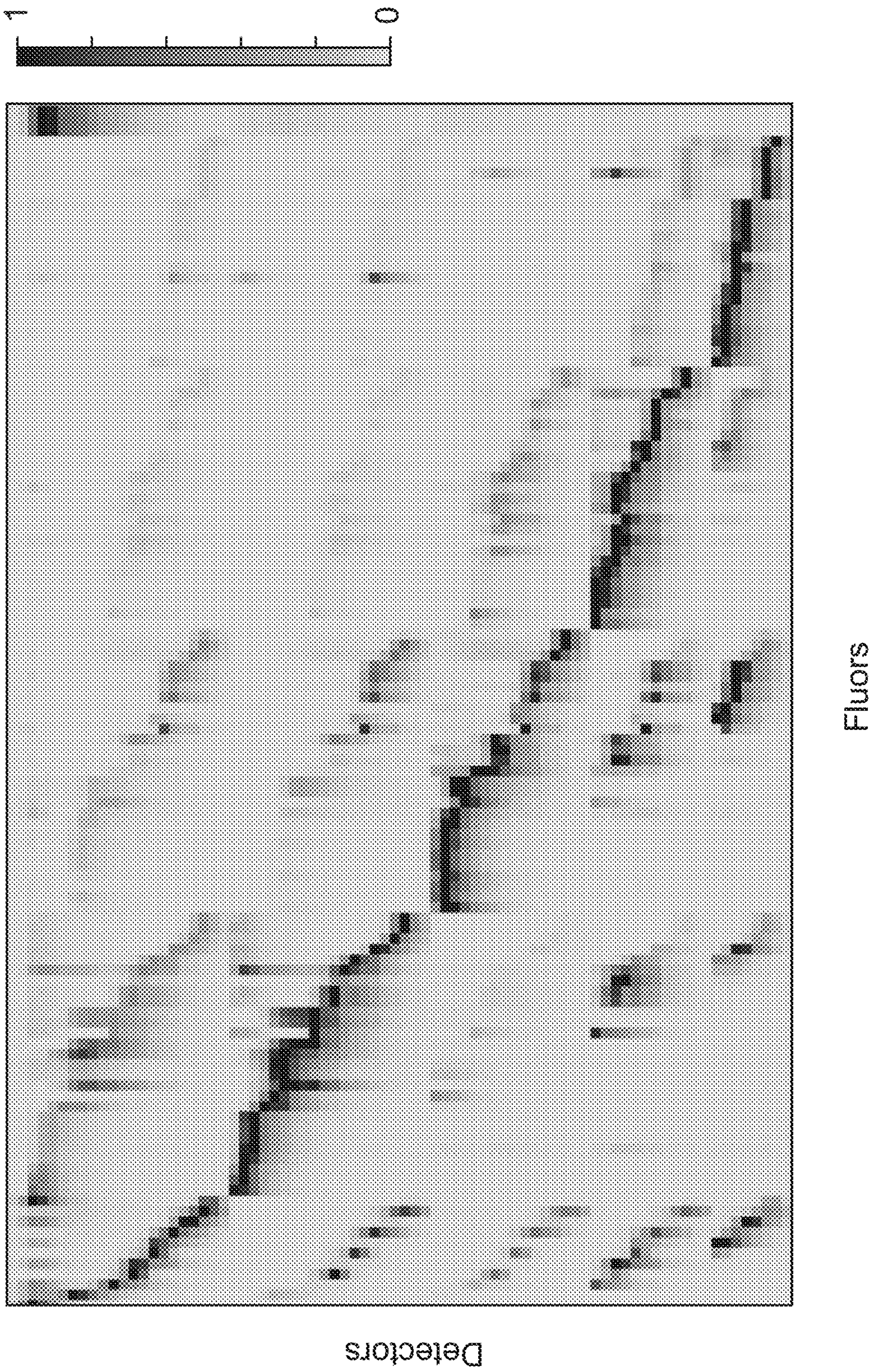
Figure 5B:
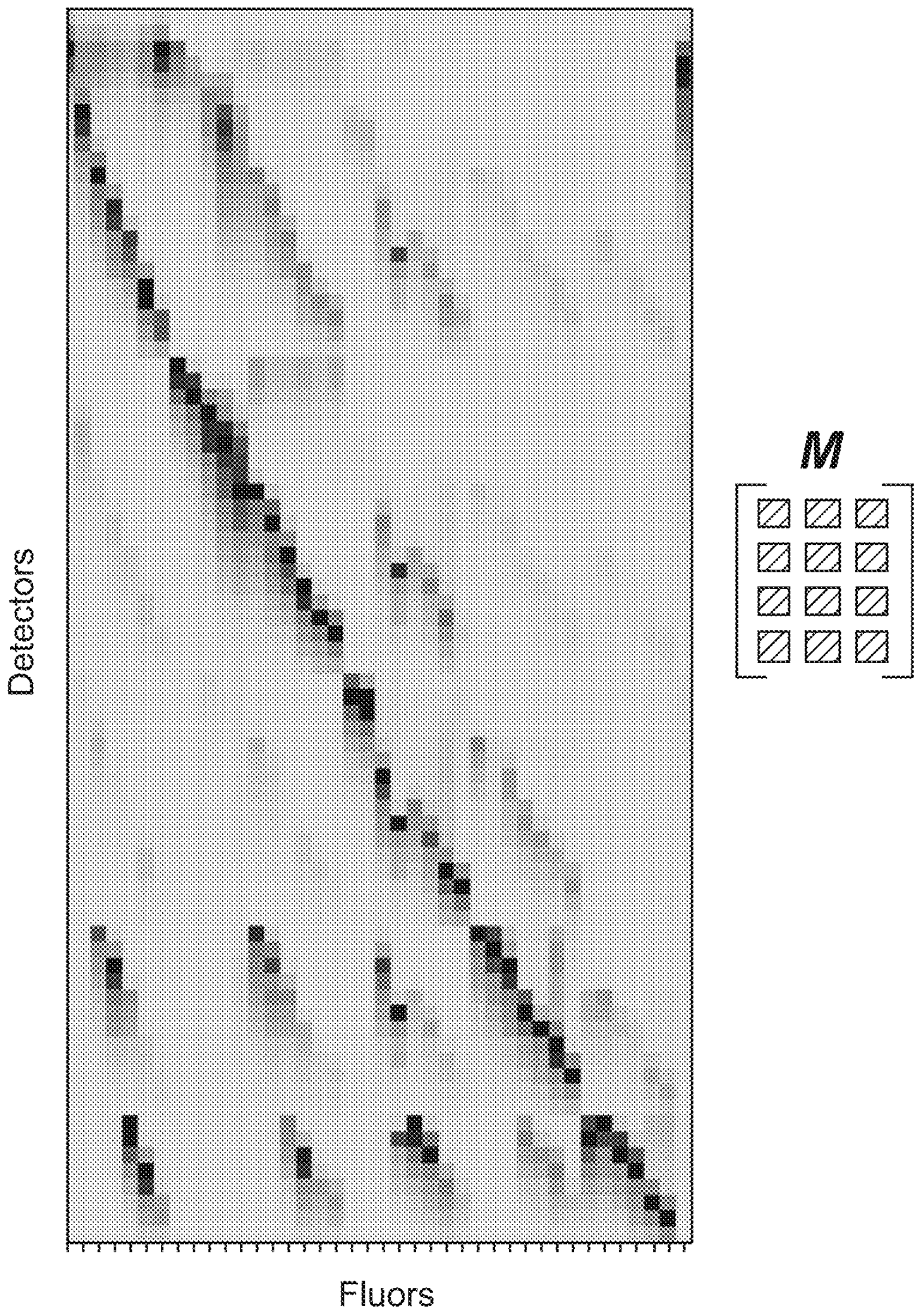
Figure 5C:
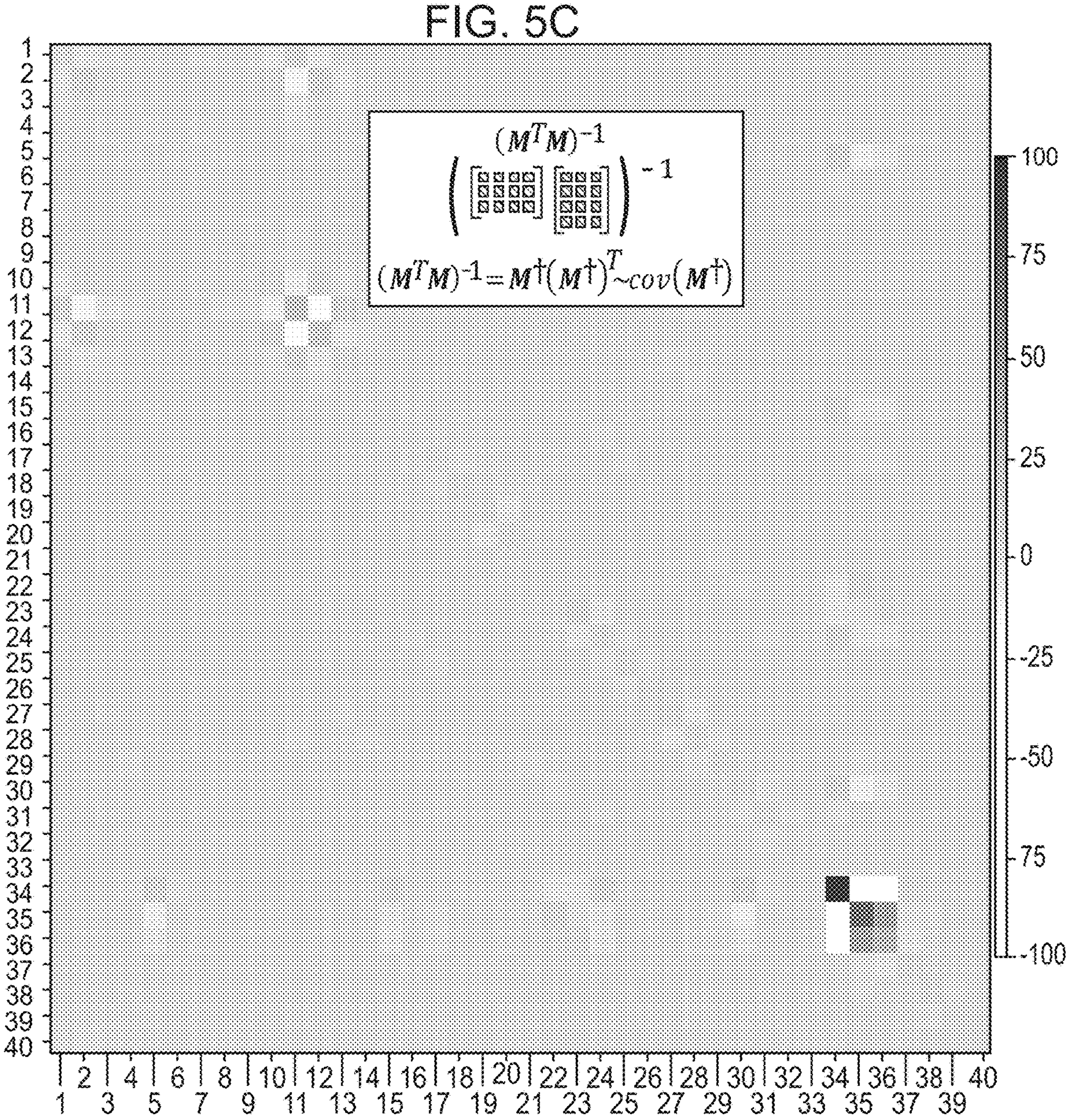

FIG. 5A-5D depict a panel hotspot matrix according to embodiments of the invention as well as an exemplary process for the calculation thereof. FIG. 5A presents a master database of single-stain spectra. The x-axis of the graph presented in FIG. 5A includes different fluorophores, while the y-axis includes detectors. The extent to which light emitted by a given fluorophore is detected by a given detector is represented by color-coding. FIG. 5B represents a subset of the master database of single-stain spectra shown in FIG. 5A. The subset includes fluorophores of interest for a given panel on the x-axis, while the remainder of the fluorophores in the master database are omitted. This subset constitutes spectral matrix M. FIG. 5C depicts the calculation of the gramian matrix (equal to gramian of the pseudoinverse matrix, proportional to covariance of the pseudoinverse matrix). FIG. 5D presents a panel hotspot matrix displaying the square root of the absolute value of the gramian inverse. Diagonal 501 includes pseudoinverse matrix row norms indicating which fluorochromes are most impacted by unmixing-dependent spread in the full panel. The remainder of the panel hotspot matrix (i.e., off-diagonal entries) indicates the magnitude of covariance between two fluorophore pseudoinverse matrix entries.

In some embodiments, methods include performing a separate analysis of the pseudoinverse matrix row norms (i.e., diagonals) of the panel hotspot matrix. In some such embodiments, methods include producing a diagonal visualization. The diagonal visualization may be any representation (e.g., graphical representation) of categorical data configured for the assessment and/or comparison of factors by which the standard deviation of unmixed data in fluorophores would be amplified as a result of unmixing in a particular panel. In some embodiments, the diagonal visualization is a bar graph, where each bar represents the factor by which the standard deviation of unmixed data in each fluorophore would be amplified as a result of unmixing in the panel.

In some cases, methods include producing a visualization of exemplary flow cytometer data that would be generated using particular fluorochromes based on the panel hotspot matrix. The exemplary flow cytometer data may be actual flow cytometer data, i.e., produced from a flow cytometry experiment. Alternatively, the data may be simulated. The subject visualizations of exemplary flow cytometer data demonstrate the effects of using certain fluorochromes in an experiment. In some embodiments, the visualization shows exemplary flow cytometer data produced using a particular pair of fluorochromes, e.g., to show how covariance associated with those fluorochromes affects data quality. Alternatively or in addition, exemplary flow cytometer data can be simulated using the full fluorochrome panel rather than just a pair of fluorochromes. Inspection of such exemplary flow cytometer data can reveal problematic combinations of fluorochromes in the panel.

Figure 6A:
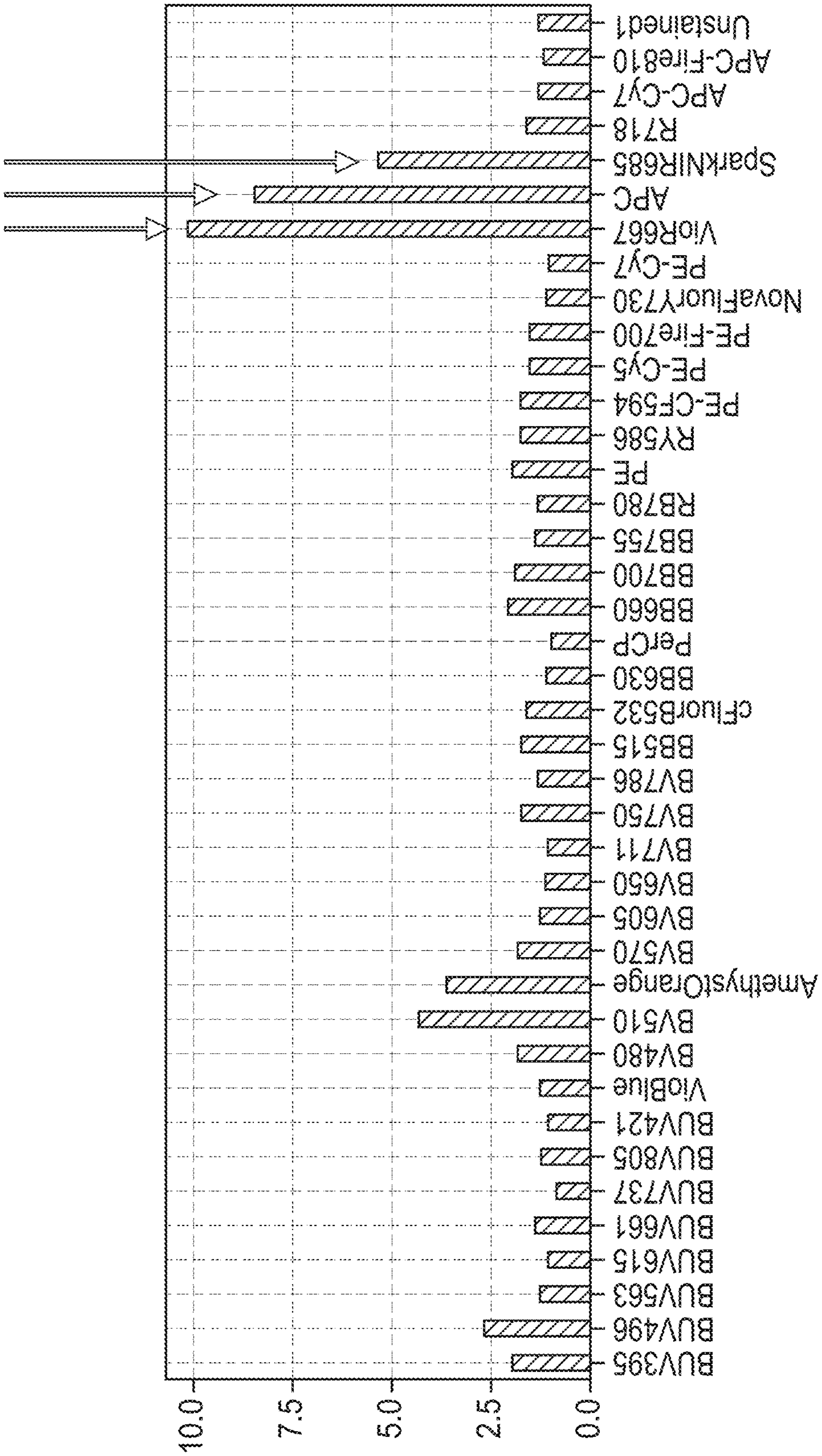
FIG. 6A-6B depict visualizations created based on a panel hotspot matrix.
Figure 6B:
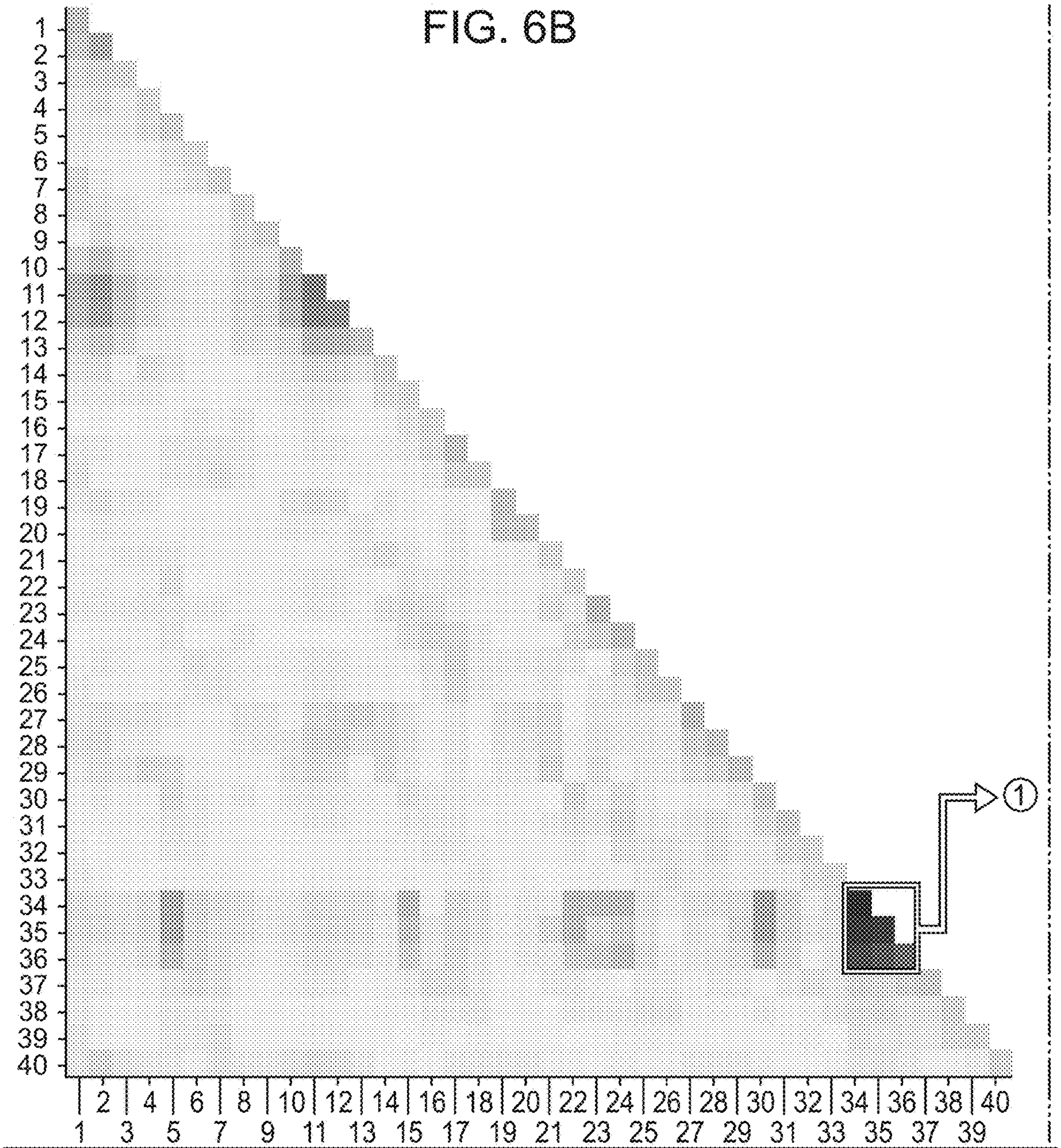
Figure 6B:
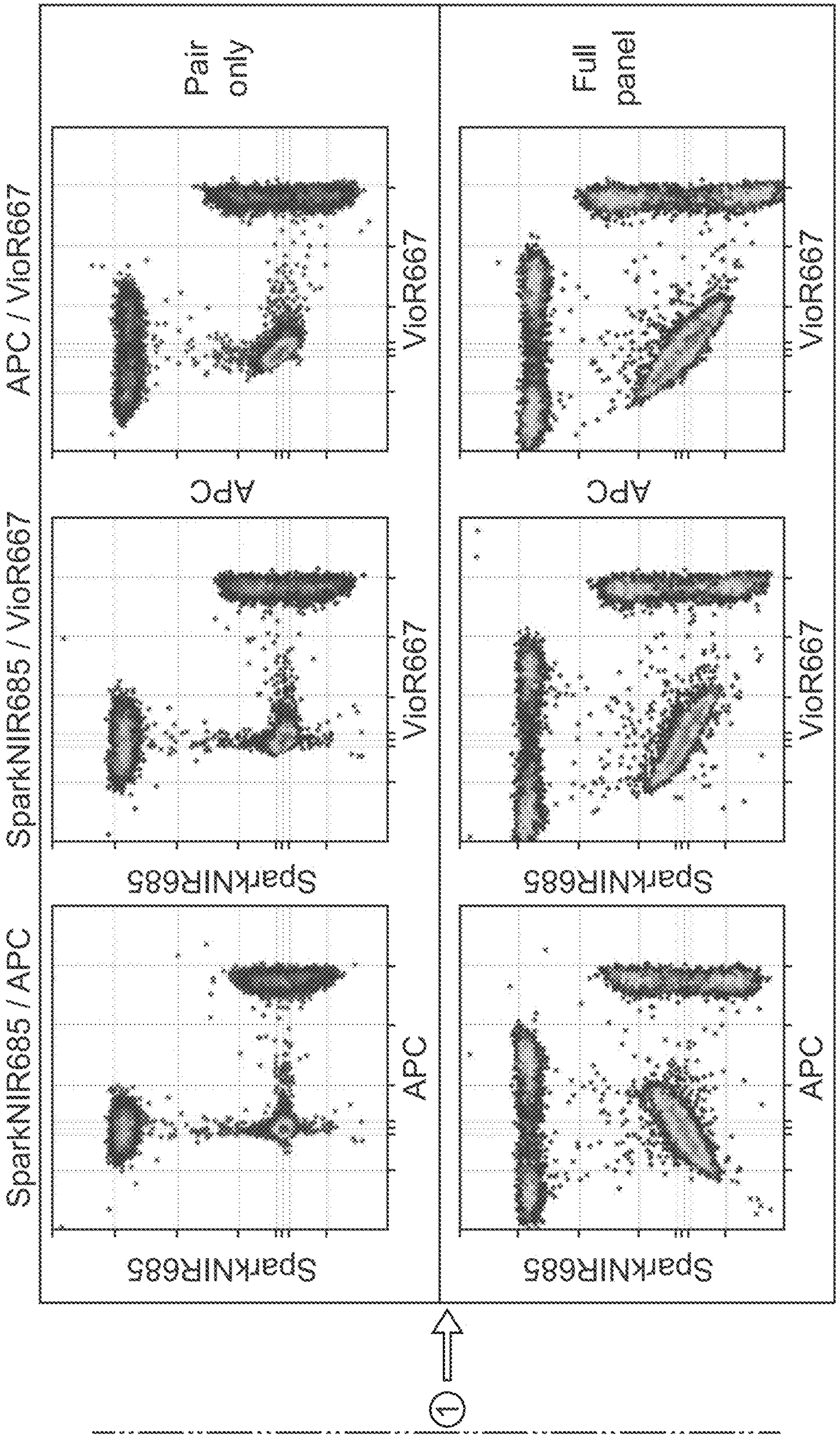

FIG. 6A-6B depict visualizations created based on a panel hotspot matrix. FIG. 6A depicts a diagonal visualization according to certain embodiments. The diagonal visualization in FIG. 6A is a bar graph and corresponds to diagonal 501 in FIG. 5D. The x-axis of the graph lists different fluorochromes, while the y-axis is a scale corresponding to the factor by which the standard deviation of unmixed data in the fluorophores would be amplified as a result of unmixing in the panel constituted by the fluorochromes on the x-axis. In the example of FIG. 6A, fluorochromes identified by the arrows (VioR667, APC, SparkNIR685) are associated with particularly high factor by which the standard deviation of unmixed data in the fluorophores would be amplified. These may be identified as fluorochromes that are most impacted by unmixing-dependent spread in the full panel. FIG. 6B shows exemplary flow cytometer data showing the effect of the inclusion of the fluorochromes identified in FIG. 6A on data quality. The data can be represented using particular pairs of fluorochromes (right panel, top row), or the entire panel (right panel, bottom row).

In certain cases, methods include producing a spread correlation matrix. As described herein, the "spread correlation matrix" is a mechanism for mathematically describing and/or visualizing the impact of particular fluorochromes on certain populations of data, such as double-negative populations. In embodiments, the spread correlation matrix may be used to predict tilt in double negative populations. "Tilt" is referred to herein as a measure describing the extent to which populations (e.g., double negative populations) are shifted in a particular direction (e.g., corresponding to a positive or negative correlation) due to the manner in which the data was collected and/or prepared. In some embodiments, preparing the spread correlation matrix includes treating the gramian inverse as a covariance matrix and normalizing each row and column to the square root of its diagonal element to calculate a correlation matrix. In some cases, the spread correlation matrix is calculated as follows:

$$\mathrm{diag}\left(\sqrt{\mathrm{diag}\left(\left(M^{T}M\right)^{-1}\right)}\right)\times\left(M^{T}M\right)^{-1}\times\mathrm{diag}\left(\sqrt{\mathrm{diag}\left(\left(M^{T}M\right)^{-1}\right)}\right)$$

where diag indicates taking the diagonal of a 2D matrix, or forming a diagonal matrix from a 1 D vector. This operation is equivalent to dividing each row by the square root of its diagonal entry and each column by the square root of its diagonal entry. Entry [i,j] of the spread correlation matrix corresponds to the correlation between the pseudoinverse matrix rows corresponding to fluorophores land j. In some cases, methods include producing a visualization of exemplary flow cytometer data that would be generated using particular fluorochromes based on the spread correlation matrix. As with the visualizations related to the panel hotspot matrix, visualizations of exemplary flow cytometer data created with respect to the spread correlation matrix may be actual or simulated.

Figure 7A:
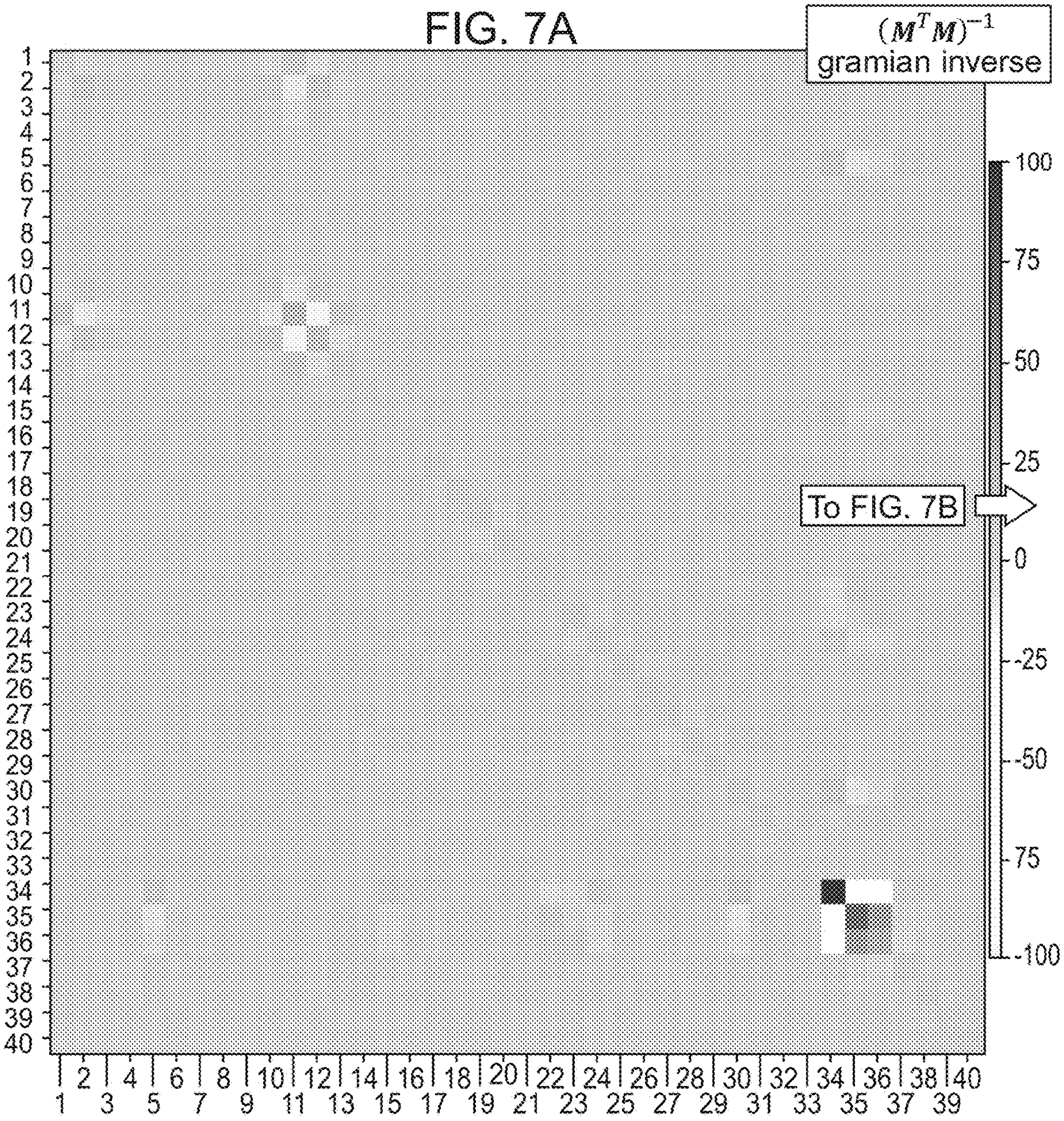
Figure 7B:
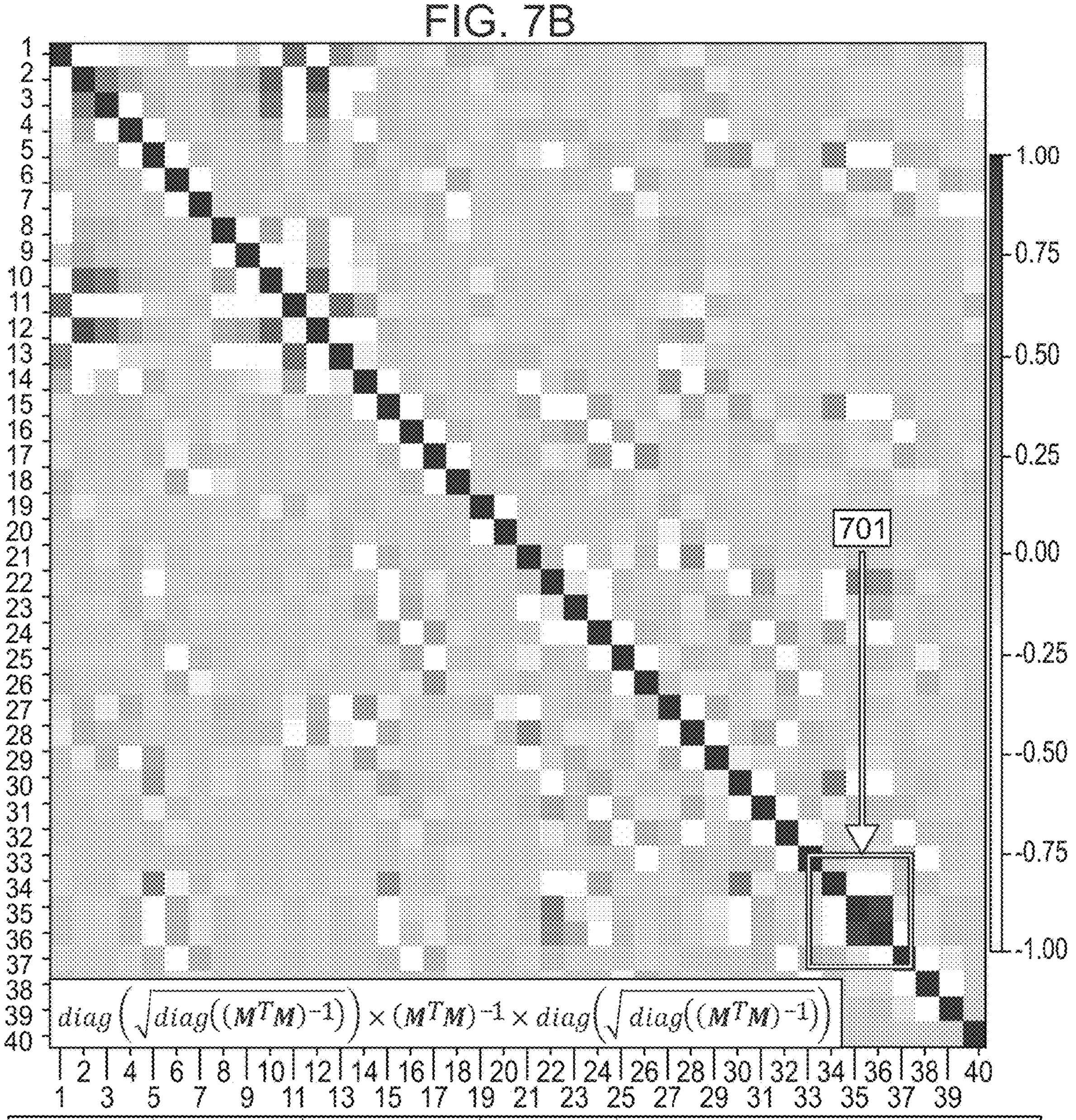

FIG. 7A-7E depict a spread correlation matrix according to embodiments of the invention as well as an exemplary process for the calculation thereof. FIG. 7A depicts the calculation of the inverse of the gramian matrix (equal to gramian of pseudoinverse matrix, proportional to covariance of pseudoinverse matrix). FIG. 7B depicts a spread correlation matrix calculated from the gramian inverse calculated in FIG. 7A. Each cell of the spread correlation matrix is associated with a correlation measured from −1.00 to 1.00 between the pseudoinverse matrix rows corresponding to the relevant fluorophores. Cells 701 define fluorophore pairs of interest likely to result in tilt. FIG. 7C-7D depict exemplary visualizations of exemplary flow cytometer data created using the pairs identified in cells 701. In FIG. 7C-7D, double negative populations 702*c* and 702*d* are predicted to have large negative correlations. On the other hand, population 702*e* in FIG. 7E is predicted to have a large positive correlation.

In embodiments, methods include optimizing the fluorochrome panel based on the assessment of the suitability of the fluorochrome panel for use in generating the flow cytometer data, i.e., such that the fluorochrome panel is suitable for use in a flow cytometric protocol. A fluorochrome panel may be described as "suitable for use" in a flow cytometric protocol when the fluorochrome panel produces intelligible flow cytometer data that reliably provides insight on the characteristics of interest in the sample under investigation. In some embodiments, a fluorochrome panel is suitable for use in a flow cytometric protocol when the panel provides increased biological resolution. "Biological resolution" refers to the ability to distinguish between different entities (e.g., cells, molecules, antigens, moieties, epitopes, or the like) of interest in a biological specimen. In some cases, fluorochrome panels identified herein produce maximum biological resolution in spite of measurement variance as well as variance in flow cytometer data space (e.g., flow cytometer data that has undergone fluorescence compensation or spectral unmixing). The "maximum" biological resolution is, in certain versions, assessed relative to the biological resolution that would be achieved using one or more other sets of fluorochromes that are different from (i.e., contain one or more different fluorochromes relative to) the fluorochromes assessed and/or identified as described herein.

In some embodiments, optimizing the fluorochrome panel comprises the use of a panel optimization algorithm. In some cases, the panel optimization algorithms is a constrained optimization algorithm. "Constrained optimization" is referred to herein in its conventional sense to describe a process of optimizing variables in the presence of constraints on those variables. Any suitable constrained optimization method may be employed. In certain cases, the constrained optimization method is a minimization algorithm. By "minimization algorithm" it is meant a type of constrained optimization method in which the method seeks to minimize a particular variable. Examples of constrained optimization techniques that may be employed include, but are not limited to, local search, local repair, backtracking, and constraint propagation. These may, in certain cases, be combined with minimization techniques such as simulated annealing and genetic (evolutionary) algorithms. In some cases, the fluorochrome panels described herein may be optimized in conjunction with the optimization protocols described in U.S. patent application Ser. No. 18/083,808 filed on Dec. 19, 2022, the disclosure of which is herein incorporated by reference herein.

In embodiments, optimizing the fluorochrome panel comprises adjusting the fluorochromes in the fluorochrome panel and assessing the suitability of the adjusted fluorochrome panel for use in generating flow cytometer data. By "adjusting" the fluorochromes in the fluorochrome panel, it is meant switching out a fluorochrome- or a fluorochrome identifier associated therewith—for a different fluorochrome in a spectral matrix representing the palette of possible fluorochromes or dyes that may be selected from. One or more fluorochromes in the panel may be adjusted at any given time. In some instances, methods include switching out a single fluorochrome in the panel at a given time. In certain cases, optimizing the fluorochrome panel includes maintaining a fluorochrome panel having a constant size. In other words, the number of fluorochromes in the obtained fluorochrome panel does not change even as one or more fluorochromes are adjusted. For example, an assessed fluorochrome panel having N fluorochromes will continue to have N fluorochromes following adjustment. In certain instances, a fluorochrome in the fluorochrome panel is not swapped out for a fluorochrome that is already within the fluorochrome panel. After the adjusted fluorochrome panel is generated, methods of interest additionally include assessing the adjusted fluorochrome panel, i.e., by calculating an inverse matrix from the obtained spectral matrix and identifying fluorochromes in the fluorochrome panel that would be associated with variance in flow cytometer data generated using the fluorochrome panel by analyzing the calculated inverse matrix to assess the suitability of the fluorochrome panel for use in generating the flow cytometer data, etc.

Methods of interest further involve comparing the assessment of the first fluorochrome panel with the assessment of the adjusted fluorochrome panel. For example, methods may include determining which of the first and adjusted fluorochrome panels is associated with a less variance in flow cytometer data. If either the first or adjusted fluorochrome panel comprises fewer fluorochromes that would be associated with variance in flow cytometer data than the other fluorochrome panel, and/or has fluorochromes that are less associated with variance (e.g., as determined by the quantitative metrics), that fluorochrome panel may be identified as being more suitable for generating flow cytometer data. In some cases, methods include discarding the fluorochrome panel having fluorochromes that are more associated with variance.

In certain cases, methods include iteratively adjusting the fluorochrome panel and assessing the suitability of each iteratively adjusted fluorochrome panel. In embodiments, whichever of the first and adjusted fluorochrome panels that has been assessed to be less associated with variance in fluorochrome data may serve as the seed for the next part of the iterative process. By "seed" it is meant a fluorochrome panel that has been determined in one iteration of the method to be associated with a less variance in flow cytometer data in comparison to one or more slightly modified fluorochrome panels. In some embodiments, the iterative process repeats itself until a condition has been met. Any suitable condition may be used to terminate the iterative process. In some instances, the iterative process is terminated when a certain run-time has elapsed. In other instances, the iterative process is terminated when the assessments produced for each iteratively adjusted fluorochrome panel converges. Put another way, the iterative process is terminated when only minor variance differences are observed between subsequent fluorochrome panels.

Figure 8:
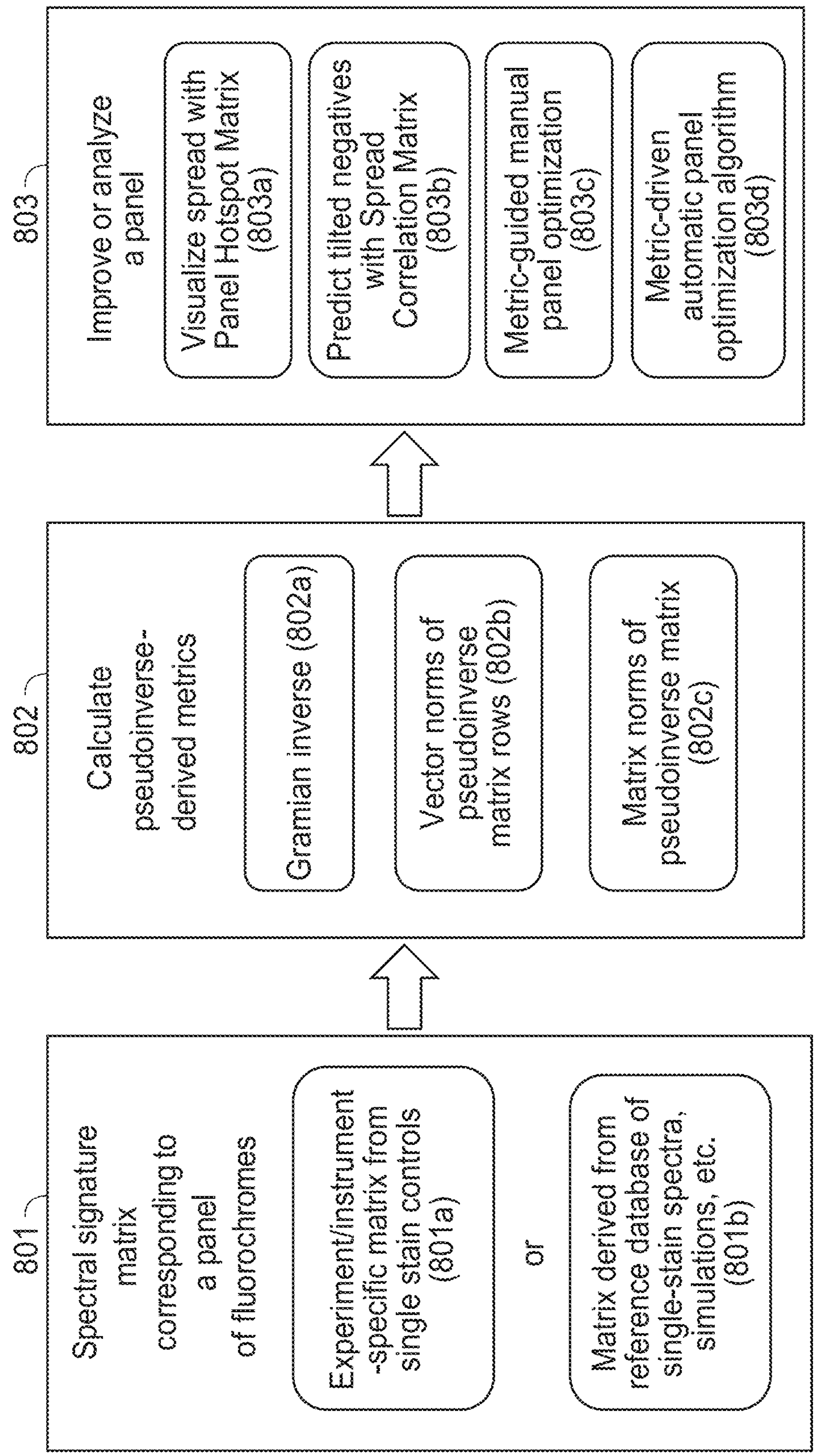
FIG. 8 presents a flowchart for practicing the methods of the invention according to certain embodiments

FIG. 8 presents a flowchart for practicing the methods of the invention according to certain embodiments. Methods include receiving an input 801, which can include experiment/instrument-specific matrix from single stain controls 801*a*, or a matrix derived from a reference database 801*b*. In step 802, an inverse matrix is calculated along with the quantitative metrics derived therefrom. These can include a gramian inverse 802*a*, vector norms 802*b*, or matrix norms 802*c*. The metrics calculated in step 802 can subsequently be used to improve or analyze a fluorochrome panel in step 803. This can include visualizing spread with a panel hotspot matrix in step 803*a*, predicting tilt in double negative populations with a spread correlation matrix in step 803*b*, optimizing the panel with metric-guided manual panel optimization in step 803*c*, or optimizing the panel with metric-guided automatic panel optimization in step 803*d*.

The subject fluorochrome panels may include any suitable set of fluorochromes. Fluorochromes of interest according to certain embodiments have excitation maxima that range from 100 nm to 800 nm, such as from 150 nm to 750 nm, such as from 200 nm to 700 nm, such as from 250 nm to 650 nm, such as from 300 nm to 600 nm and including from 400 nm to 500 nm. Fluorochromes of interest according to certain embodiments have emission maxima that range from 400 nm to 1000 nm, such as from 450 nm to 950 nm, such as from 500 nm to 900 nm, such as from 550 nm to 850 nm and including from 600 nm to 800 nm. In certain instances, the fluorochrome is a light emitting dye such as a fluorescent dye having a peak emission wavelength of 200 nm or more, such as 250 nm or more, such as 300 nm or more, such as 350 nm or more, such as 400 nm or more, such as 450 nm or more, such as 500 nm or more, such as 550 nm or more, such as 600 nm or more, such as 650 nm or more, such as 700 nm or more, such as 750 nm or more, such as 800 nm or more, such as 850 nm or more, such as 900 nm or more, such as 950 nm or more, such as 1000 nm or more and including 1050 nm or more. For example, the fluorochrome may be a fluorescent dye having a peak emission wavelength that ranges from 200 nm to 1200 nm, such as from 300 nm to 1100 nm, such as from 400 nm to 1000 nm, such as from 500 nm to 900 nm and including a fluorescent dye having a peak emission wavelength of from 600 nm to 800 nm.

Fluorochromes of interest may include, but are not limited to, a bodipy dye, a coumarin dye, a rhodamine dye, an acridine dye, an anthraquinone dye, an arylmethane dye, a diarylmethane dye, a chlorophyll containing dye, a triarylmethane dye, an azo dye, a diazonium dye, a nitro dye, a nitroso dye, a phthalocyanine dye, a cyanine dye, an asymmetric cyanine dye, a quinon-imine dye, an azine dye, an eurhodin dye, a safranin dye, an indamin, an indophenol dye, a fluorine dye, an oxazine dye, an oxazone dye, a thiazine dye, a thiazole dye, a xanthene dye, a fluorene dye, a pyronin dye, a fluorine dye, a rhodamine dye, a phenanthridine dye, squaraines, bodipys, squarine roxitanes, naphthalenes, coumarins, oxadiazoles, anthracenes, pyrenes, acridines, arylmethines, or tetrapyrroles and a combination thereof. In certain embodiments, conjugates may include two or more dyes, such as two or more dyes selected from a bodipy dye, a coumarin dye, a rhodamine dye, an acridine dye, an anthraquinone dye, an arylmethane dye, a diarylmethane dye, a chlorophyll containing dye, a triarylmethane dye, an azo dye, a diazonium dye, a nitro dye, a nitroso dye, a phthalocyanine dye, a cyanine dye, an asymmetric cyanine dye, a quinon-imine dye, an azine dye, an eurhodin dye, a safranin dye, an indamin, an indophenol dye, a fluorine dye, an oxazine dye, an oxazone dye, a thiazine dye, a thiazole dye, a xanthene dye, a fluorene dye, a pyronin dye, a fluorine dye, a rhodamine dye, a phenanthridine dye, squaraines, bodipys, squarine roxitanes, naphthalenes, coumarins, oxadiazoles, anthracenes, pyrenes, acridines, arylmethines, or tetrapyrroles and a combination thereof.

In certain embodiments, fluorochromes of interest may include but are not limited to fluorescein isothiocyanate (FITC), a phycoerythrin (PE) dye, a peridinin chlorophyll protein-cyanine dye (e.g., PerCP-Cy5.5), a phycoerythrin-cyanine (PE-Cy) dye (PE-Cy7), an allophycocyanin (APC) dye (e.g., APC-R700), an allophycocyanin-cyanine dye (e.g., APC-Cy7), a coumarin dye (e.g., V450 or V500). In certain instances, fluorochromes may include one or more of 1,4-bis-(o-methylstyryl)-benzene (bis-MSB 1,4-bis[2-(2-methylphenyl)ethenyl]-benzene), a C510 dye, a C6 dye, nile red dye, a T614 dye (e.g., N-[7-(methanesulfonamido)-4-oxo-6-phenoxychromen-3-yl]formamide), LDS 821 dye ((2-(6-(p-dimethylaminophenyl)-2,4-neopentylene-1,3,5-hexatrienyl)-3-ethylbenzothiazolium perchlorate), an mFluor dye (e.g., an mFluor Red dye such as mFluor 780NS).

Fluorochromes of interest may include, but are not limited to, Fluorescein, Hydroxycoumarin, Aminocoumarin, Methoxycoumarin, Cascade Blue, Pacific Blue, Pacific Orange, Lucifer yellow, NBD, R-Phycoerythrin (PE), PE-Cy5 conjugates, PE-Cy7 conjugates, Red 613, PerCP, TruRed, FluorX, BODIPY-FL, TRITC, X-Rhodamine, Lissamine Rhodamine B, Texas Red, Allophycocyanin (APC), APC-Cy7 conjugates, Cy2, Cy3, Cy3B, Cy3.5, Cy5, Cy5.5, Cy7, Hoechst 33342, DAPI, Hoechst 33258, SYTOX Blue, Chromomycin A3, Mithramycin, YOYO-1, Ethidium Bromide, Acridine Orange, SYTOX Green, TOTO-1, TO-PRO-1, Thiazole Orange, Propidium Iodide (PI), LDS 751, 7-AAD, SYTOX Orange, TOTO-3, TO-PRO-3, DRAQ5, Indo-1, Fluo-3, DCFH, DHR, SNARF, Y66H, Y66F, EBFP, EBFP2, Azurite, GFPuv, T-Sapphire, TagBFP, Cerulean, mCFP, ECFP, CyPet, Y66W, dKeima-Red, mKeima-Red, TagCFP, AmCyan1, mTFP1 (Teal), S65A, Midoriishi-Cyan, Wild Type GFP, S65C, TurboGFP, TagGFP, TagGFP2, AcGFP1, S65L, Emerald, S65T, EGFP, Azami-Green, ZsGreen1, Dronpa-Green, TagYFP, EYFP, Topaz, Venus, mCitrine, YPet, TurboYFP, PhiYFP, PhiYFP-m, ZsYellow1, mBanana, Kusabira-Orange, mOrange, mOrange2, mKO, TurboRFP, tdTomato, DsRed-Express2, TagRFP, DsRed monomer, DsRed2 ("RFP"), mStrawberry, TurboFP602, AsRed2, mRFP1, J-Red, mCherry, HcRed1, mKate2, Katushka (TurboFP635), mKate (TagFP635), TurboFP635, mPlum, mRaspberry, mNeptune, E2-Crimson, Monochlorobimane, Calcein, Alexa Fluor 350, Alexa Fluor 405, Alexa Fluor 430, Alexa Fluor 488, Alexa Fluor 500, Alexa Fluor 514, Alexa Fluor 532, Alexa Fluor 546, Alexa Fluor 555, Alexa Fluor 568, Alexa Fluor 594, Alexa Fluor 610, Alexa Fluor 633, Alexa Fluor 647, Alexa Fluor 660, Alexa Fluor 680, Alexa Fluor 700, Alexa Fluor 750, Alexa Fluor 790, and HyPer, or the like.

In some instances, the fluorochrome panel includes one or more polymeric dyes (e.g., fluorescent polymeric dyes). Fluorescent polymeric dyes that find use in the subject methods and systems are varied. In some instances of the method, the polymeric dye includes a conjugated polymer. Conjugated polymers (CPs) are characterized by a delocalized electronic structure which includes a backbone of alternating unsaturated bonds (e.g., double and/or triple bonds) and saturated (e.g., single bonds) bonds, where π-electrons can move from one bond to the other. As such, the conjugated backbone may impart an extended linear structure on the polymeric dye, with limited bond angles between repeat units of the polymer. For example, proteins and nucleic acids, although also polymeric, in some cases do not form extended-rod structures but rather fold into higher-order three-dimensional shapes. In addition, CPs may form "rigid-rod" polymer backbones and experience a limited twist (e.g., torsion) angle between monomer repeat units along the polymer backbone chain. In some instances, the polymeric dye includes a CP that has a rigid rod structure. The structural characteristics of the polymeric dyes can have an effect on the fluorescence properties of the molecules.

Any convenient polymeric dye may be utilized in the subject devices and methods. In some instances, a polymeric dye is a multichromophore that has a structure capable of harvesting light to amplify the fluorescent output of a fluorophore. In some instances, the polymeric dye is capable of harvesting light and efficiently converting it to emitted light at a longer wavelength. In some cases, the polymeric dye has a light-harvesting multichromophore system that can efficiently transfer energy to nearby luminescent species (e.g., a "signaling chromophore"). Mechanisms for energy transfer include, for example, resonant energy transfer (e.g., Forster (or fluorescence) resonance energy transfer, FRET), quantum charge exchange (Dexter energy transfer), and the like. In some instances, these energy transfer mechanisms are relatively short range; that is, close proximity of the light harvesting multichromophore system to the signaling chromophore provides for efficient energy transfer. Under conditions for efficient energy transfer, amplification of the emission from the signaling chromophore occurs when the number of individual chromophores in the light harvesting multichromophore system is large; that is, the emission from the signaling chromophore is more intense when the incident light (the "excitation light") is at a wavelength which is absorbed by the light harvesting multichromophore system than when the signaling chromophore is directly excited by the pump light.

The multichromophore may be a conjugated polymer. Conjugated polymers (CPs) are characterized by a delocalized electronic structure and can be used as highly responsive optical reporters for chemical and biological targets. Because the effective conjugation length is substantially shorter than the length of the polymer chain, the backbone contains a large number of conjugated segments in close proximity. Thus, conjugated polymers are efficient for light harvesting and enable optical amplification via Forster energy transfer.

Polymeric dyes of interest include, but are not limited to, those dyes described in U.S. Pat. Nos. 7,270,956; 7,629,448; 8,158,444; 8,227,187; 8,455,613; 8,575,303; 8,802,450; 8,969,509; 9,139,869; 9,371,559; 9,547,008; 10,094,838; 10,302,648; 10,458,989; 10,641,775 and 10,962,546 the disclosures of which are herein incorporated by reference in their entirety; and Gaylord et al., *J. Am. Chem. Soc.,* 2001, 123 (26), pp 6417-6418; Feng et al., *Chem. Soc. Rev.,* 2010, 39, 2411-2419; and Traina et al., *J. Am. Chem. Soc.,* 2011, 133 (32), pp 12600-12607, the disclosures of which are herein incorporated by reference in their entirety. Specific polymeric dyes that may be employed include, but are not limited to, BD Horizon Brilliant™ Dyes, such as BD Horizon Brilliant™ Violet Dyes (e.g., BV421, BV510, BV605, BV650, BV711, BV786); BD Horizon Brilliant™ Ultraviolet Dyes (e.g., BUV395, BUV496, BUV737, BUV805); and BD Horizon Brilliant™ Blue Dyes (e.g., BB515) (BD Biosciences, San Jose, CA). Any fluorochromes that are known to a skilled artisan—including, but not limited to, those described above—or are yet to be discovered may be employed in the subject methods.

Fluorochromes in the subject fluorochrome panels and/or fluorochromes referenced in the spectral matrix may or may not be coupled to a biomolecule, such as a biological macromolecule. The biological macromolecule may be a biopolymer. A "biopolymer" is a polymer of one or more types of repeating units. Biopolymers are typically found in biological systems and particularly include polysaccharides (such as carbohydrates), and peptides (which term is used to include polypeptides, and proteins whether or not attached to a polysaccharide) and polynucleotides as well as their analogs such as those compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions. Polynucleotides include single or multiple stranded configurations, where one or more of the strands may or may not be completely aligned with another. Specifically, a "biopolymer" includes DNA (including cDNA), RNA and oligonucleotides, regardless of the source. As such, biomolecules may include polysaccharides, nucleic acids and polypeptides. For example, the nucleic acid may be an oligonucleotide, truncated or full-length DNA or RNA. In embodiments, oligonucleotides, truncated and full-length DNA or RNA are comprised of 10 nucleotide monomers or more, such as 15 or more, such as 25 or more, such as 50 or more, such as 100 or more, such as 250 or more and including 500 nucleotide monomers or more. For example, oligonucleotides, truncated and full-length DNA or RNA of interest may range in length from 10 nucleotides to $10^8$ nucleotides, such as from $10^2$ nucleotides to $10^7$ nucleotides, including from $10^3$ nucleotides to $10^6$ nucleotides. In embodiments, biopolymers are not single nucleotides or short chain oligonucleotides (e.g., less than 10 nucleotides). By "full length" is meant that the DNA or RNA is a nucleic acid polymer having 70% or more of its complete sequence (such as found in nature), such as 75% or more, such as 80% or more, such as 85% or more, such as 90% or more, such as 95% or more, such as 97% or more, such as 99% or more and including 100% of the full length sequence of the DNA or RNA (such as found in nature)

Polypeptides may be, in certain instances, truncated or full-length proteins, enzymes or antibodies. In embodiments, polypeptides, truncated and full-length proteins, enzymes or antibodies are comprised of 10 amino acid monomers or more, such as 15 or more, such as 25 or more, such as 50 or more, such as 100 or more, such as 250 or more and including 500 amino acid monomers or more. For example, polypeptides, truncated and full-length proteins, enzymes or antibodies of interest may range in length from 10 amino acids to $10^8$ amino acids, such as from $10^2$ amino acids to $10^7$ amino acids, including from $10^3$ amino acids to $10^6$ amino acids. In embodiments, biopolymers are not single amino acids or short chain polypeptides (e.g., less than 10 amino acids). By "full length" is meant that the protein, enzyme or antibody is a polypeptide polymer having 70% or more of its complete sequence (such as found in nature), such as 75% or more, such as 80% or more, such as 85% or more, such as 90% or more, such as 95% or more, such as 97% or more, such as 99% or more and including 100% of the full length sequence of the protein, enzyme or antibody (such as found in nature).

In some instances, the fluorochrome is conjugated to a specific binding member. The specific binding member and the fluorochrome can be conjugated (e.g., covalently linked) to each other at any convenient locations of the two molecules, via an optional linker. As used herein, the term "specific binding member" refers to one member of a pair of molecules which have binding specificity for one another.

One member of the pair of molecules may have an area on its surface, or a cavity, which specifically binds to an area on the surface of, or a cavity in, the other member of the pair of molecules. Thus, the members of the pair have the property of binding specifically to each other to produce a binding complex. In some embodiments, the affinity between specific binding members in a binding complex is characterized by a $K_d$ (dissociation constant) of $10^{-6}$ M or less, such as $10^{-7}$ M or less, including $10^{-8}$ M or less, e.g., $10^{-9}$ M or less, $10^{-10}$ M or less, $10^{-11}$ M or less, $10^{-12}$ M or less, $10^{-13}$ M or less, $10^{-14}$ M or less, including $10^{-15}$ M or less. In some embodiments, the specific binding members specifically bind with high avidity. By high avidity is meant that the binding member specifically binds with an apparent affinity characterized by an apparent $K_d$ of $10\times10^{-9}$ M or less, such as $1\times10^{-9}$ M or less, $3\times10^{-10}$ M or less, $1\times10^{-10}$ M or less, $3\times10^{-11}$ M or less, $1\times10^{-11}$ M or less, $3\times10^{-12}$ M or less or $1\times10^{-12}$ M or less.

The specific binding member can be proteinaceous. As used herein, the term "proteinaceous" refers to a moiety that is composed of amino acid residues. A proteinaceous moiety can be a polypeptide. In certain cases, the proteinaceous specific binding member is an antibody. In certain embodiments, the proteinaceous specific binding member is an antibody fragment, e.g., a binding fragment of an antibody that specific binds to a polymeric dye. As used herein, the terms "antibody" and "antibody molecule" are used interchangeably and refer to a protein consisting of one or more polypeptides substantially encoded by all or part of the recognized immunoglobulin genes. The recognized immunoglobulin genes, for example in humans, include the kappa (k), lambda (l), and heavy chain genetic loci, which together comprise the myriad variable region genes, and the constant region genes mu (u), delta (d), gamma (g), sigma (e), and alpha (a) which encode the IgM, IgD, IgG, IgE, and IgA isotypes respectively. An immunoglobulin light or heavy chain variable region consists of a "framework" region (FR) interrupted by three hypervariable regions, also called "complementarity determining regions" or "CDRs". The extent of the framework region and CDRs have been precisely defined (see, "Sequences of Proteins of Immunological Interest," E. Kabat et al., U.S. Department of Health and Human Services, (1991)). The numbering of all antibody amino acid sequences discussed herein conforms to the Kabat system. The sequences of the framework regions of different light or heavy chains are relatively conserved within a species. The framework region of an antibody, that is the combined framework regions of the constituent light and heavy chains, serves to position and align the CDRs. The CDRs are primarily responsible for binding to an epitope of an antigen. The term antibody is meant to include full length antibodies and may refer to a natural antibody from any organism, an engineered antibody, or an antibody generated recombinantly for experimental, therapeutic, or other purposes as further defined below. Antibody fragments of interest include, but are not limited to, Fab, Fab', F(ab')2, Fv, scFv, or other antigen-binding subsequences of antibodies, either produced by the modification of whole antibodies or those synthesized de novo using recombinant DNA technologies. Antibodies may be monoclonal or polyclonal and may have other specific activities on cells (e.g., antagonists, agonists, neutralizing, inhibitory, or stimulatory antibodies). It is understood that the antibodies may have additional conservative amino acid substitutions which have substantially no effect on antigen binding or other antibody functions. In certain embodiments, the specific binding member is a Fab fragment, a $F(ab')_2$ fragment, a scFv, a diabody or a triabody. In certain embodiments, the specific binding member is an antibody. In some cases, the specific binding member is a murine antibody or binding fragment thereof. In certain instances, the specific binding member is a recombinant antibody or binding fragment thereof.

In embodiments, the subject fluorochrome panels are employed to analyze a sample. In some instances, the sample analyzed is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen, or the like. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class Mammalia, including the orders carnivore (e.g., dogs and cats), Rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

Fluorochromes in the fluorochrome panel may be configured to target different types of cells (e.g., via an antibody targeted to that cell, etc.). A variety of cells may be characterized using the subject methods. Target cells of interest include, but are not limited to, stem cells, T cells, dendritic cells, B Cells, granulocytes, leukemia cells, lymphoma cells, virus cells (e.g., HIV cells), NK cells, macrophages, monocytes, fibroblasts, epithelial cells, endothelial cells, and erythroid cells. Target cells of interest include cells that have a convenient cell surface marker or antigen that may be captured or labelled by a convenient affinity agent or conjugate thereof. For example, the target cell may include a cell surface antigen such as CD11b, CD123, CD14, CD15, CD16, CD19, CD193, CD2, CD25, CD27, CD3, CD335, CD36, CD4, CD43, CD45RO, CD56, CD61, CD7, CD8, CD34, CD1c, CD23, CD304, CD235a, T cell receptor alpha/beta, T cell receptor gamma/delta, CD253, CD95, CD20, CD105, CD117, CD120b, Notch4, Lgr5 (N-Terminal), SSEA-3, TRA-1-60 Antigen, Disialoganglioside GD2 and CD71. In some embodiments, the target cell is selected from HIV containing cell, a Treg cell, an antigen-specific T-cell populations, tumor cells or hematopoietic progenitor cells (CD34+) from whole blood, bone marrow or cord blood.

In certain embodiments, fluorochrome panels identified via the present methods may be employed in a flow cytometric protocol (e.g., to analyze a sample, such as those discussed above). In practicing such methods, a sample (e.g., in a flow stream of a flow cytometer) is irradiated with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof.

In other embodiments, methods of embodiments of the invention include irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

In certain embodiments, methods include irradiating the sample with one or more lasers. As discussed above, the type and number of lasers will vary depending on the sample as well as desired light collected and may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the methods include irradiating the flow stream with a dye laser, such as a stilbene, coumarin or rhodamine laser. In yet other instances, methods include irradiating the flow stream with a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, methods include irradiating the flow stream with a solid-state laser, such as a ruby laser, an Nd:YAG laser, NdCrYAG laser, Er:YAG laser, Nd:YLF laser, Nd:$YVO_4$ laser, Nd:$YCa_4O(BO_3)_3$ laser, Nd:YCOB laser, titanium sapphire laser, thulim YAG laser, ytterbium YAG laser, ytterbium$_2O_3$ laser or cerium doped lasers and combinations thereof.

The sample may be irradiated with one or more of the above mentioned light sources, such as 2 or more light sources, such as 3 or more light sources, such as 4 or more light sources, such as 5 or more light sources and including 10 or more light sources. The light source may include any combination of types of light sources. For example, in some embodiments, the methods include irradiating the sample in the flow stream with an array of lasers, such as an array having one or more gas lasers, one or more dye lasers and one or more solid-state lasers.

The sample may be irradiated with wavelengths ranging from 200 nm to 1500 nm, such as from 250 nm to 1250 nm, such as from 300 nm to 1000 nm, such as from 350 nm to 900 nm and including from 400 nm to 800 nm. For example, where the light source is a broadband light source, the sample may be irradiated with wavelengths from 200 nm to 900 nm. In other instances, where the light source includes a plurality of narrow band light sources, the sample may be irradiated with specific wavelengths in the range from 200 nm to 900 nm. For example, the light source may be plurality of narrow band LEDs (1 nm-25 nm) each independently emitting light having a range of wavelengths between 200 nm to 900 nm. In other embodiments, the narrow band light source includes one or more lasers (such as a laser array) and the sample is irradiated with specific wavelengths ranging from 200 nm to 700 nm, such as with a laser array having gas lasers, excimer lasers, dye lasers, metal vapor lasers and solid-state laser as described above.

Where more than one light source is employed, the sample may be irradiated with the light sources simultaneously or sequentially, or a combination thereof. For example, the sample may be simultaneously irradiated with each of the light sources. In other embodiments, the flow stream is sequentially irradiated with each of the light sources. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g., laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., 3 or more) light sources, the delay between irradiation by each light source may be the same or different.

The sample may be irradiated continuously or in discrete intervals. In some instances, methods include irradiating the sample in the sample with the light source continuously. In other instances, the sample in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the light source, the sample may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In embodiments, light from the irradiated sample is conveyed to a light detection system and measured by one or more photodetectors. In practicing the subject methods, light from the sample is conveyed to three or more wavelength separators that are each configured to pass light having a predetermined spectral range. The spectral ranges of light from each of the wavelength separators are conveyed to one or more light detection modules having optical components that are configured to convey light having a predetermined sub-spectral range to the photodetectors.

Light may be measured with the light detection systems continuously or in discrete intervals. In some instances, methods include taking measurements of the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the collected light may be taken one or more times during the subject methods, such as 2 or more times, such as 3 or more times, such as 5 or more times and including 10 or more times. In certain embodiments, the light propagation is measured 2 or more times, with the data in certain instances being averaged.

In some embodiments, methods include adjusting the light before detecting the light with the subject light detection systems. For example, the light from the sample source may be passed through one or more lenses, mirrors, pinholes, slits, gratings, light refractors, and any combination thereof. In some instances, the collected light is passed through one or more focusing lenses, such as to reduce the profile of the light directed to the light detection system or optical collection system as described above. In other instances, the emitted light from the sample is passed through one or more collimators to reduce light beam divergence conveyed to the light detection system.

Systems

Aspects of the invention additionally include systems configured to perform the above-described methods. Systems of interest include a processor configured to obtain a fluorochrome panel, an instrument identifier, and a spectral matrix associated with the fluorochrome panel and the instrument identifier. The processors of the subject systems are also configured to calculate an inverse matrix from the obtained spectral matrix, and identify fluorochromes in the fluorochrome panel that would be associated with variance in flow cytometer data generated using the fluorochrome panel by analyzing the calculated inverse matrix to assess the suitability of the fluorochrome panel for use in generating the flow cytometer data. In embodiments, the subject processors are operated in conjunction with programmable logic that may be implemented in hardware, software, firmware, or any combination thereof in order to assess a fluorochrome panel. For example, where programmable logic is implemented in software, fluorochrome panel assessment may be realized at least in part by a computer-readable data storage medium comprising program code including instructions that, when executed, are configured to obtain a fluorochrome panel, an instrument identifier, and a spectral matrix associated with the fluorochrome panel and the instrument identifier. In addition, the instructions are configured to calculate an inverse matrix from the obtained spectral matrix, and identify fluorochromes in the fluorochrome panel that would be associated with variance in flow cytometer data generated using the fluorochrome panel by analyzing the calculated inverse matrix to assess the suitability of the fluorochrome panel for use in generating the flow cytometer data.

The processor may additionally be configured to optimize the fluorochrome panel based on the assessment of the suitability of the fluorochrome panel for use in generating the flow cytometer data. As discussed above, panel optimization algorithms for use in optimizing fluorochrome panels include, but are not limited to, constrained optimization methods. In some embodiments, the processor is configured to produce a visualization of the assessed suitability of the fluorochrome panel for use in generating the flow cytometer data. For example, embodiments of the visualization highlight fluorochromes in the fluorochrome panel that would be associated with variance in the flow cytometer data generated using that fluorochrome panel. In some embodiments, the visualization includes a plot of flow cytometer data that is simulated based on a given fluorochrome panel. Put another way, the visualization would include exemplary flow cytometer data that would be produced if a sample were run on a particular instrument with a particular fluorochrome panel. In additional versions, the visualization includes a table or a matrix quantifying the extent to which fluorochromes in the fluorochrome panel are associated with (e.g., contribute to and/or affected by) variance. In some such embodiments, the system includes a display configured to portray the visualization. Any suitable display may be employed. The subject display may include, but is not limited to, a monitor, a tablet computer, a smartphone, or other electronic device configured to present graphical interfaces.

The subject programmable logic may be implemented in any of a variety of devices such as specifically programmed event processing computers, wireless communication devices, integrated circuit devices, or the like. In some embodiments, the programmable logic may be executed by a specifically programmed processor, which may include one or more processors, such as one or more digital signal processors (DSPs), configurable microprocessors, application specific integrated circuits (ASICs), field programmable gate arrays (FPGAs), or other equivalent integrated or discrete logic circuitry. A combination of computing devices, e.g., a combination of a DSP and a microprocessor, a plurality of microprocessors, one or more microprocessors in conjunction with a DSP core, or any other such configuration in at least partial data connectivity may implement one or more of the features described herein.

In certain instances, the system is or includes a particle analyzer. Particle analyzers of interest may include a flow cell for transporting particles in a flow stream, a light source for irradiating the particles in the flow stream at an interrogation point, and a particle-modulated light detector for detecting particle-modulated light. In certain embodiments, the particle analyzer is a flow cytometer. In some cases where the particle analyzer is a flow cytometer, said flow cytometer is a full spectrum flow cytometer.

As discussed herein, a "flow cell" is described in its conventional sense to refer to a component, such as a cuvette, containing a flow channel having a liquid flow stream for transporting particles in a sheath fluid. Cuvettes of interest include containers having a passage running therethrough. The flow stream may include a liquid sample injected from a sample tube. Flow cells of interest include a light-accessible flow channel. In some instances, the flow cell includes transparent material (e.g., quartz) that permits the passage of light therethrough. In some embodiments, the flow cell is a stream-in-air flow cell in which light interrogation of the particles occurs outside of the flow cell (i.e., in free space).

In some cases, the flow stream is configured for irradiation with light from a light source at an interrogation point. The flow stream for which the flow channel is configured may include a liquid sample injected from a sample tube. In certain embodiments, the flow stream may include a narrow, rapidly flowing stream of liquid that is arranged such that linearly segregated particles transported therein are separated from each other in a single-file manner. The "interrogation point" discussed herein refers to a region within the flow cell in which the particle is irradiated by light from the light source, e.g., for analysis. The size of the interrogation point may vary as desired. For example, where 0 μm represents the axis of light emitted by the light source, the interrogation point may range from −100 μm to 100 μm, such as −50 μm to 50 μm, such as −25 μm to 40 μm, and including −15 μm to 30 μm.

After particles are irradiated in the flow cell, particle-modulated light may be observed. By "particle-modulated light" it is meant light that is received from the particles in the flow stream following the irradiation of the particles with light from the light source. In some cases, the particle-modulated light is side-scattered light. As discussed herein, side-scattered light refers to light refracted and reflected from the surfaces and internal structures of the particle. In additional embodiments, the particle-modulated light includes forward-scattered light (i.e., light that travels through or around the particle in mostly a forward direction). In still other cases, the particle-modulated light includes fluorescent light (i.e., light emitted from a fluorochrome following irradiation with excitation wavelength light).

As discussed above, aspects of the invention also include a light source configured to irradiate particles passing through the flow cell at an interrogation point. Any convenient light source may be employed as the light source described herein. In some embodiments, the light source is a laser. In embodiments, the laser may be any convenient laser, such as a continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject flow cytometers include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject flow cytometers include a solid-state laser, such as a ruby laser, an Nd:YAG laser, NdCrYAG laser, Er:YAG laser, Nd:YLF laser, Nd:$YVO_4$ laser, Nd:$YCa_4O(BO_3)_3$ laser, Nd:YCOB laser, titanium sapphire laser, thulim YAG laser, ytterbium YAG laser, ytterbium$_2O_3$ laser or cerium doped lasers and combinations thereof.

Laser light sources according to certain embodiments may also include one or more optical adjustment components. In certain embodiments, the optical adjustment component is located between the light source and the flow cell, and may include any device that is capable of changing the spatial width of irradiation or some other characteristic of irradiation from the light source, such as for example, irradiation direction, wavelength, beam width, beam intensity and focal spot. Optical adjustment protocols may include any convenient device which adjusts one or more characteristics of the light source, including but not limited to lenses, mirrors, filters, fiber optics, wavelength separators, pinholes, slits, collimating protocols and combinations thereof. In certain embodiments, flow cytometers of interest include one or more focusing lenses. The focusing lens, in one example, may be a de-magnifying lens. In still other embodiments, flow cytometers of interest include fiber optics.

Where the optical adjustment component is configured to move, the optical adjustment component may be configured to be moved continuously or in discrete intervals, such as for example in 0.01 μm or greater increments, such as 0.05 μm or greater, such as 0.1 μm or greater, such as 0.5 μm or greater such as 1 μm or greater, such as 10 μm or greater, such as 100 μm or greater, such as 500 μm or greater, such as 1 mm or greater, such as 5 mm or greater, such as 10 mm or greater and including 25 mm or greater increments.

Any displacement protocol may be employed to move the optical adjustment component structures, such as coupled to a moveable support stage or directly with a motor actuated translation stage, leadscrew translation assembly, geared translation device, such as those employing a stepper motor, servo motor, brushless electric motor, brushed DC motor, micro-step drive motor, high resolution stepper motor, among other types of motors.

The light source may be positioned any suitable distance from the flow cell, such as where the light source and the flow cell are separated by 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source may be positioned at any suitable angle relative to the flow cell, such as at an angle ranging from 10 degrees to 90 degrees, such as from 15 degrees to 85 degrees, such as from 20 degrees to 80 degrees, such as from 25 degrees to 75 degrees and including from 30 degrees to 60 degrees, for example at a 90 degree angle.

In some embodiments, light sources of interest include a plurality of lasers configured to provide laser light for discrete irradiation of the flow stream, such as 2 lasers or more, such as 3 lasers or more, such as 4 lasers or more, such as 5 lasers or more, such as 10 lasers or more, and including 15 lasers or more configured to provide laser light for discrete irradiation of the flow stream. Depending on the desired wavelengths of light for irradiating the flow stream, each laser may have a specific wavelength that varies from 200 nm to 1500 nm, such as from 250 nm to 1250 nm, such as from 300 nm to 1000 nm, such as from 350 nm to 900 nm and including from 400 nm to 800 nm. In certain embodiments, lasers of interest may include one or more of a 405 nm laser, a 488 nm laser, a 561 nm laser and a 635 nm laser.

As discussed above, particle analyzers of interest may further include one or more particle-modulated light detectors for detecting particle-modulated light intensity data. In some embodiments, the particle-modulated light detector(s) include one or more forward-scattered light detectors configured to detect forward-scattered light. For example, the subject particle analyzers may include 1 forward-scattered light detector or multiple forward-scattered light detectors, such as 2 or more, such as 3 or more, such as 4 or more, and including 5 or more. In certain embodiments, particle analyzers include 1 forward-scattered light detector. In other embodiments, particle analyzers include 2 forward-scattered light detectors.

Any convenient detector for detecting collected light may be used in the forward-scattered light detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from 0.1 $cm^2$ to 8 $cm^2$, such as from 0.5 $cm^2$ to 7 $cm^2$ and including from 1 $cm^2$ to 5 $cm^2$.

In embodiments, the forward-scattered light detector is configured to measure light continuously or in discrete intervals. In some instances, detectors of interest are configured to take measurements of the collected light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In additional embodiments, the one or more particle-modulated light detector(s) may include one or more side-scattered light detectors for detecting side-scatter wavelengths of light (i.e., light refracted and reflected from the surfaces and internal structures of the particle). In some embodiments, particle analyzers include a single side-scattered light detector. In other embodiments, particle analyzers include multiple side-scattered light detectors, such as 2 or more, such as 3 or more, such as 4 or more, and including 5 or more.

Any convenient detector for detecting collected light may be used in the side-scattered light detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from 0.1 $cm^2$ to 8 $cm^2$, such as from 0.5 $cm^2$ to 7 $cm^2$ and including from 1 $cm^2$ to 5 $cm^2$.

In embodiments, the subject particle analyzers also include a fluorescent light detector configured to detect one or more fluorescent wavelengths of light. In other embodiments, particle analyzers include multiple fluorescent light detectors such as 2 or more, such as 3 or more, such as 4 or more, 5 or more, 10 or more, 15 or more, and including 20 or more.

Any convenient detector for detecting collected light may be used in the fluorescent light detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

Where the subject particle analyzers include multiple fluorescent light detectors, each fluorescent light detector may be the same, or the collection of fluorescent light detectors may be a combination of different types of detectors. For example, where the subject particle analyzers include two fluorescent light detectors, in some embodiments the first fluorescent light detector is a CCD-type device and the second fluorescent light detector (or imaging sensor) is a CMOS-type device. In other embodiments, both the first and second fluorescent light detectors are CCD-type devices. In yet other embodiments, both the first and second fluorescent light detectors are CMOS-type devices. In still other embodiments, the first fluorescent light detector is a CCD-type device and the second fluorescent light detector is a photomultiplier tube (PMT). In still other embodiments, the first fluorescent light detector is a CMOS-type device and the second fluorescent light detector is a photomultiplier tube. In yet other embodiments, both the first and second fluorescent light detectors are photomultiplier tubes.

In embodiments of the present disclosure, fluorescent light detectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths. In some embodiments, 2 or more detectors in the particle analyzers as described herein are configured to measure the same or overlapping wavelengths of collected light.

In some embodiments, fluorescent light detectors of interest are configured to measure collected light over a range of wavelengths (e.g., 200 nm-1000 nm). In certain embodiments, detectors of interest are configured to collect spectra of light over a range of wavelengths. For example, particle analyzers may include one or more detectors configured to collect spectra of light over one or more of the wavelength ranges of 200 nm-1000 nm. In yet other embodiments, detectors of interest are configured to measure light emitted by a sample in the flow stream at one or more specific wavelengths. For example, particle analyzers may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, one or more detectors may be configured to be paired with specific fluorophores, such as those used with the sample in a fluorescence assay.

In some embodiments, particle analyzers include one or more wavelength separators positioned between the flow cell and the particle-modulated light detector(s). The term "wavelength separator" is used herein in its conventional sense to refer to an optical component that is configured to separate light collected from the sample into predetermined spectral ranges. In some embodiments, particle analyzers include a single wavelength separator. In other embodiments, particle analyzers include a plurality of wavelength separators, such as 2 or more wavelength separators, such as 3 or more, such as 4 or more, such as 5 or more, such as 6 or more, such as 7 or more, such as 8 or more, such as 9 or more, such as 10 or more, such as 15 or more, such as 25 or more, such as 50 or more, such as 75 or more and including 100 or more wavelength separators. In some embodiments, the wavelength separator is configured to separate light collected from the sample into predetermined spectral ranges by passing light having a predetermined spectral range and reflecting one or more remaining spectral ranges of light. In other embodiments, the wavelength separator is configured to separate light collected from the sample into predetermined spectral ranges by passing light having a predetermined spectral range and absorbing one or more remaining spectral ranges of light. In yet other embodiments, the wavelength separator is configured to spatially diffract light collected from the sample into predetermined spectral ranges. Each wavelength separator may be any convenient light separation protocol, such as one or more dichroic mirrors, bandpass filters, diffraction gratings, beam splitters or prisms. In some embodiments, the wavelength separator is a prism. In other embodiments, the wavelength separator is a diffraction grating. In certain embodiments, wavelength separators in the subject light detection systems are dichroic mirrors.

Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry,* 3rd ed., Wiley-Liss (1995); Virgo, et al. (2012) *Ann Clin Biochem. January;* 49(pt 1):17-28; Linden, et. al., *Semin Throm Hemost.* 2004 October; 30(5): 502-11; Alison, et al. *J Pathol,* 2010 December; 222(4):335-344; and Herbig, et al. (2007) *Crit Rev Ther Drug Carrier Syst.* 24(3):203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

In certain instances, flow cytometry systems of the invention are configured for imaging particles in a flow stream by fluorescence imaging using radiofrequency tagged emission (FIRE), such as those described in Diebold, et al. *Nature Photonics* Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

Figure 9:
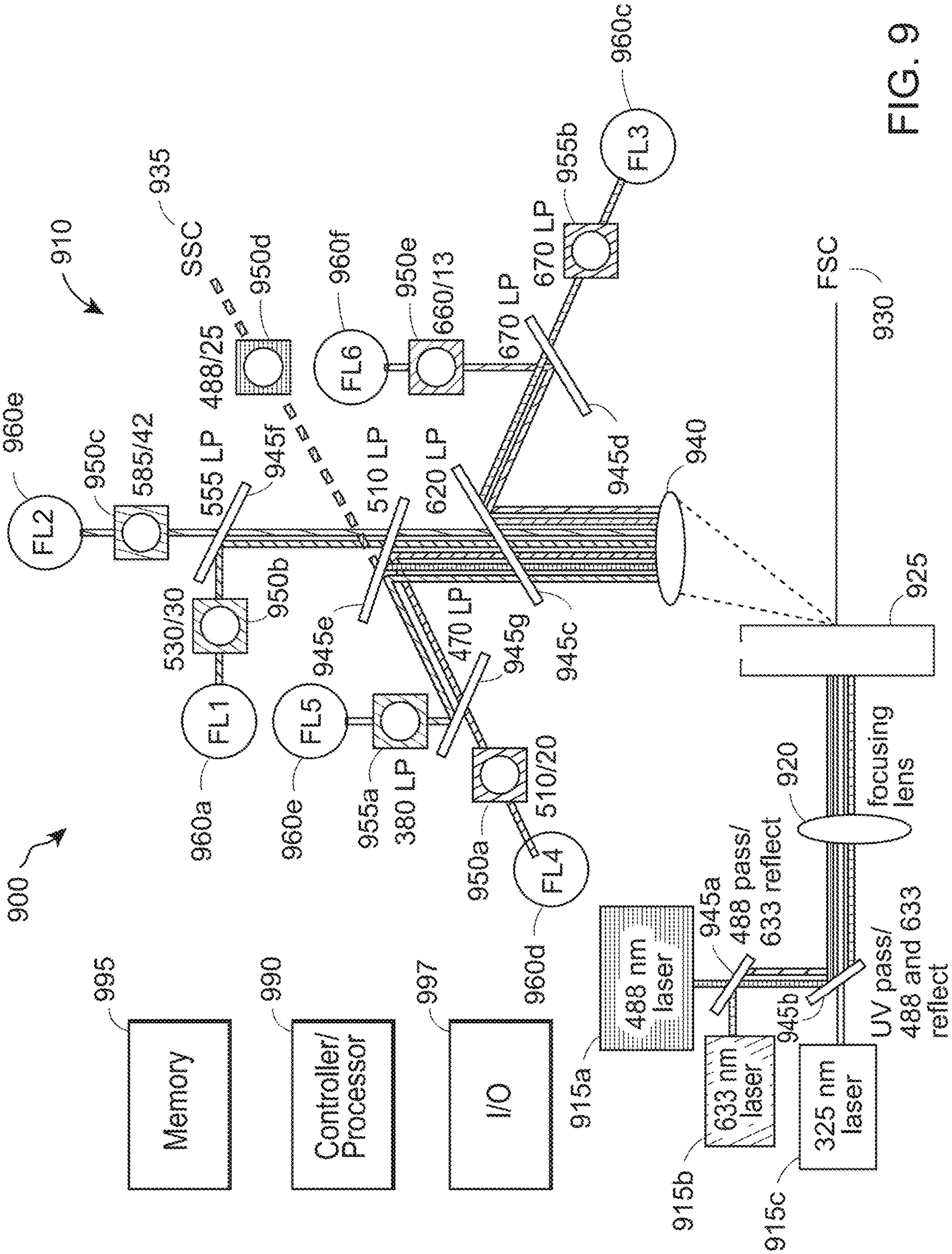
FIG. 9 depicts a functional block diagram of a flow cytometric system according to certain embodiments.

FIG. 9 shows a system 900 for flow cytometry in accordance with an illustrative embodiment of the present invention. The system 900 includes a flow cytometer 910, a controller/processor 990 and a memory 995. The flow cytometer 910 includes one or more excitation lasers 915*a*-915*c*, a focusing lens 920, a flow chamber 925, a forward-scatter detector 930, a side-scatter detector 935, a fluorescence collection lens 940, one or more beam splitters

945*a*-945*g*, one or more bandpass filters 950*a*-950*e*, one or more longpass ("LP") filters 955*a*-955*b*, and one or more fluorescent detectors 960*a*-960*f*.

The excitation lasers 915*a-c* emit light in the form of a laser beam. The wavelengths of the laser beams emitted from excitation lasers 915*a*-915*c* are 488 nm, 633 nm, and 325 nm, respectively, in the example system of FIG. 9. The laser beams are first directed through one or more of beam splitters 945*a* and 945*b*. Beam splitter 945*a* transmits light at 488 nm and reflects light at 633 nm. Beam splitter 945*b* transmits UV light (light with a wavelength in the range of 10 to 400 nm) and reflects light at 488 nm and 633 nm.

The laser beams are then directed to a focusing lens 920, which focuses the beams onto the portion of a fluid stream where particles of a sample are located, within the flow chamber 925. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward-scatter detector 930, the side-scatter detector 935, and the one or more fluorescent detectors 960*a*-960*f* through one or more of the beam splitters 945*c*-945*g*, the bandpass filters 950*a*-950*e*, the longpass filters 955*a*-955*b*, and the fluorescence collection lens 940.

The fluorescence collection lens 940 collects light emitted from the particle-laser beam interaction and routes that light towards one or more beam splitters and filters. Bandpass filters, such as bandpass filters 950*a*-950*e*, allow a narrow range of wavelengths to pass through the filter. For example, bandpass filter 950*a* is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 955*a*-955*b*, transmit wavelengths of light equal to or longer than a specified wavelength of light. For example, longpass filter 955*b*, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

The forward-scatter detector 930 is positioned slightly off axis from the direct beam through the flow cell and is configured to detect diffracted light, the excitation light that travels through or around the particle in mostly a forward direction. The intensity of the light detected by the forward-scatter detector is dependent on the overall size of the particle. The forward-scatter detector can include a photodiode. The side-scatter detector 935 is configured to detect refracted and reflected light from the surfaces and internal structures of the particle that tends to increase with increasing particle complexity of structure. The fluorescence emissions from fluorescent molecules associated with the particle can be detected by the one or more fluorescent detectors 960*a*-960*f*. The side-scatter detector 935 and fluorescent detectors can include photomultiplier tubes. The signals detected at the forward-scatter detector 930, the side-scatter detector 935 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 9, but can include any flow cytometer known in the art. For example, a flow cytometer may have any number of lasers, beam splitters, filters, and detectors at various wavelengths and in various different configurations.

In operation, cytometer operation is controlled by a controller/processor 990, and the measurement data from the detectors can be stored in the memory 995 and processed by the controller/processor 990. Although not shown explicitly, the controller/processor 990 is coupled to the detectors to receive the output signals therefrom, and may also be coupled to electrical and electromechanical components of the flow cytometer 910 to control the lasers, fluid flow parameters, and the like. Input/output (I/O) capabilities 997 may be provided also in the system. The memory 995, controller/processor 990, and 1/O 997 may be entirely provided as an integral part of the flow cytometer 910. In such an embodiment, a display may also form part of the I/O capabilities 997 for presenting experimental data to users of the cytometer 910. Alternatively, some or all of the memory 995 and controller/processor 990 and 1/O capabilities may be part of one or more external devices such as a general purpose computer. In some embodiments, some or all of the memory 995 and controller/processor 990 can be in wireless or wired communication with the cytometer 910. The controller/processor 990 in conjunction with the memory 995 and the I/O 997 can be configured to perform various functions related to the preparation and analysis of a flow cytometer experiment.

The system illustrated in FIG. 9 includes six different detectors that detect fluorescent light in six different wavelength bands (which may be referred to herein as a "filter window" for a given detector) as defined by the configuration of filters and/or splitters in the beam path from the flow cell 925 to each detector. Different fluorescent molecules in a fluorochrome panel used for a flow cytometer experiment will emit light in their own characteristic wavelength bands. The particular fluorescent labels used for an experiment and their associated fluorescent emission bands may be selected to generally coincide with the filter windows of the detectors. The I/O 997 can be configured to receive data regarding a flow cytometer experiment having a panel of fluorescent labels and a plurality of cell populations having a plurality of markers, each cell population having a subset of the plurality of markers. The I/O 997 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 995. The controller/processor 990 can be configured to evaluate one or more assignments of labels to markers.

In some embodiments, the subject systems are particle sorting systems that are configured to sort particles with an enclosed particle sorting module, such as those described in U.S. Patent Publication No. 2017/0299493, filed on Mar. 28, 2017, the disclosure of which is incorporated herein by reference. In certain embodiments, particles (e.g., cells) of the sample are sorted using a sort decision module having a plurality of sort decision units, such as those described in U.S. Patent Publication No. 2020/0256781, filed on Dec. 23, 2019, the disclosure of which is incorporated herein by reference. In some embodiments, systems for sorting components of a sample include a particle sorting module having deflection plates, such as described in U.S. Patent Publication No. 2017/0299493, filed on Mar. 28, 2017, the disclosure of which is incorporated herein by reference.

Figure 10:
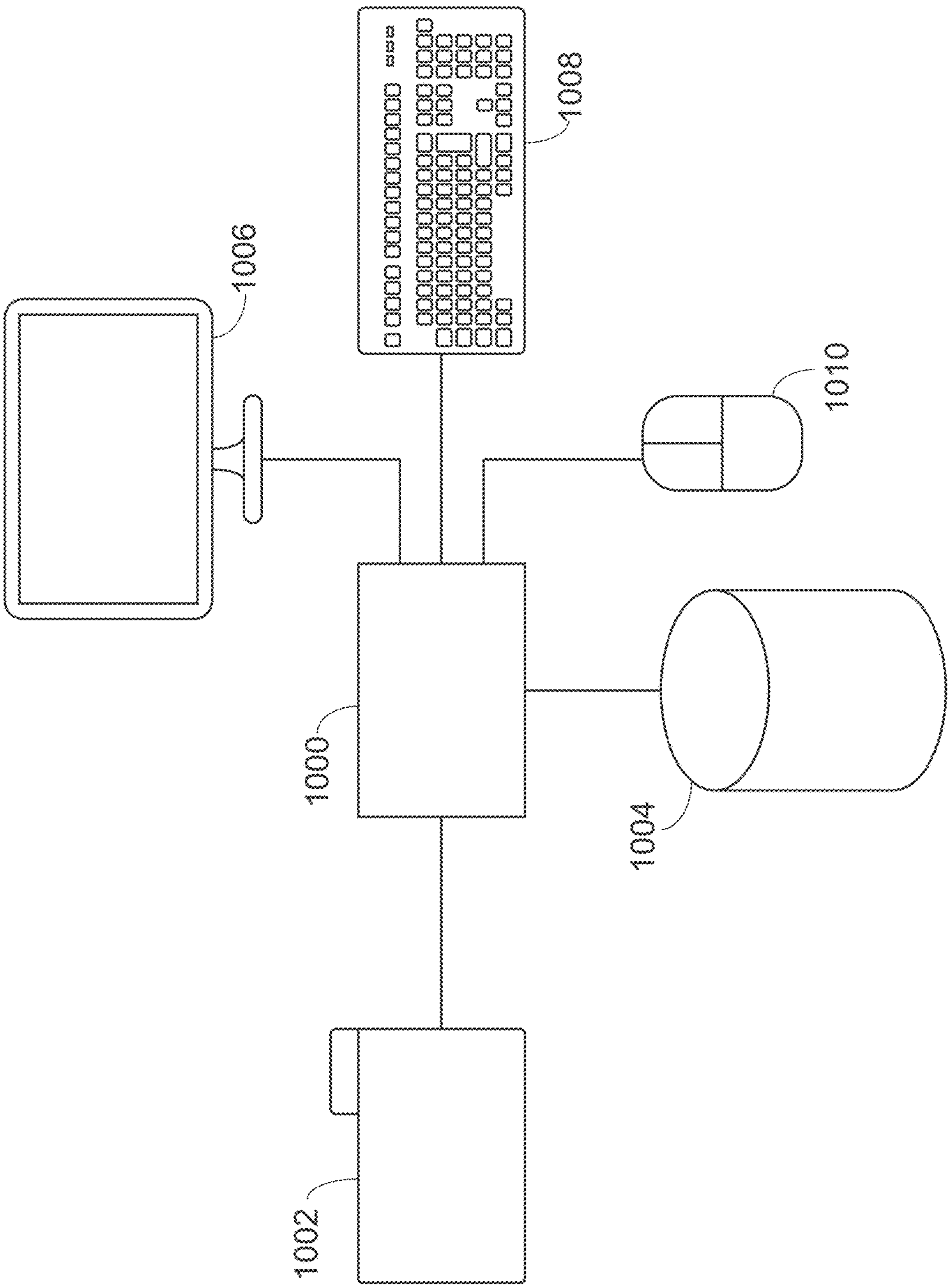
FIG. 10 depicts a control system according to certain embodiments.

FIG. 10 shows a functional block diagram for one example of a control system, such as a processor 1000, for analyzing and displaying biological events. A processor 1000 can be configured to implement a variety of processes for controlling graphic display of biological events.

A flow cytometer or sorting system 1002 can be configured to acquire biological event data. For example, a flow cytometer can generate flow cytometric event data (e.g., particle-modulated light data). The flow cytometer 1002 can be configured to provide biological event data to the processor 1000. A data communication channel can be included between the flow cytometer 1002 and the processor 1000. The biological event data can be provided to the processor 1000 via the data communication channel.

The processor 1000 can be configured to receive biological event data from the flow cytometer 1002. The biological event data received from the flow cytometer 1002 can include flow cytometric event data. The processor 1000 can be configured to provide a graphical display including a first plot of biological event data to a display device 1006. The processor 1000 can be further configured to render a region of interest as a gate (e.g., a first gate) around a population of biological event data shown by the display device 1006, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The processor 1000 can be further configured to display the biological event data on the display device 1006 within the gate differently from other events in the biological event data outside of the gate. For example, the processor 1000 can be configured to render the color of biological event data contained within the gate to be distinct from the color of biological event data outside of the gate. The display device 1006 can be implemented as a monitor, a tablet computer, a smartphone, or other electronic device configured to present graphical interfaces.

The processor 1000 can be configured to receive a gate selection signal identifying the gate from a first input device. For example, the first input device can be implemented as a mouse 1010. The mouse 1010 can initiate a gate selection signal to the processor 1000 identifying the gate to be displayed on or manipulated via the display device 1006 (e.g., by clicking on or in the desired gate when the cursor is positioned there). In some implementations, the first device can be implemented as the keyboard 1008 or other means for providing an input signal to the processor 1000 such as a touchscreen, a stylus, an optical detector, or a voice recognition system. Some input devices can include multiple inputting functions. In such implementations, the inputting functions can each be considered an input device. For example, as shown in FIG. 10, the mouse 1010 can include a right mouse button and a left mouse button, each of which can generate a triggering event.

The triggering event can cause the processor 1000 to alter the manner in which the data is displayed, which portions of the data is actually displayed on the display device 1006, and/or provide input to further processing such as selection of a population of interest for particle sorting.

In some embodiments, the processor 1000 can be configured to detect when gate selection is initiated by the mouse 1010. The processor 1000 can be further configured to automatically modify plot visualization to facilitate the gating process. The modification can be based on the specific distribution of biological event data received by the processor 1000. In some embodiments, the processor 1000 expands the first gate such that a second gate is generated (e.g., as discussed above).

The processor 1000 can be connected to a storage device 1004. The storage device 1004 can be configured to receive and store biological event data from the processor 1000. The storage device 1004 can also be configured to receive and store flow cytometric event data from the processor 1000. The storage device 1004 can be further configured to allow retrieval of biological event data, such as flow cytometric event data, by the processor 1000.

The display device 1006 can be configured to receive display data from the processor 1000. The display data can comprise plots of biological event data and gates outlining sections of the plots. The display device 1006 can be further configured to alter the information presented according to input received from the processor 1000 in conjunction with input from the flow cytometer 1002, the storage device 1004, the keyboard 1008, and/or the mouse 1010.

Processor 1000 may additionally be configured to assess a fluorochrome panel. In such cases, processor 1000 is configured to obtain a fluorochrome panel, an instrument identifier, and a spectral matrix associated with the fluorochrome panel and the instrument identifier. Processor 1000 is also configured to calculate an inverse matrix from the obtained spectral matrix, and identify fluorochromes in the fluorochrome panel that would be associated with variance in flow cytometer data generated using the fluorochrome panel by analyzing the calculated inverse matrix to assess the suitability of the fluorochrome panel for use in generating the flow cytometer data. In certain cases, processor 1000 is also configured to generate a visualization based on the assessment of the fluorochrome panel. This visualization may, in some cases, be shown on display device 1006.

In some implementations the processor 1000 can generate a user interface to receive example events for sorting. For example, the user interface can include a mechanism for receiving example events or example images. The example events or images or an example gate can be provided prior to collection of event data for a sample or based on an initial set of events for a portion of the sample.

Figure 11A:
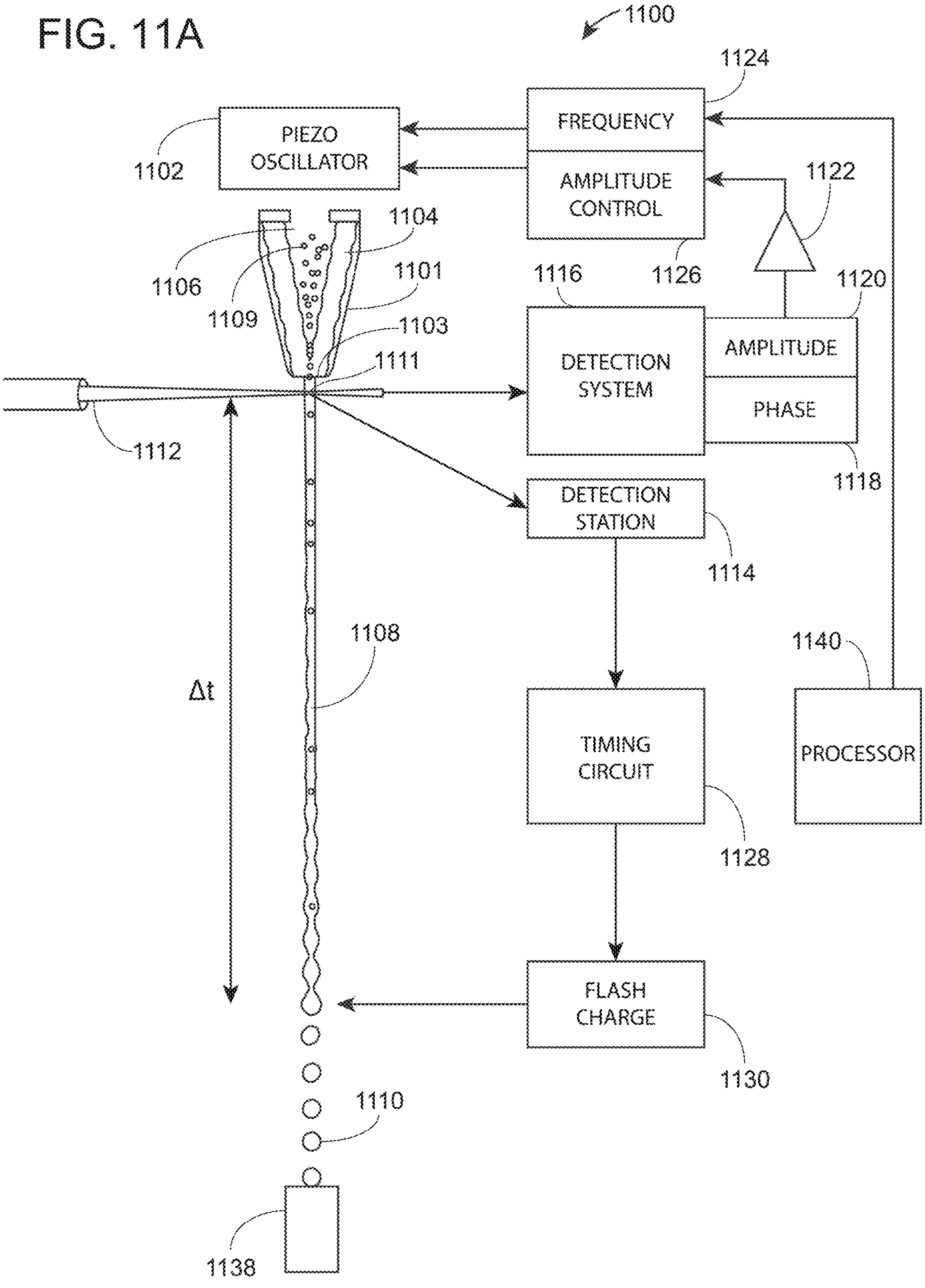
FIG. 11A-11B depict schematic drawings of a particle sorter system according to certain embodiments.

FIG. 11A is a schematic drawing of a particle sorter system 1100 (e.g., the flow cytometer 502) in accordance with one embodiment presented herein. In some embodiments, the particle sorter system 1100 is a cell sorter system. As shown in FIG. 11A, a drop formation transducer 1102 (e.g., piezo-oscillator) is coupled to a fluid conduit 1101, which can be coupled to, can include, or can be, a nozzle 1103. Within the fluid conduit 1101, sheath fluid 1104 hydrodynamically focuses a sample fluid 1106 comprising particles 1109 into a moving fluid column 1108 (e.g., a stream). Within the moving fluid column 1108, particles 1109 (e.g., cells) are lined up in single file to cross a monitored area 1111 (e.g., where laser-stream intersect), irradiated by an irradiation source 1112 (e.g., a laser). Vibration of the drop formation transducer 1102 causes moving fluid column 1108 to break into a plurality of drops 1110, some of which contain particles 1109.

In operation, a detection station 1114 (e.g., an event detector) identifies when a particle of interest (or cell of interest) crosses the monitored area 1111. Detection station 1114 feeds into a timing circuit 1128, which in turn feeds into a flash charge circuit 1130. At a drop break off point, informed by a timed drop delay (Δt), a flash charge can be applied to the moving fluid column 1108 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 11A, the drops can be collected in a drain receptacle 1138.

A detection system 1116 (e.g., a drop boundary detector) serves to automatically determine the phase of a drop drive signal when a particle of interest passes the monitored area 1111. An exemplary drop boundary detector is described in U.S. Pat. No. 7,679,039, which is incorporated herein by reference in its entirety. The detection system 1116 allows the instrument to accurately calculate the place of each detected particle in a drop. The detection system 1116 can feed into an amplitude signal 1120 and/or phase 1118 signal, which in turn feeds (via amplifier 1122) into an amplitude control circuit 1126 and/or frequency control circuit 1124. The amplitude control circuit 1126 and/or frequency control circuit 1124, in turn, controls the drop formation transducer 1102. The amplitude control circuit 1126 and/or frequency control circuit 1124 can be included in a control system.

In some implementations, sort electronics (e.g., the detection system 1116, the detection station 1114 and a processor 1140) can be coupled with a memory configured to store the detected events and a sort decision based thereon. The sort decision can be included in the event data for a particle. In some implementations, the detection system 1116 and the detection station 1114 can be implemented as a single detection unit or communicatively coupled such that an event measurement can be collected by one of the detection system 1116 or the detection station 1114 and provided to the non-collecting element.

Figure 11B:
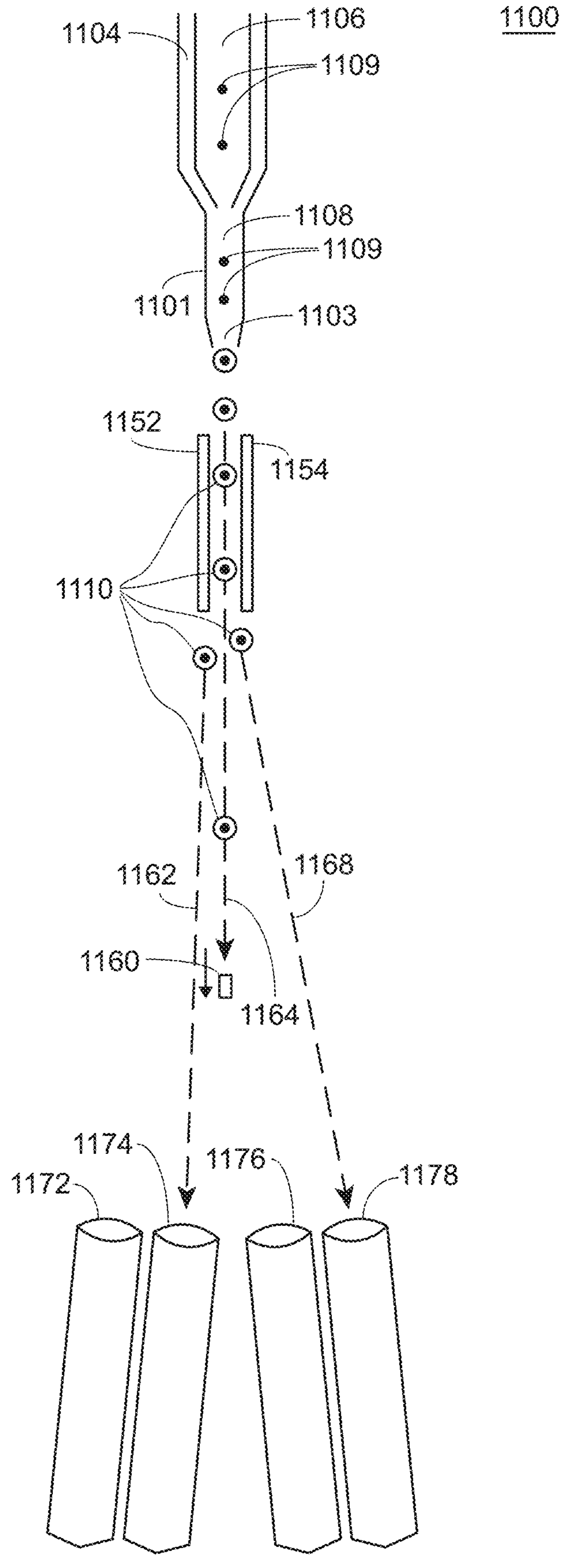

FIG. 11B is a schematic drawing of a particle sorter system, in accordance with one embodiment presented herein. The particle sorter system 1100 shown in FIG. 11B, includes deflection plates 1152 and 1154. A charge can be applied via a stream-charging wire in a barb. This creates a stream of droplets 1110 containing particles 1109 for analysis. The particles can be illuminated with one or more light sources (e.g., lasers) to generate light scatter and fluorescence information. The information for a particle is analyzed such as by sorting electronics or other detection system (not shown in FIG. 111B). The deflection plates 1152 and 1154 can be independently controlled to attract or repel the charged droplet to guide the droplet toward a destination collection vessel (e.g., one of 1172, 1174, 1176, or 1178). As shown in FIG. 11B, the deflection plates 1152 and 1154 can be controlled to direct a particle along a first path 1162 toward the vessel 1174 or along a second path 1168 toward the vessel 1178. If the particle is not of interest (e.g., does not exhibit scatter or illumination information within a specified sort range), deflection plates may allow the particle to continue along a flow path 1164. Such uncharged droplets may pass into a waste receptacle such as via aspirator 1170.

The sorting electronics can be included to initiate collection of measurements, receive fluorescence signals for particles, and determine how to adjust the deflection plates to cause sorting of the particles. Example implementations of the embodiment shown in FIG. 11B include the BD FACSAria™ line of flow cytometers commercially provided by Becton, Dickinson and Company (Franklin Lakes, NJ).

Computer-Readable Storage Media

Aspects of the present disclosure further include non-transitory computer readable storage mediums having instructions for practicing the subject methods. Computer readable storage mediums may be employed on one or more computers for complete automation or partial automation of a system for practicing methods described herein. In certain embodiments, instructions in accordance with the method described herein can be coded onto a computer-readable medium in the form of "programming", where the term "computer readable medium" as used herein refers to any non-transitory storage medium that participates in providing instructions and data to a computer for execution and processing. In some cases, the instructions, when executed, are configured to obtain a fluorochrome panel, an instrument identifier, and a spectral matrix associated with the fluorochrome panel and the instrument identifier. In addition, the instructions are configured to calculate an inverse matrix from the obtained spectral matrix, and identify fluorochromes in the fluorochrome panel that would be associated with variance in flow cytometer data generated using the fluorochrome panel by analyzing the calculated inverse matrix to assess the suitability of the fluorochrome panel for use in generating the flow cytometer data.

Examples of suitable non-transitory storage media include a floppy disk, hard disk, optical disk, magneto-optical disk, CD-ROM, CD-R, magnetic tape, non-volatile memory card, ROM, DVD-ROM, Blue-ray disk, solid state disk, flash drive, and network attached storage (NAS), whether or not such devices are internal or external to the computer. A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Java, Python, Visual Basic, and C++, as well as many others.

In some embodiments, computer readable storage media of interest include a computer program stored thereon, where the computer program when loaded on the computer includes instructions for obtaining a fluorochrome panel, an instrument identifier, and a spectral matrix associated with the fluorochrome panel and the instrument identifier. Instructions are additionally included for calculating an inverse matrix from the obtained spectral matrix, and identifying fluorochromes in the fluorochrome panel that would be associated with variance in flow cytometer data generated using the fluorochrome panel by analyzing the calculated inverse matrix to assess the suitability of the fluorochrome panel for use in generating the flow cytometer data.

Computer Controlled Systems

Aspects of the present disclosure further include computer-controlled systems, where the systems include one or more computers for complete automation or partial automation. In some embodiments, systems include a computer with a computer program stored thereon, where the computer program when loaded on the computer includes instructions for obtaining a fluorochrome panel, an instrument identifier, and a spectral matrix associated with the fluorochrome panel and the instrument identifier. Instructions are additionally included for calculating an inverse matrix from the obtained spectral matrix, and identifying fluorochromes in the fluorochrome panel that would be associated with variance in flow cytometer data generated using the fluorochrome panel by analyzing the calculated inverse matrix to assess the suitability of the fluorochrome panel for use in generating the flow cytometer data.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, Python, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, or a diskette drive. Such types of memory storage devices typically read from, and/or write to, a program storage medium (not shown) such as a compact disk. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, Wi-Fi, infrared, wireless Universal Serial Bus (USB), Ultra-Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, a USB-C port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or Wi-Fi connection to the internet at a Wi-Fi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a workstation, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows® NT®, Windows® XP, Windows® 7, Windows® 8, Windows® 10, iOS®, macOS®, Linux®, Ubuntu®, Fedora®, OS/400©, i5/OS®, IBM i®, Android™, SGI IRIX®, Oracle Solaris® and others.

Figure 12:
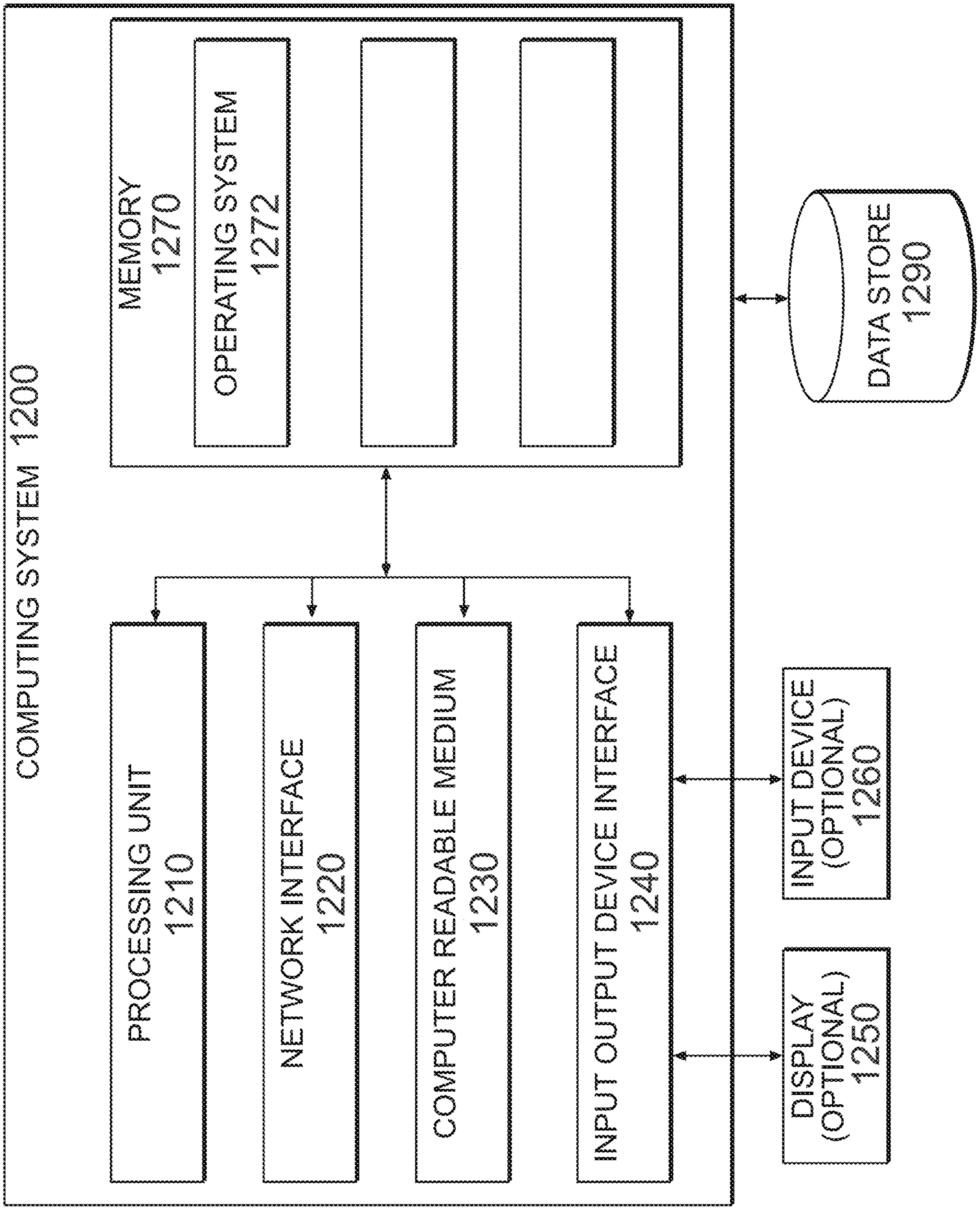
FIG. 12 depicts a block diagram of a computing system according to certain embodiments.

FIG. 12 depicts a general architecture of an example computing device 1200 according to certain embodiments. The general architecture of the computing device 1200 depicted in FIG. 12 includes an arrangement of computer hardware and software components. It is not necessary, however, that all of these generally conventional elements be shown in order to provide an enabling disclosure. As illustrated, the computing device 1200 includes a processing unit 1210, a network interface 1220, a computer readable medium drive 1230, an input/output device interface 1240, a display 1250, and an input device 1260, all of which may communicate with one another by way of a communication bus. The network interface 1220 may provide connectivity to one or more networks or computing systems. The processing unit 1210 may thus receive information and instructions from other computing systems or services via a network. The processing unit 1210 may also communicate to and from memory 1270 and further provide output information for an optional display 1250 via the input/output device interface 1240. For example, an analysis software (e.g., data analysis software or program such as FlowJo®) stored as executable instructions in the non-transitory memory of the analysis system can display the flow cytometry event data to a user. The input/output device interface 1240 may also accept input from the optional input device 1260, such as a keyboard, mouse, digital pen, microphone, touch screen, gesture recognition system, voice recognition system, gamepad, accelerometer, gyroscope, or other input device.

The memory 1270 may contain computer program instructions (grouped as modules or components in some embodiments) that the processing unit 1210 executes in order to implement one or more embodiments. The memory 1270 generally includes RAM, ROM and/or other persistent, auxiliary or non-transitory computer-readable media. The memory 1270 may store an operating system 1272 that provides computer program instructions for use by the processing unit 1210 in the general administration and operation of the computing device 1200. Data may be stored in data storage device 1290. The memory 1270 may further include computer program instructions and other information for implementing aspects of the present disclosure.

Utility

Methods, systems, and computer readable media of the present invention may find use where it is desirable to automatically determine usable sets of fluorochromes for particle analysis (e.g., flow cytometry). In certain cases, the invention particularly finds use in the experimental design for full-spectrum (i.e., "spectral") flow cytometry panels. Put another way, the invention serves as a first step in spectral panel design by specifying whether a set of dyes is usable simultaneously or not. In some instances, methods, systems and computer readable media described herein aid in the determination of which set(s) of fluorochromes are likely to provide the best quality data (e.g., maximum biological resolution). The invention can accomplish the above via an automated optimization algorithm, the use of fluorochromes' spectral signatures as a readily available, easy-to-measure input to the algorithm, and the use of a spectral matrix as a computationally efficient heuristic for optimization.

Embodiments of the invention find use in applications where cells prepared from a biological sample may be desired for research, laboratory testing or for use in therapy. In some embodiments, the subject methods and devices may facilitate obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems may facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Kits

Aspects of the present disclosure further include kits, where kits include instructions and/or programmable logic for carrying out the claimed method. For example, kits include programming configured to assess and optionally optimize a fluorochrome panel (e.g., as described above in the Methods section) such as in the form of a computer readable medium (e.g., flash drive, USB storage, compact disk, DVD, Blu-ray disk, etc.) or instructions for downloading the programming from an internet web protocol or cloud server.

Kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

The following is offered by way of explanation and not by way of limitation:

EXPERIMENTAL

Example 1

Figure 13A:
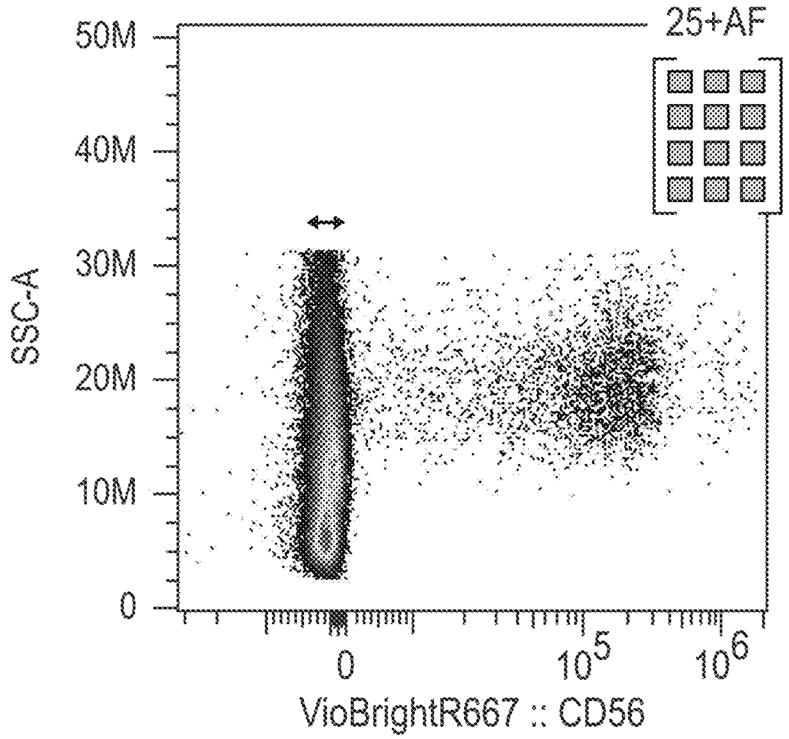
FIG. 13A-13B depict unexpected negative spread in raw flow cytometer data.
Figure 13B:
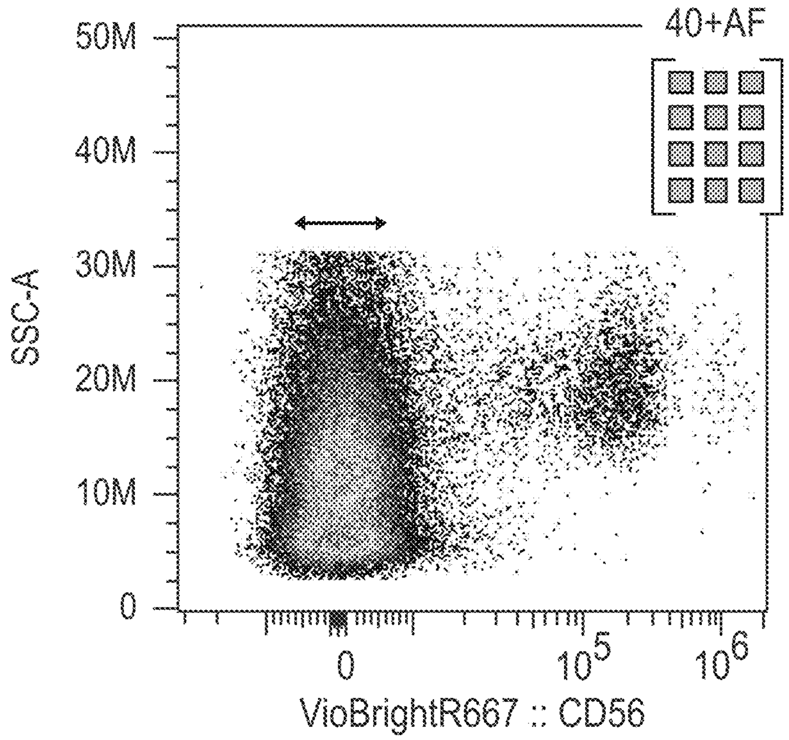
Figure 14A:
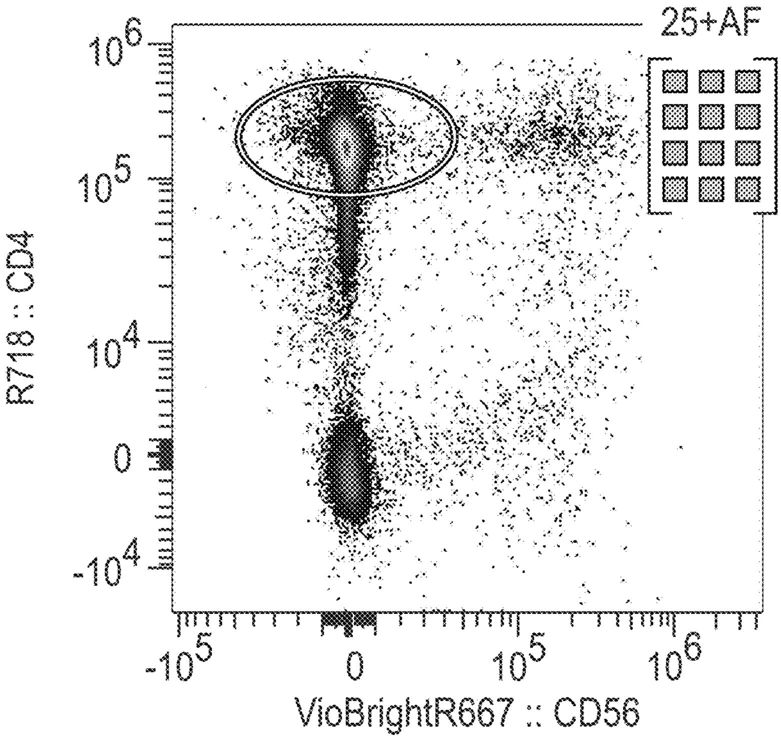
FIG. 14A-14B depict unexpected spillover spreading in raw flow cytometer data.
Figure 14B:
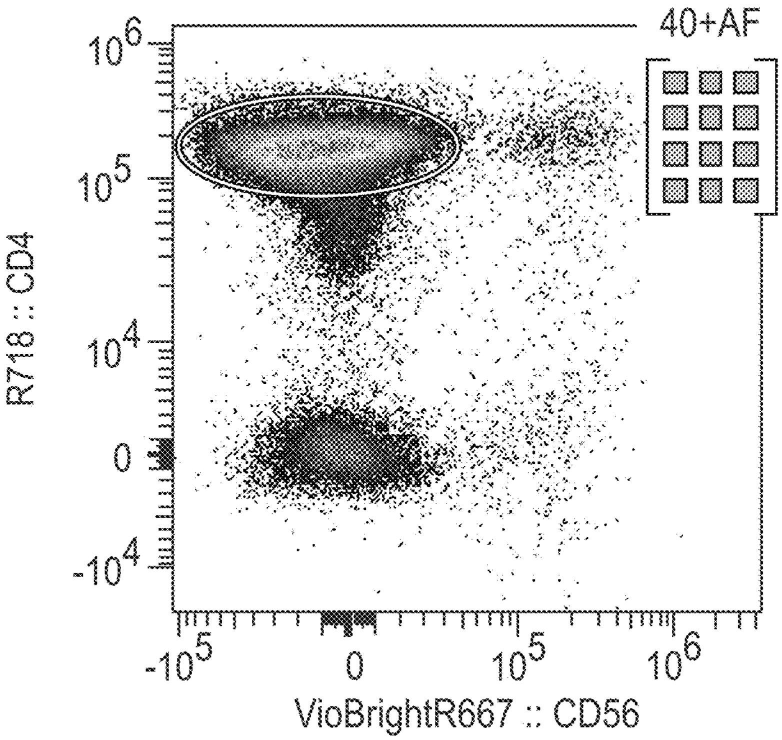
Figure 15A:
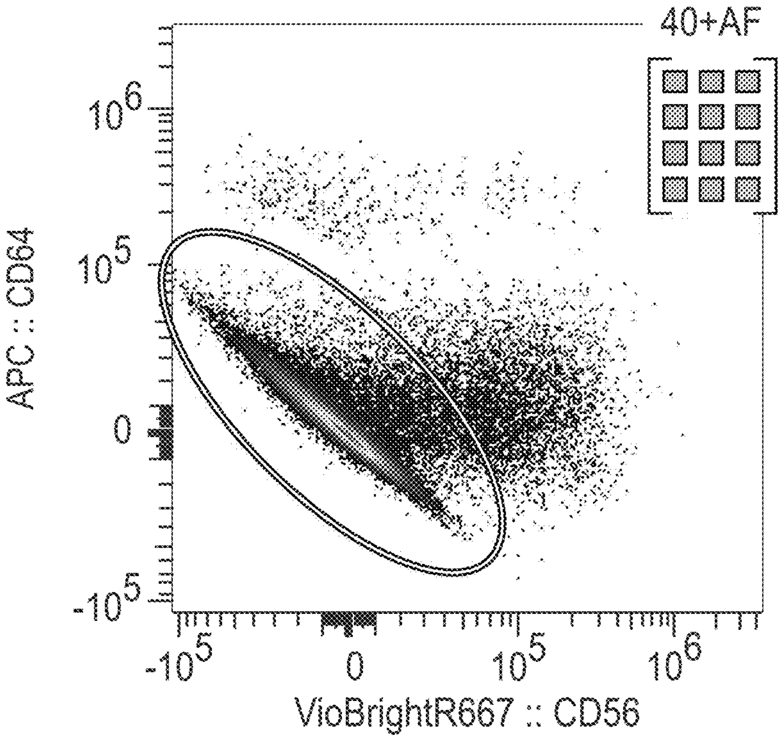
FIG. 15A-15B depict tilted double negative populations in raw flow cytometer data.
Figure 15B:
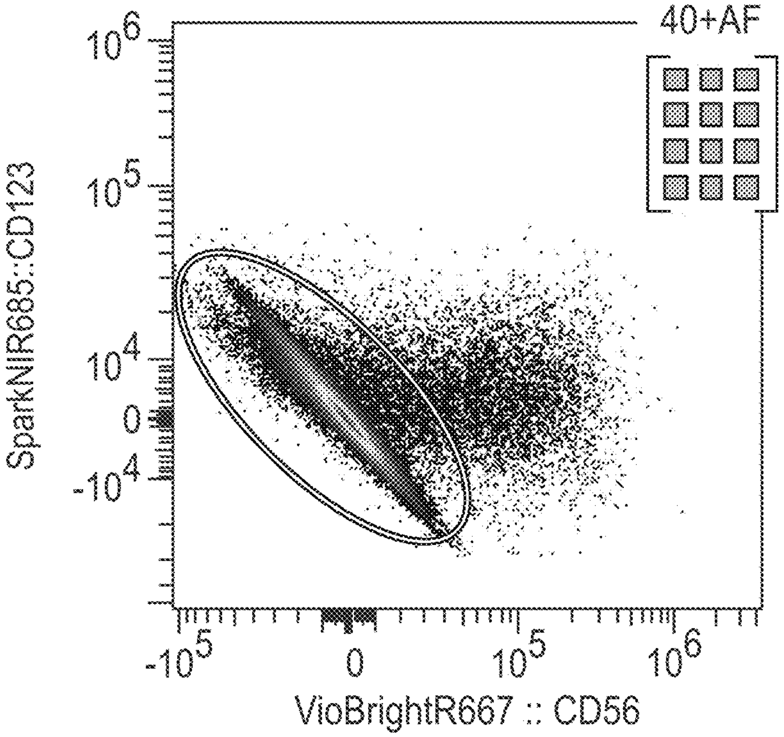

Raw flow cytometer data (VioBrightR667 single-stain control) was investigated for three different types of unmixing-dependent spread 1) unexpected negative spread, 2) unexpected spillover spreading and 3) tilted double negatives. These manifestations of spread all lead to reduced biological resolution in a panel. With respect to 1), the raw data shows substantially higher variance on negative cells in the unmixed VioBrightR667 channel when unmixed with a 40C matrix (FIG. 13B) vs. a 25C matrix (FIG. 13A). With respect to 2), the same raw data shows substantially higher spillover spreading from R718 into VioBrightR667 when unmixed in a 40C panel (FIG. 14B) vs a 25C panel (FIG. 14A). With respect to 3), double-negative populations show extreme degree of negative covariance in the full 40C panel (FIG. 15A-15B), not reflective of true underlying biological expression.

Example 2

A fluorochrome panel was investigated for "hotspots", i.e., fluorochromes having emission spectra that, when employed together in a panel, produce the types of unmixing-dependent spread described above. Hotspots may be located in and around certain "spectral neighborhoods". For example, a fluorochrome may be considered to be in the spectral neighborhood of another fluorochrome if the two fluorochromes have similar spectra such that there is a possibility or likelihood of overlap. Two hotspots were assessed: one in the APC spectral neighborhood (Hotspot 1), and another in the BB700 spectral neighborhood (Hotspot 2). SparkNIR685 and VioR667 are considered to be part of the APC spectral neighborhood, while PerCP and PerCP-Cy5.5 are considered to be part of the BB700 spectral neighborhood. Flow cytometer data plots were sought using combinations of these fluorochromes. With respect to Hotspot 1, flow cytometer data for SparkNIR685/APC, SparkNIR685/VioR667, and APC/VioR667 were obtained. With respect to Hotspot 2, flow cytometer data for BB700/PerCP, BB700/PerCP-Cy5.5, and PerCP/PerCP-Cy5.5 were obtained. This data was obtained using the effects of each pair combined with autofluorescence, a first full panel (39C Panel A), or a second full panel (39C Panel B). These panels are provided below in Table 1.

Figure 16A:
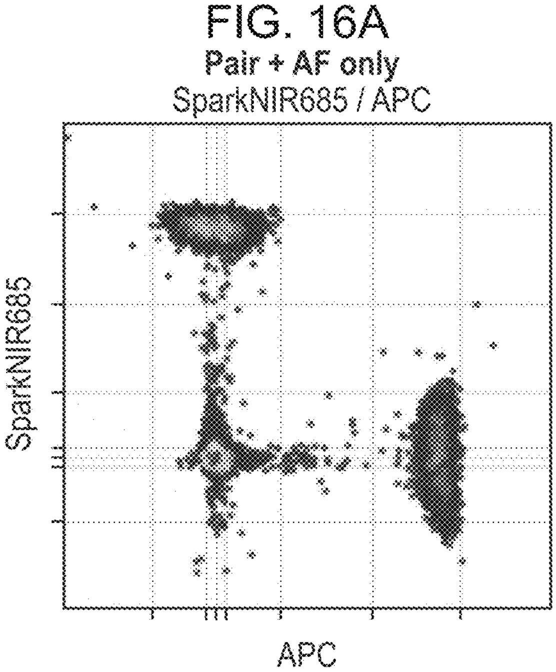
FIG. 16A-16G depict spread "hotspots" in the APC spectral neighborhood that depend on the full set of dyes in a fluorochrome panel.
Figure 16B:
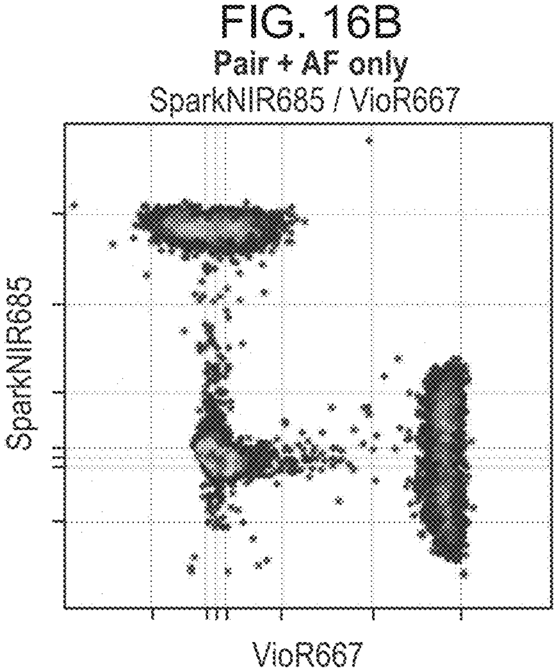
Figure 16C:
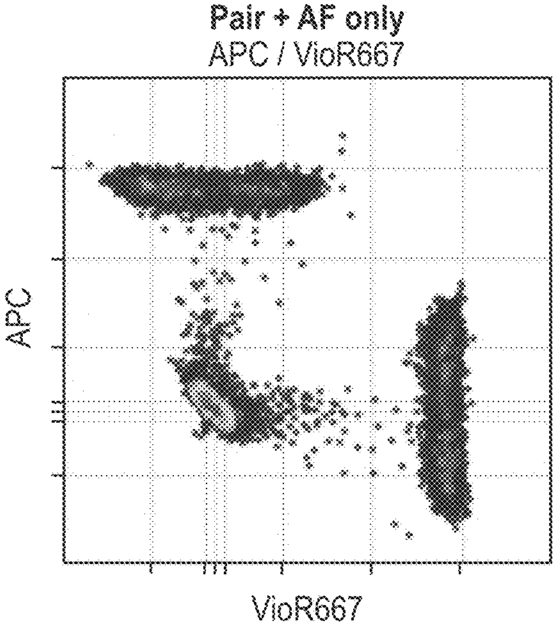
Figure 16D:
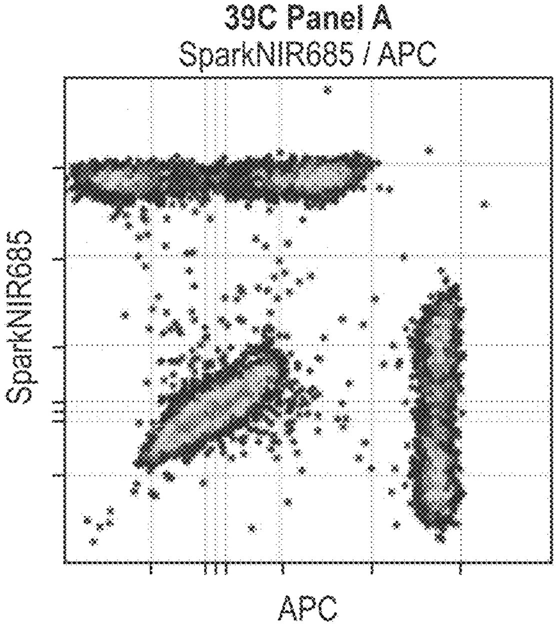
Figure 16E:
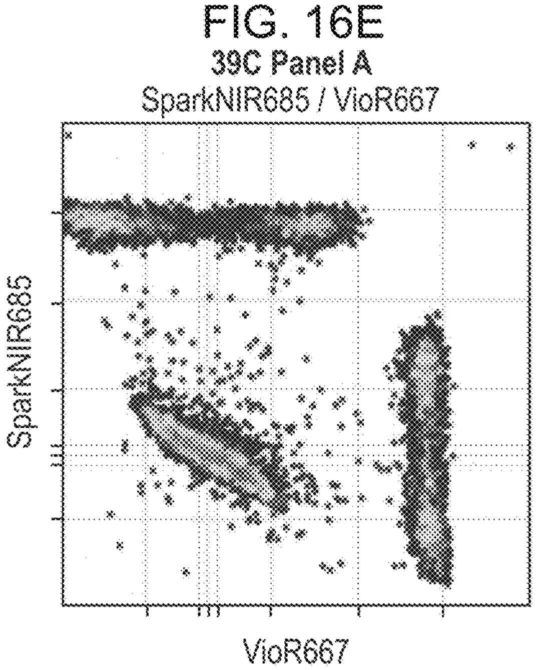
Figure 16F:
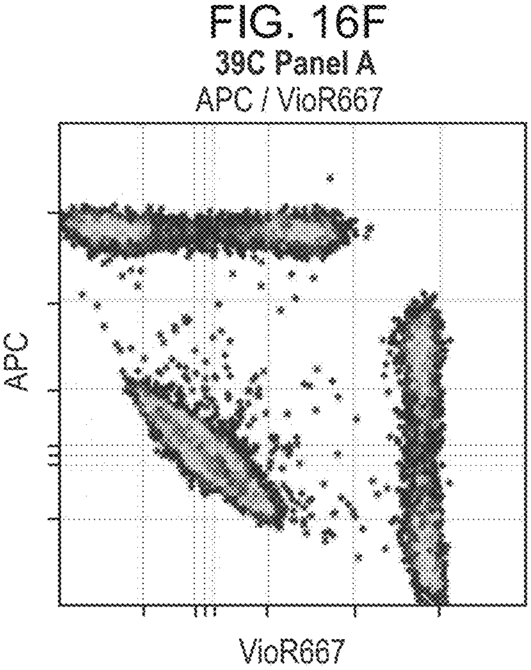
Figure 16G:
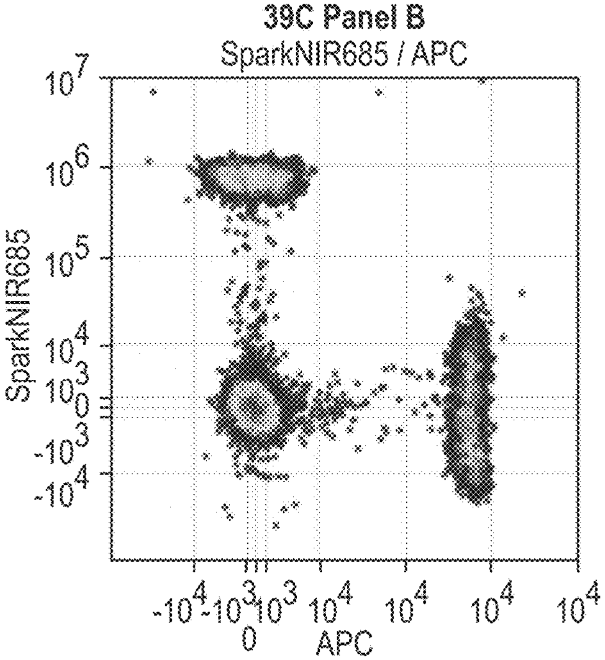

FIG. 16A-16D depict flow cytometer data collected with respect to Hotspot 1. FIG. 16A-16C depict flow cytometer data for SparkNIR685/APC, SparkNIR685/VioR667, and APC/VioR667 fluorophore pairs, respectively, combined with autofluorescence. This data reveals the baseline degree of unmixing-dependent spread in the absence of a full panel. FIG. 16D-16F depict flow cytometer data for SparkNIR685/APC, SparkNIR685/VioR667, and APC/VioR667, respectively, in the context of 39C Panel A. As shown in FIG. 16D-16F, a severe spread hotspot is present in APC's spectral neighborhood. FIG. 16G shows flow cytometer data collected from SparkNIR685/APC in the context of 39C Panel B. Since VioR667 is not in 39C Panel B, flow cytometer data from this fluorochrome was not generated.

Figure 17A:
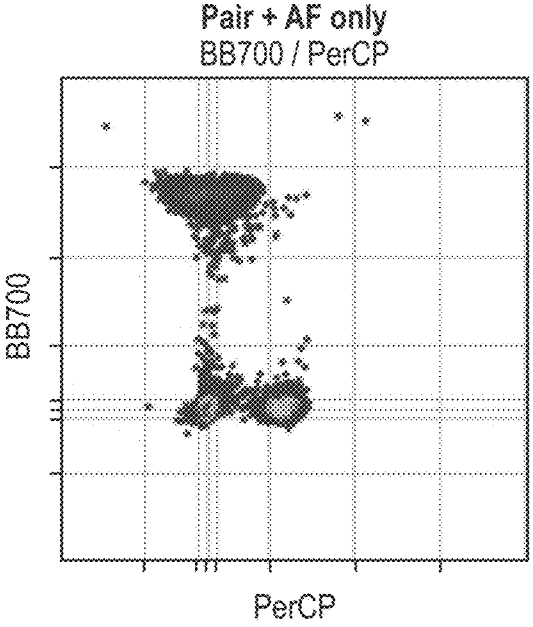
FIG. 17A-17G depict spread "hotspots" in the BB700 spectral neighborhood that depend on the full set of dyes in a fluorochrome panel.
Figure 17B:
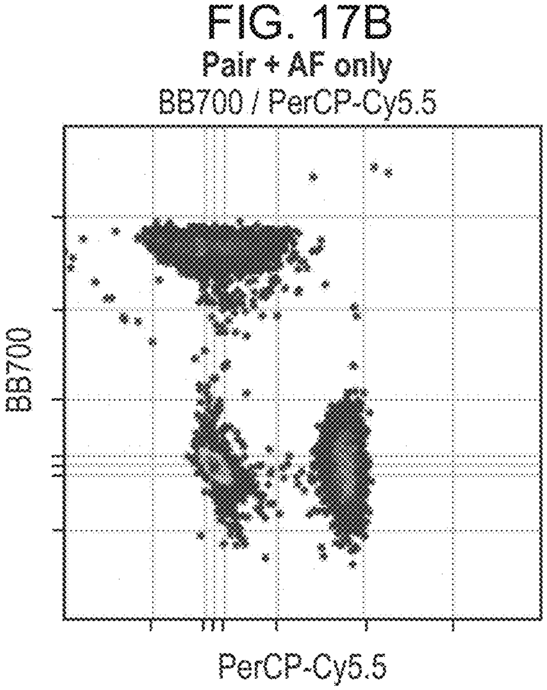
Figure 17C:
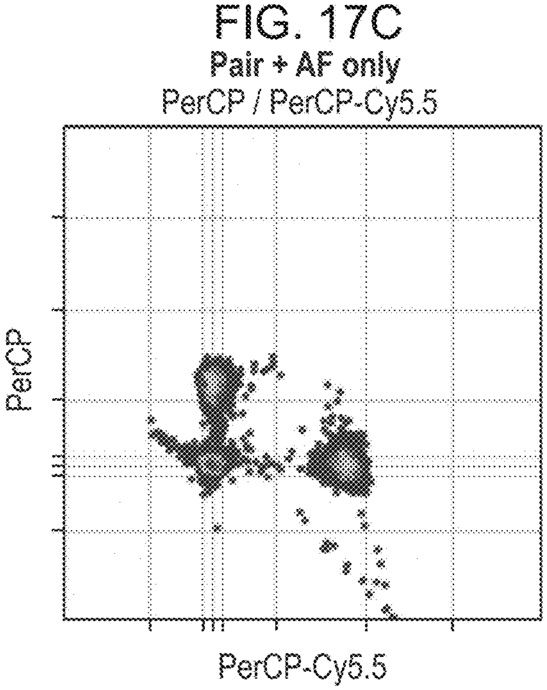
Figure 17D:
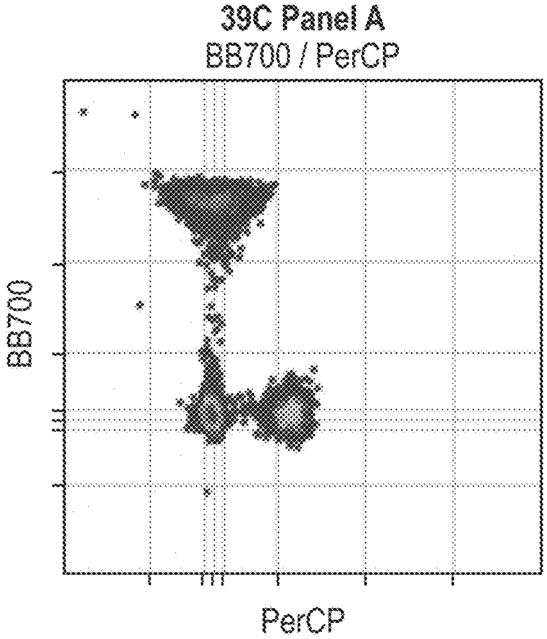
Figure 17E:
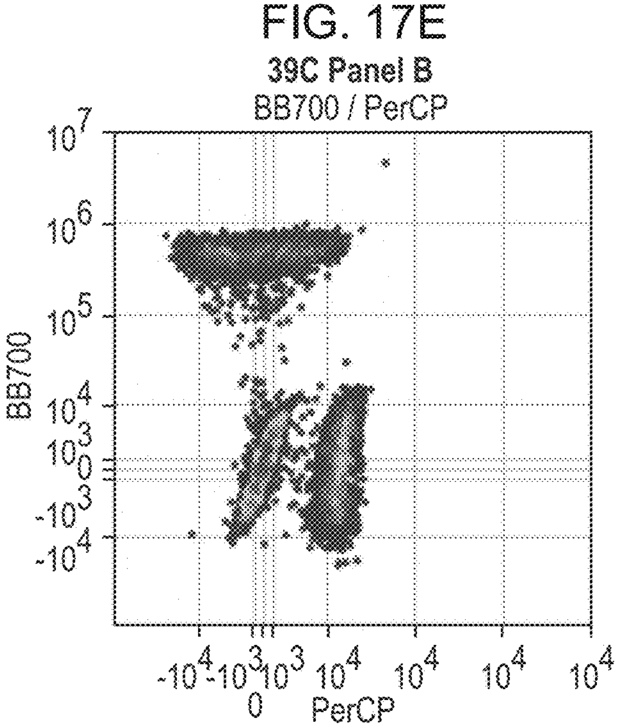
Figure 17F:
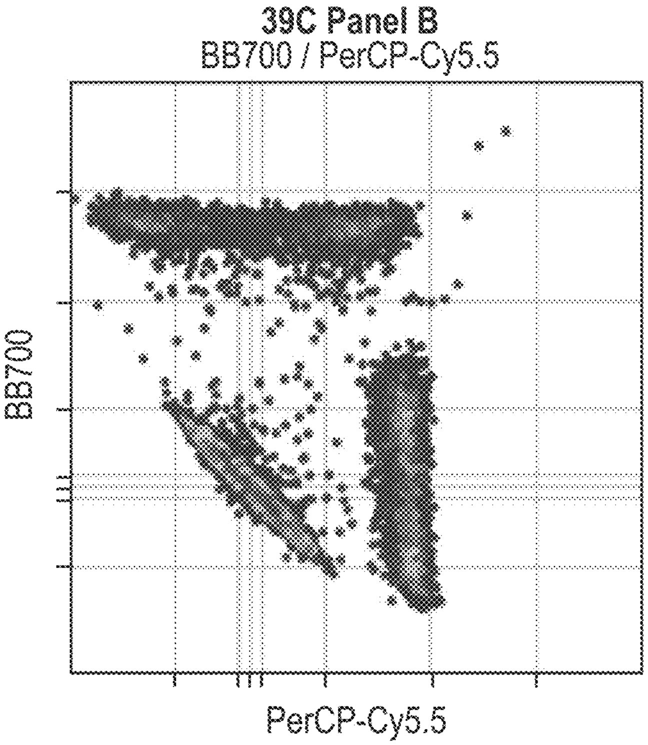
Figure 17G:
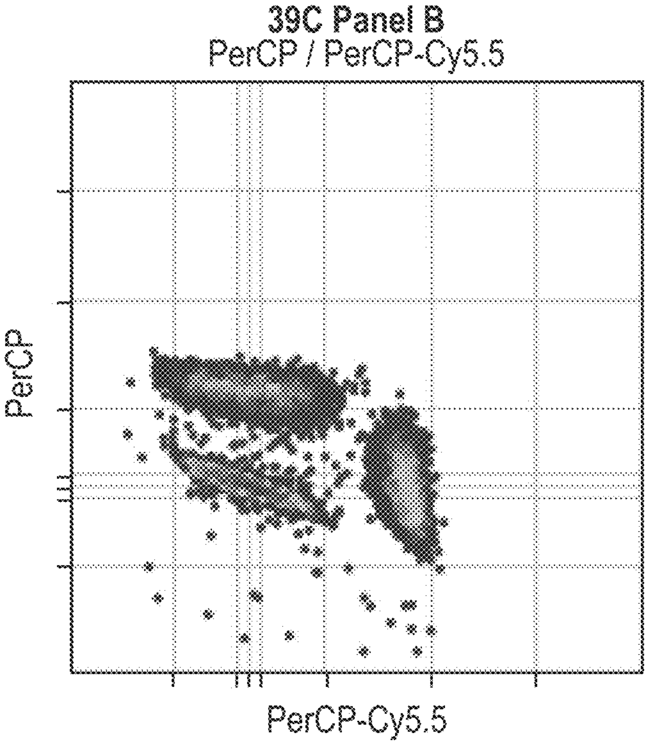

FIG. 17A-17D depict flow cytometer data collected with respect to Hotspot 2. FIG. 17A-17C depict flow cytometer data from BB700/PerCP, BB700/PerCP-Cy5.5, and PerCP/PerCP-Cy5.5 fluorophore pairs, respectively, combined with autofluorescence. This data reveals the baseline degree of unmixing-dependent spread in the absence of a full panel. FIG. 17D shows flow cytometer data from the BB700/PerCP fluorophore pair in the context of 39C Panel A. As shown in FIG. 17D, minimal spread is present in the BB700 spectral neighborhood. FIG. 17E-17G depict flow cytometer data for BB700/PerCP, BB700/PerCP-Cy5.5, and PerCP/PerCP-Cy5.5 fluorophore pairs in the context of 39C Panel B.

When the results from 39C Panel A are compared with the results from 39C Panel B, it is shown that the spread hotspot is shifted from the APC spectral neighborhood to the BB700 spectral neighborhood. As such, it was demonstrated that spread does not depend merely on what fluorochromes are employed in a pair, but rather on the full set of dyes in a panel.

Example 3

Figure 18:
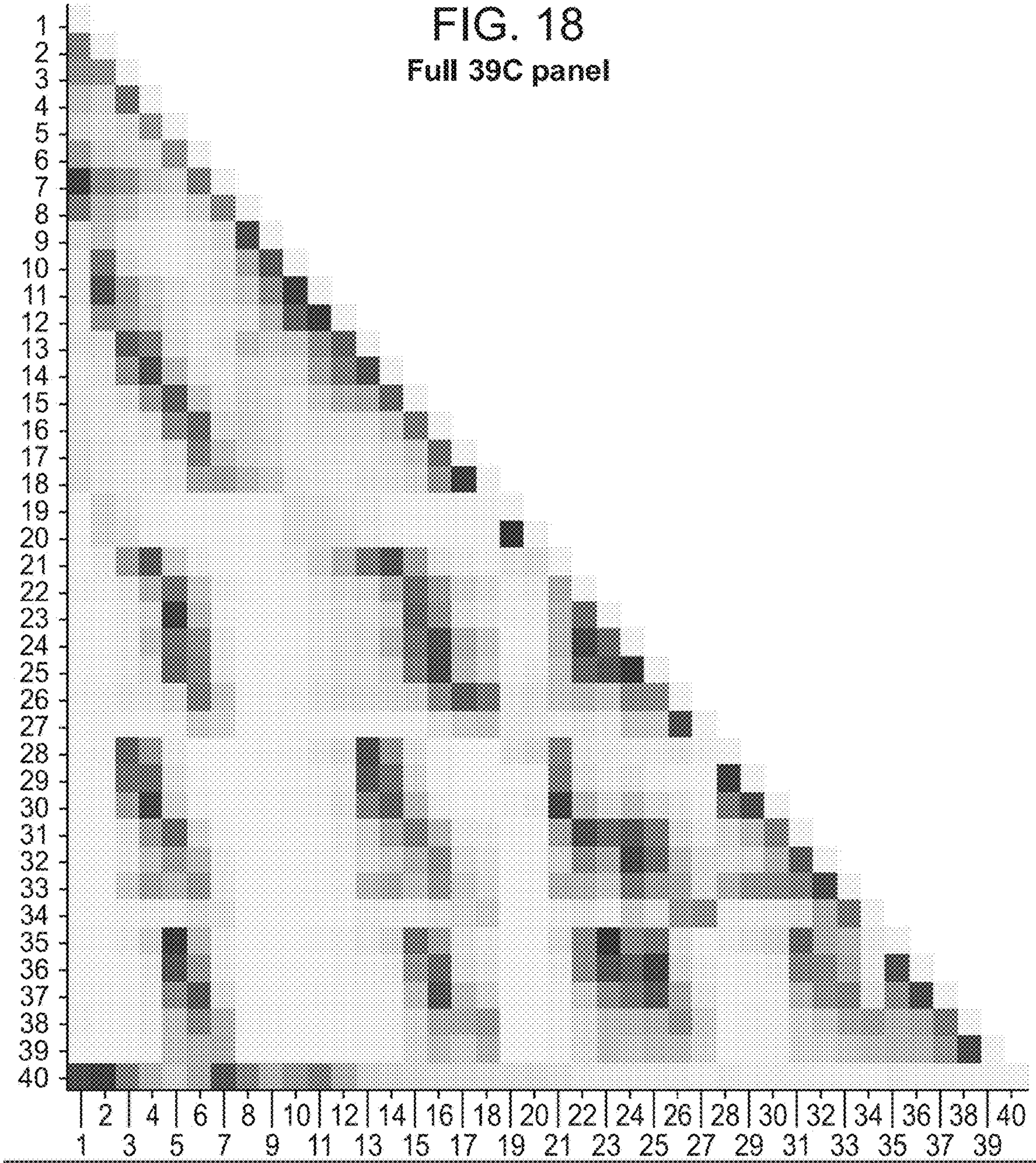
FIG. 18 demonstrates how a similarity index does not predict spread differences in the context of a full panel.
Figure 18:
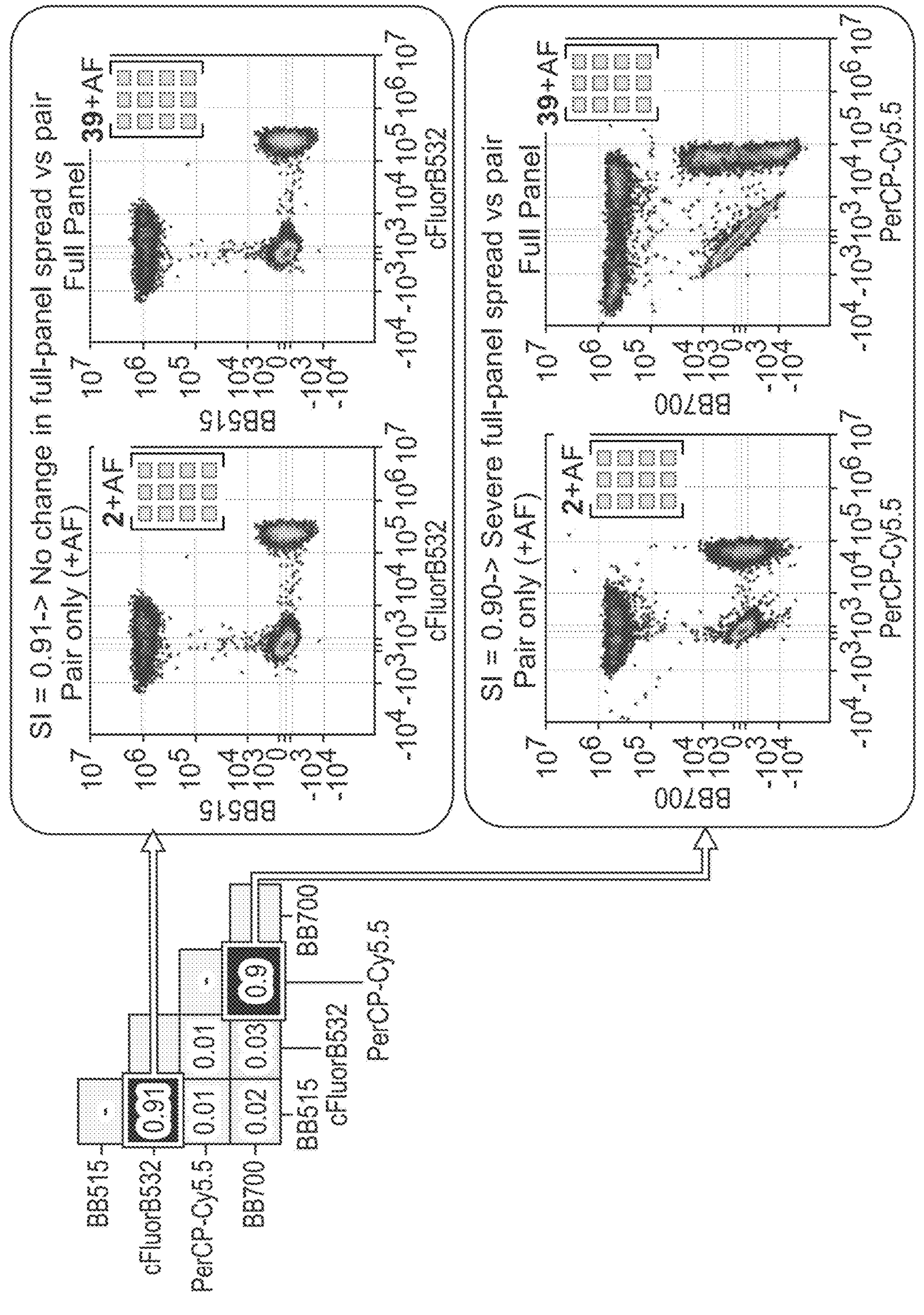

A similarity index was calculated for fluorochromes in a 39C panel. This index compares how similar the spectra of two fluorophores are on a scale of 0-1. The results of the calculation are presented in FIG. 18. In the chart on the left-hand side of FIG. 18, each cell is color-coded based on the similarity index, with a darker color representing a higher similarity. A subset of high-similarity pairs is magnified from the chart. As shown in this magnified portion of the chart, BB515/cFluorB532 and BB700/PerCP-Cy5.5 have notably similar spectra as measured by the similarity index. The BB515/cFluorB532 pair has a similarity index of 0.91, while the BB700/PerCP-Cy5.5 pair has a similarity index of 0.90. Flow cytometer was collected from the fluorochrome pairs and their associated autofluorescence only, as well as the same pairs in the context of the full fluorochrome panel. The resulting plots of flow cytometer data are shown on the right-hand side of FIG. 18. As shown in the flow cytometer data collected for BB515/cFluorB532 (top), there was no change in the full-panel spread relative to the pair only. However, as shown in the flow cytometer data collected for BB700/PerCP-Cy5.5 (bottom), there was severe spread change in the full-panel spread relative to the pair only. Accordingly, it was shown that Pair 1 (BB515 and cFluorB532) and Pair 2 (BB700 and PerCP-Cy5.5) have comparable similarity index but drastically different spread in a full panel. Therefore, it was demonstrated that similarity index does not predict spread differences in the context of a full panel. In other words, similarity index indicates whether two fluorophores might cause a problem when used together, but does not show whether there actually is a problem.

Figure 19:
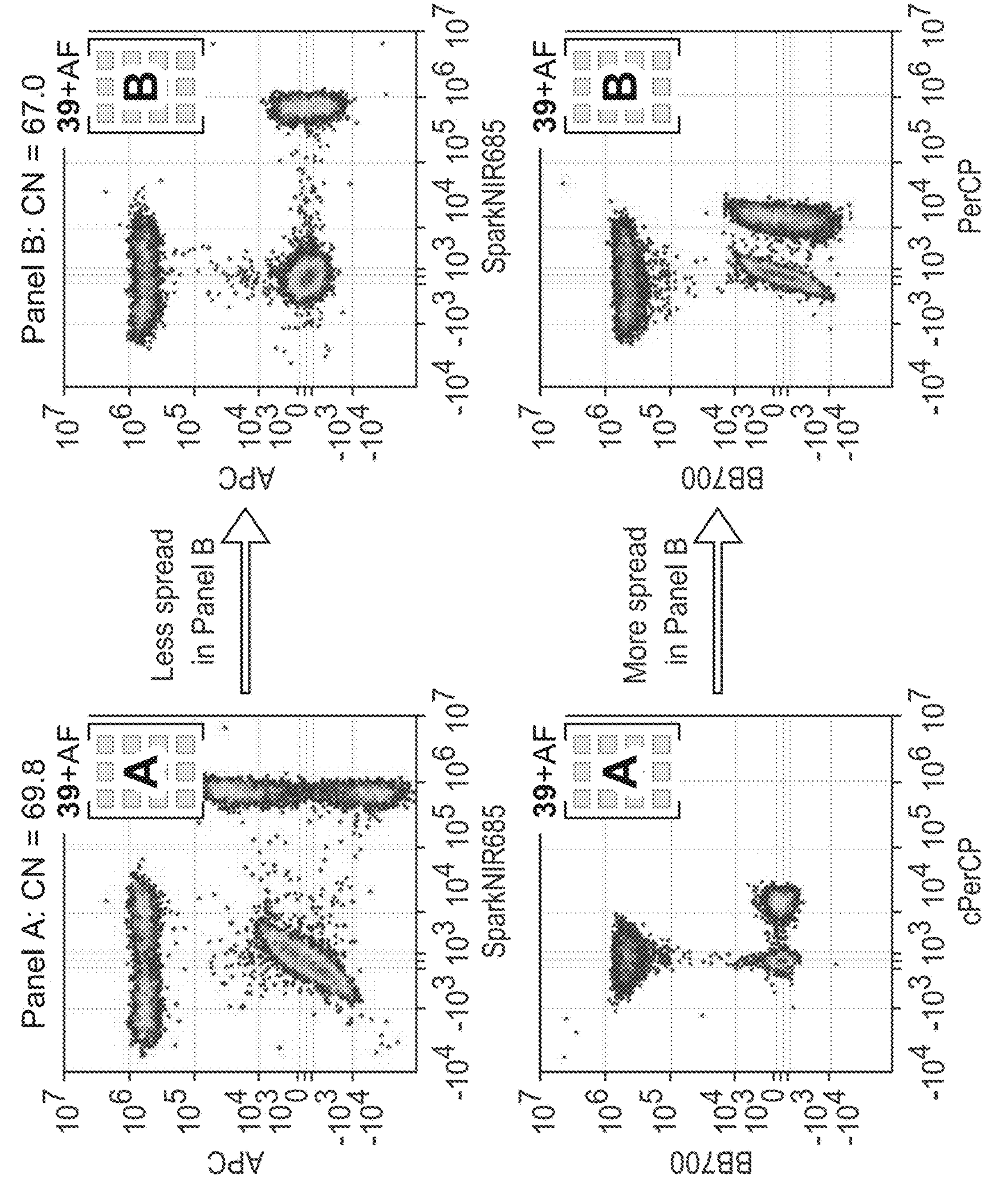
FIG. 19 demonstrates how condition number does not indicate which fluorophores are implicated in full-panel spread.

In addition, condition numbers were calculated for two different fluorochrome panels, Panel A and Panel B, which only differ by a single fluorochrome. The fluorochromes in each of these panels are presented in Table 1, below. Panel A was found to have a condition number of 69.8, while Panel B was found to have a condition number of 67.0. Flow cytometer data was developed for each of the APC/SparkNIR685 and BB700/PerCP fluorochrome pairs in the context of Panel A and Panel B. The results are shown in FIG. 19. The plots for the pairs in Panel A are shown on the left-hand side, while the plots for Panel B are shown on the right hand side. As shown in FIG. 19, Panel A and B differ by one fluorophore and have comparable condition number, but the same dye pairs have drastically different spread in Panel A vs. Panel B. Therefore, it was concluded that condition number does not indicate which fluorophores are implicated in full-panel spread. In other words, condition number indicates that a given panel may have a problem, but does not show which fluorochromes cause the problem or how to fix it.

Figure 20:
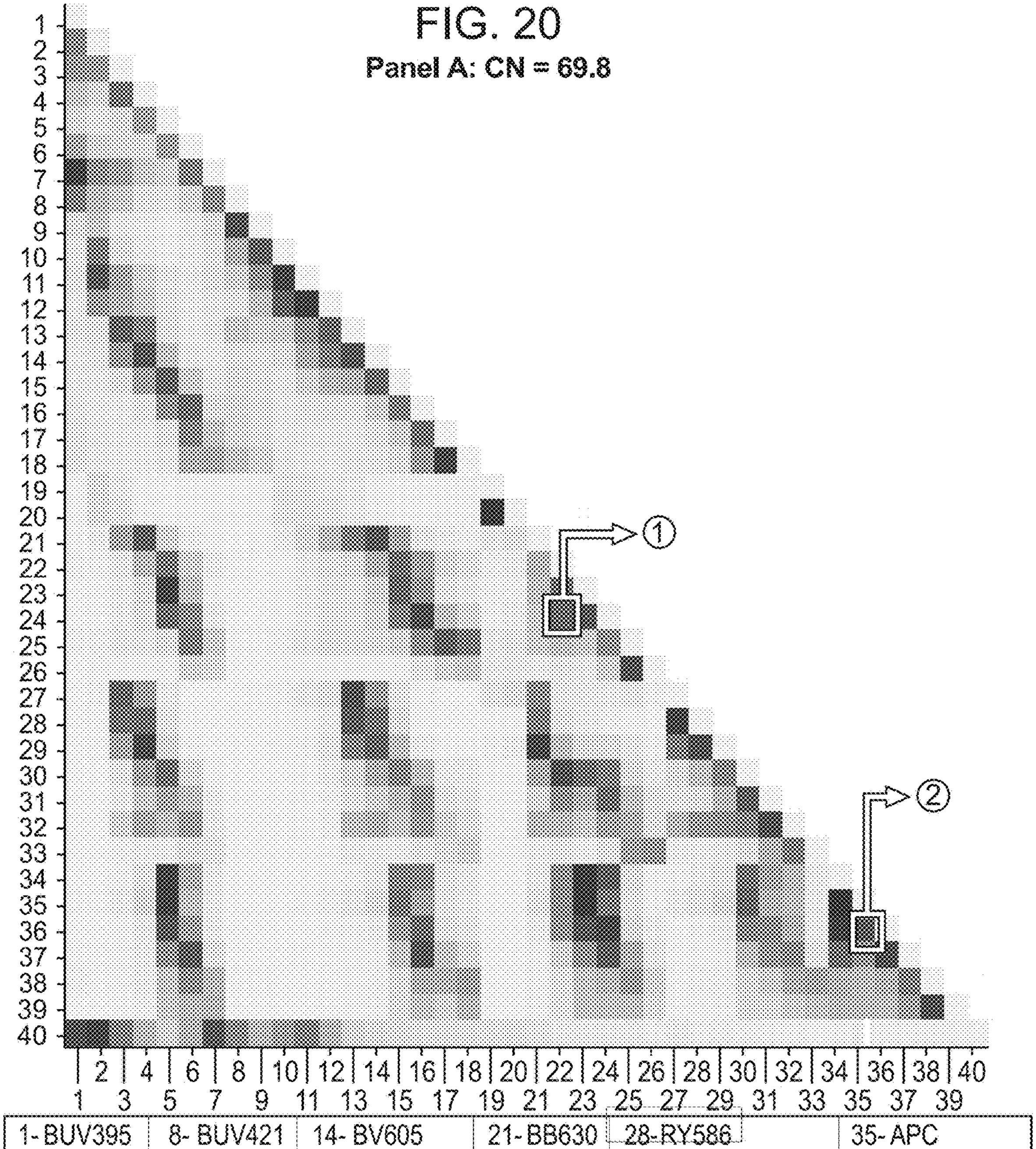
FIG. 20 demonstrates how a similarity analysis does not predict where spread will occur in a fluorochrome panel.
Figure 20:
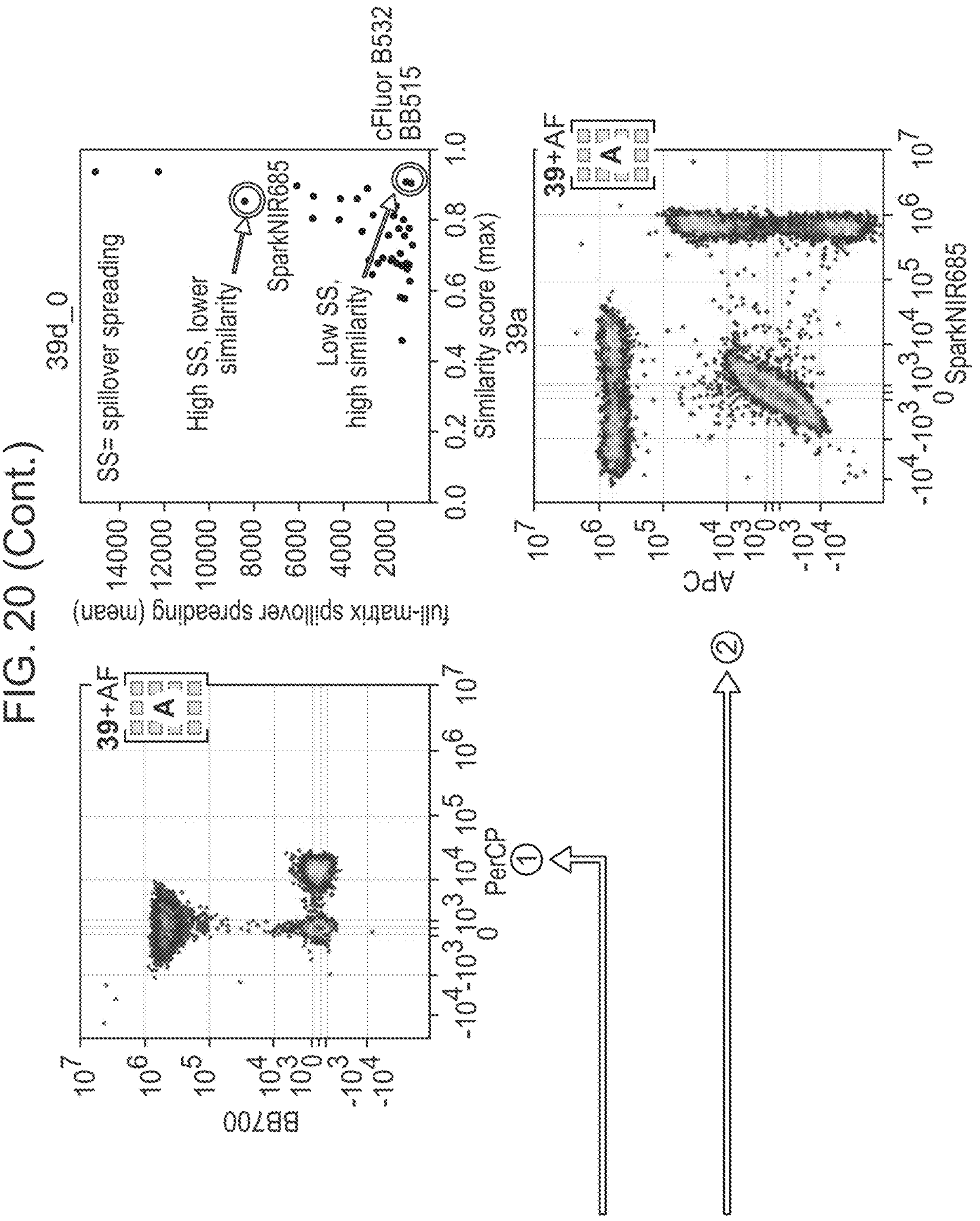
Figure 21:
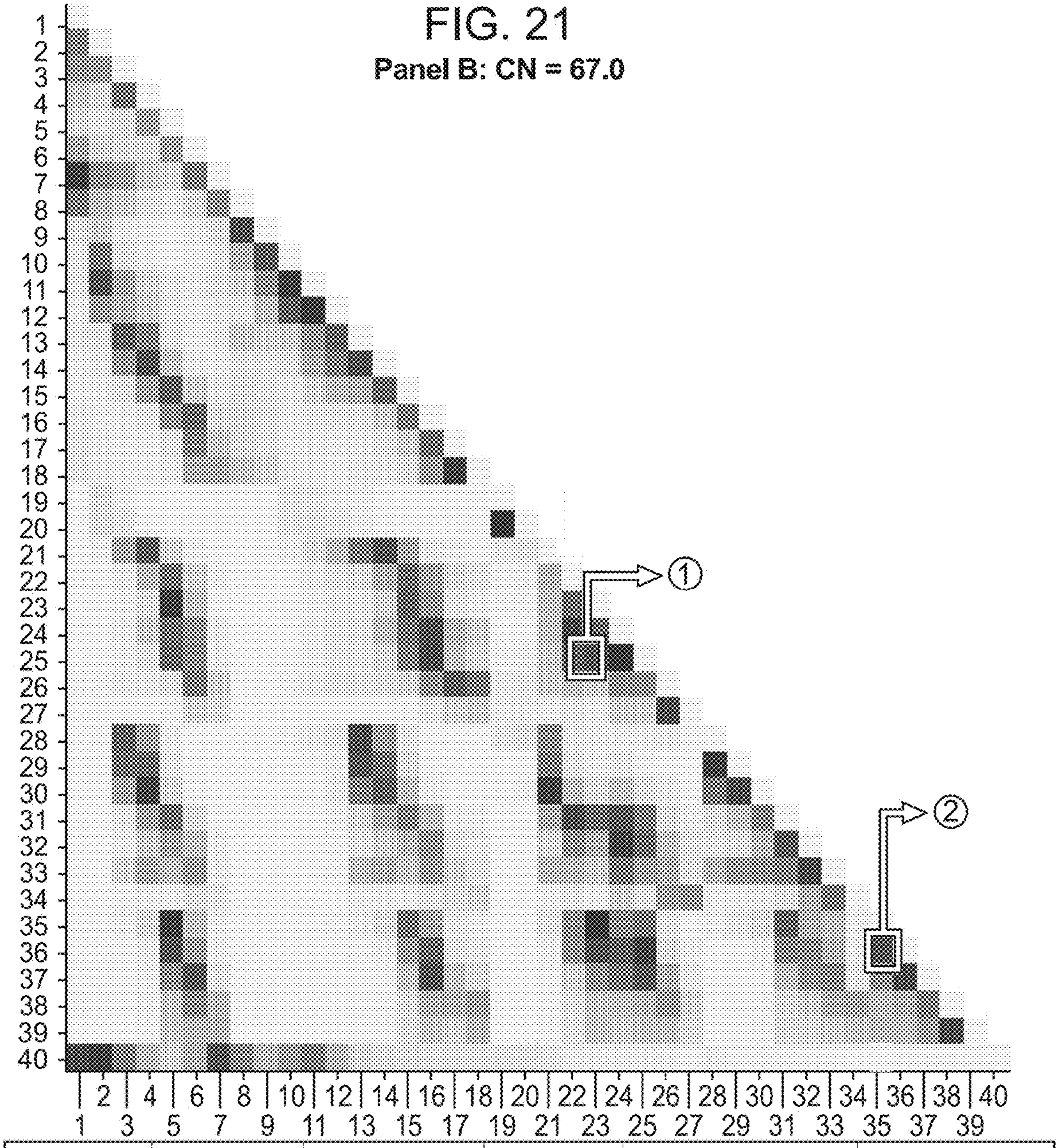
FIG. 21 demonstrates how a similarity analysis does not predict where spread will occur in a fluorochrome panel.
Figure 21:
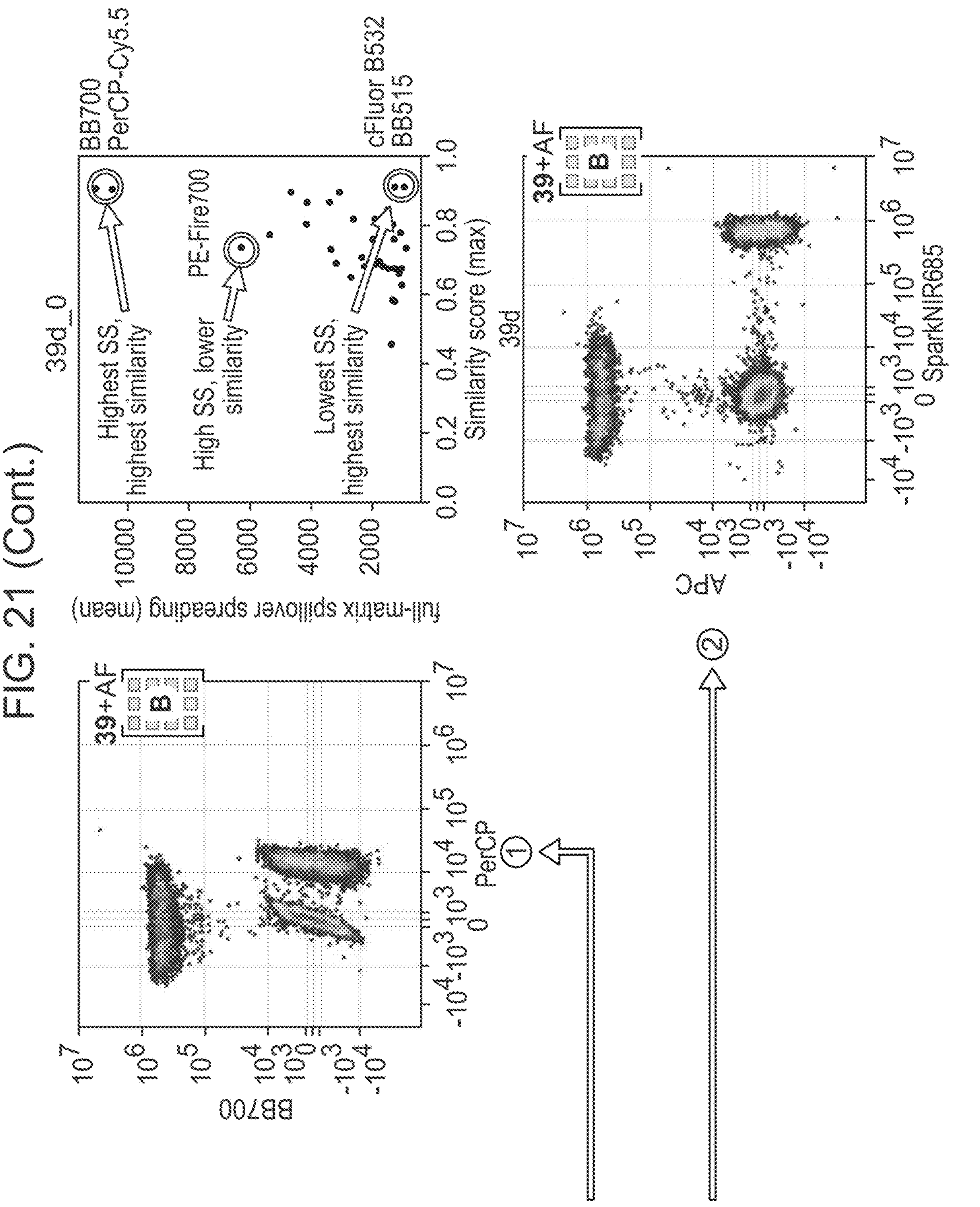

Similarity analyses were carried out with respect to Panel A (FIG. 20) and Panel B (FIG. 21) described above. This analysis involves plotting similarity index against mean full-matrix spillover spreading (SS). As shown in FIG. 20 and FIG. 21, similarity analysis does not predict where spread will occur in two different panels.

Example 4

Figure 22:
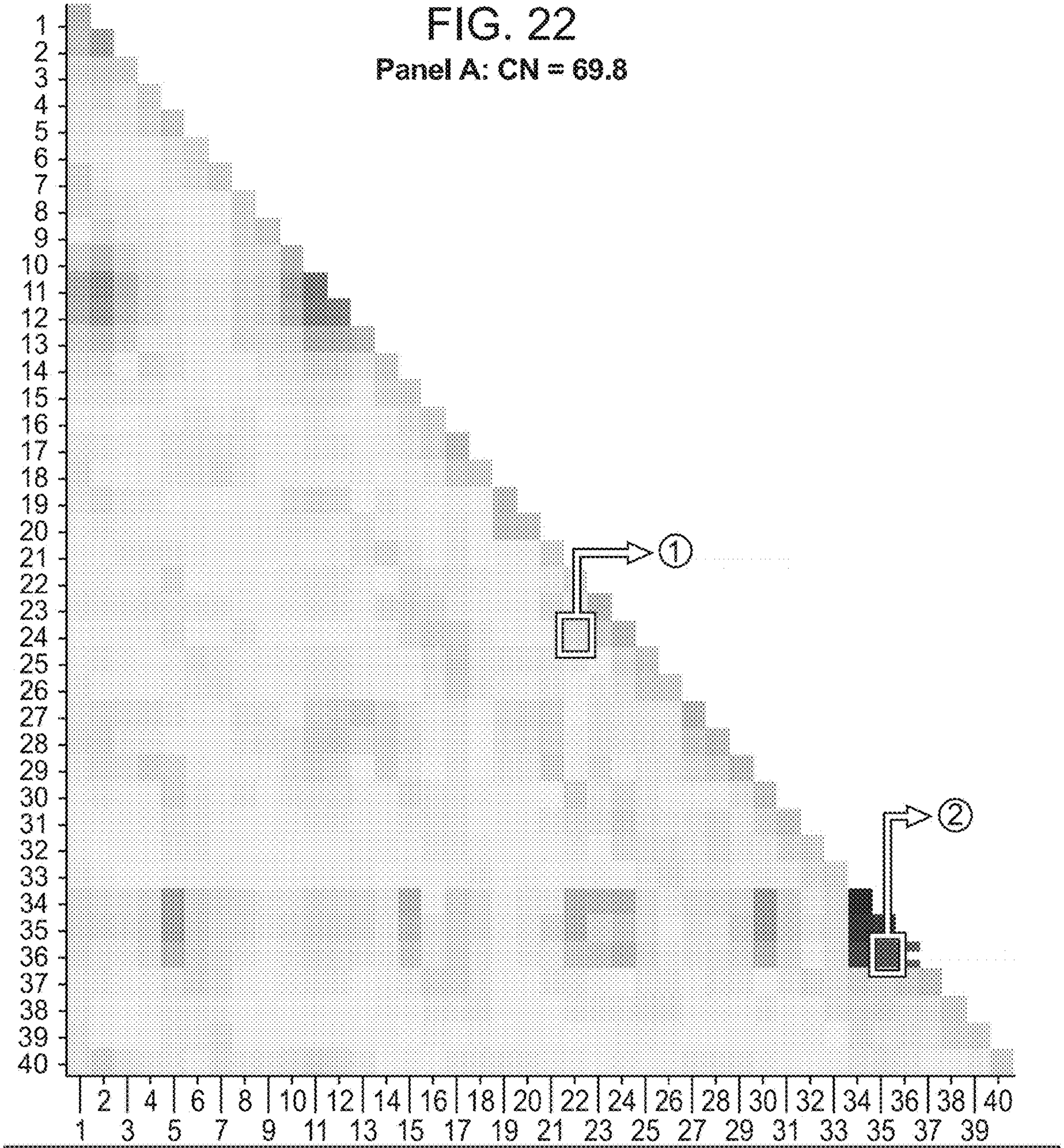
FIG. 22 demonstrates how a panel hotspot analysis correctly identifies spread problem areas in a fluorochrome panel.
Figure 22:
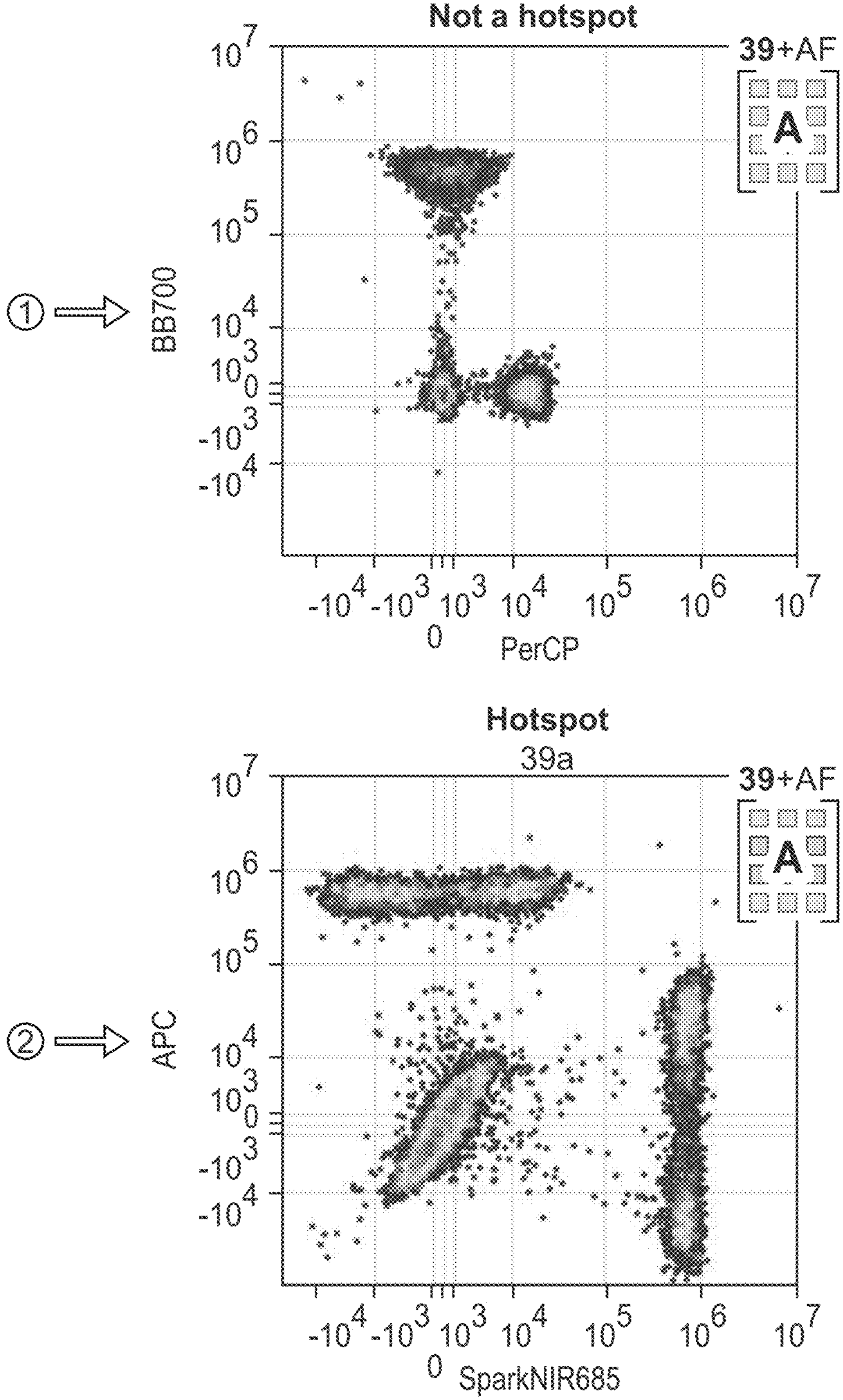
Figure 23:
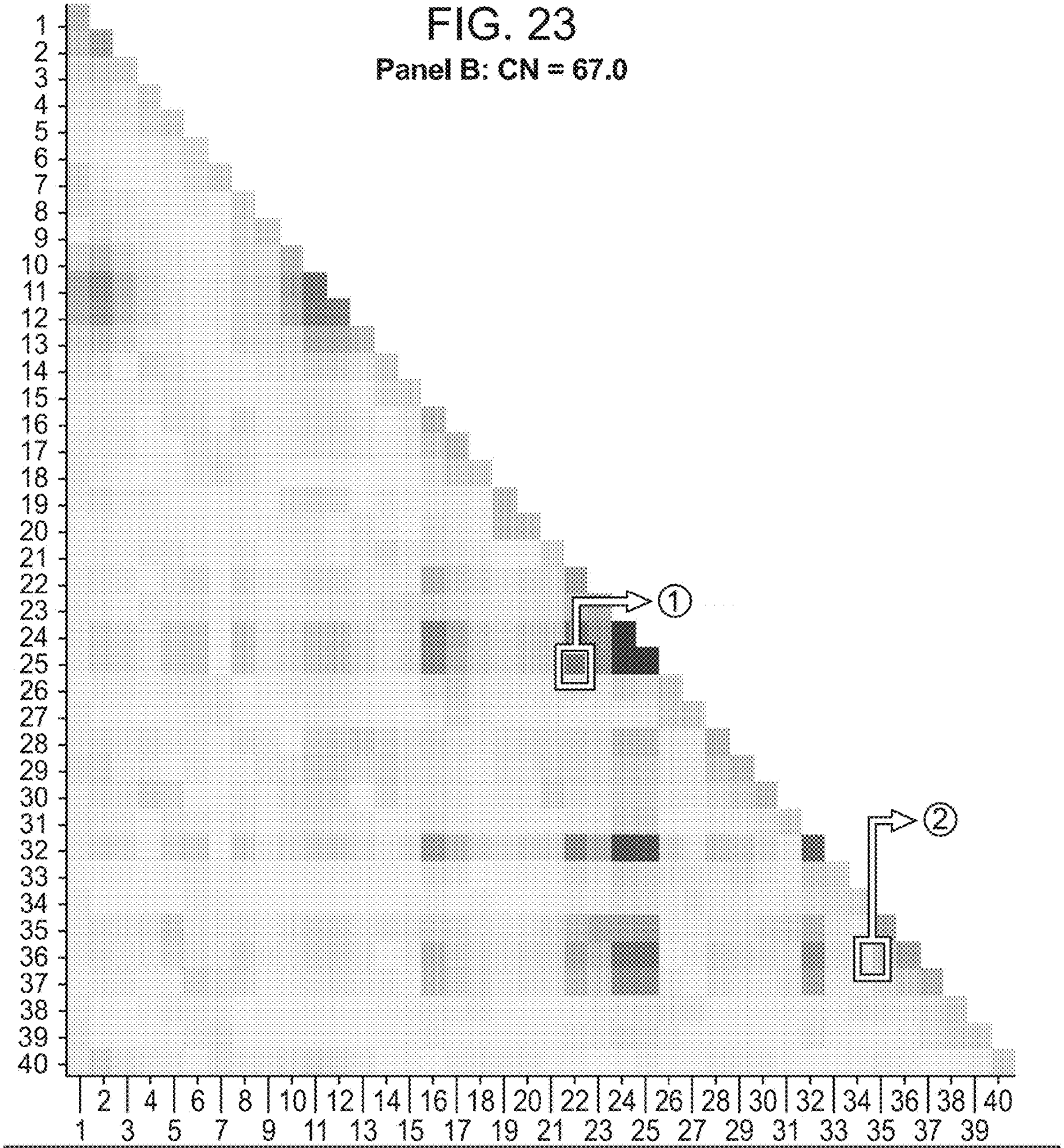
FIG. 23 demonstrates how a panel hotspot analysis correctly identifies spread problem areas in a fluorochrome panel.
Figure 23:
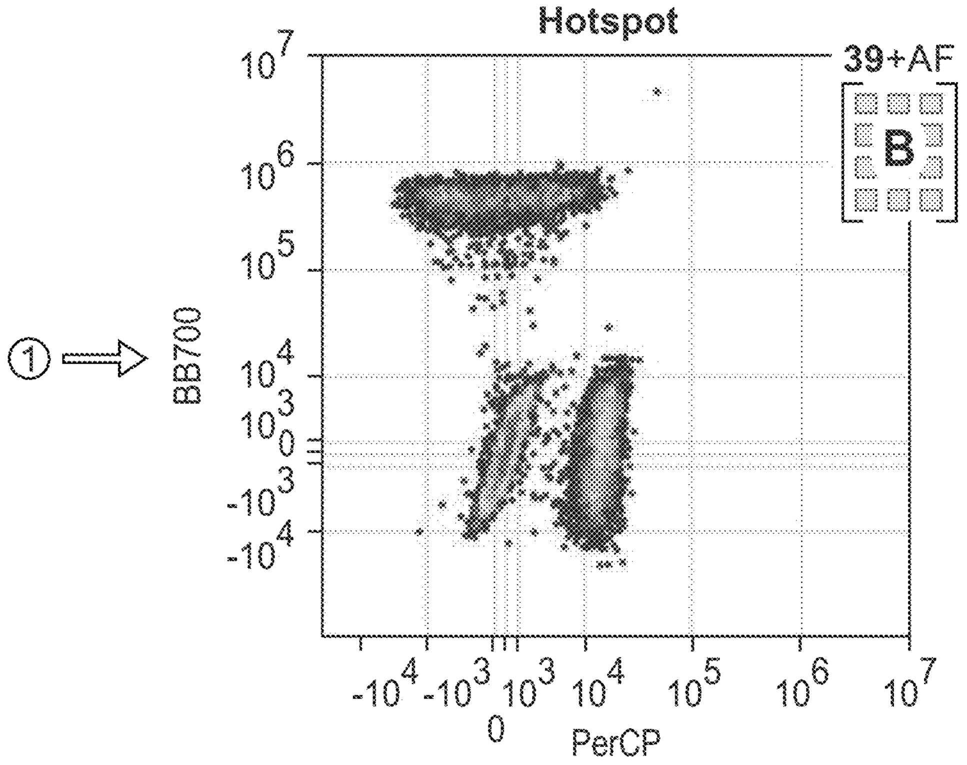
Figure 23:
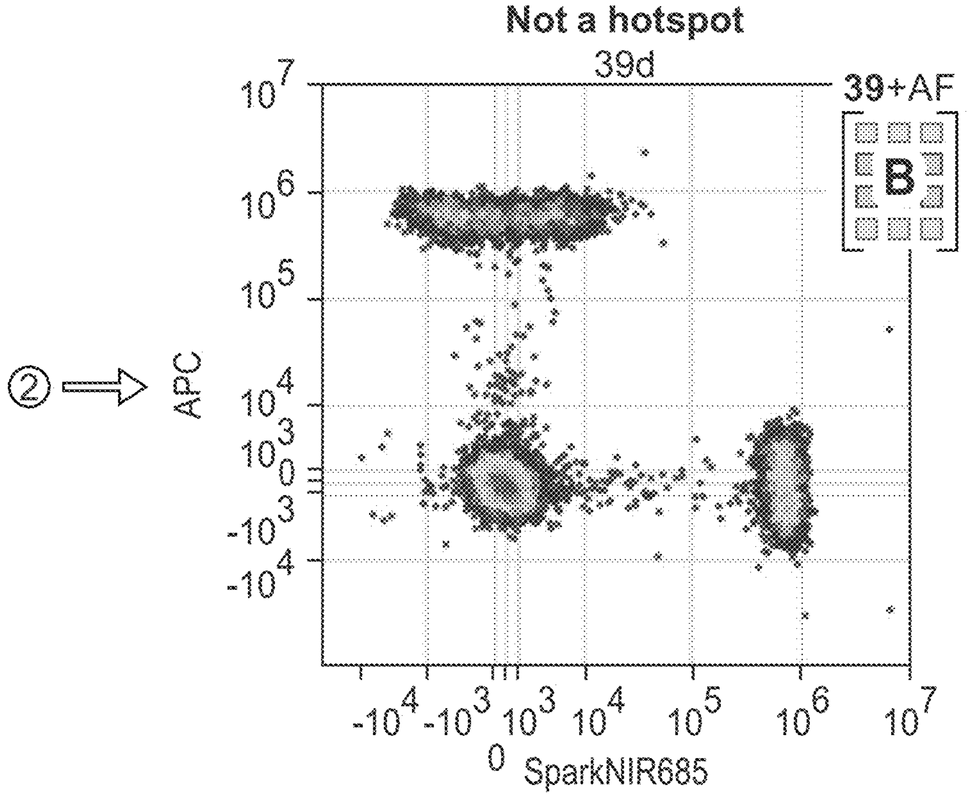

A panel hotspot matrix was generated for each of Panel A and Panel B, shown below in Table 1. The panel hotspot matrices were created using the methods illustrated and described above with respect to FIG. 5A-5D. The Panel A hotspot matrix is shown in FIG. 22, while the Panel B hotspot matrix is shown in FIG. 23. As shown in FIG. 22 and FIG. 23, the panel hotspot matrix correctly identifies which fluorochromes are most impacted by unmixing-dependent spread in Panel A and Panel B, unlike the prior methods of fluorochrome panel analysis. As such, it was found that panel hotspot analysis correctly identifies spread problem areas in different panels.

Figure 24:
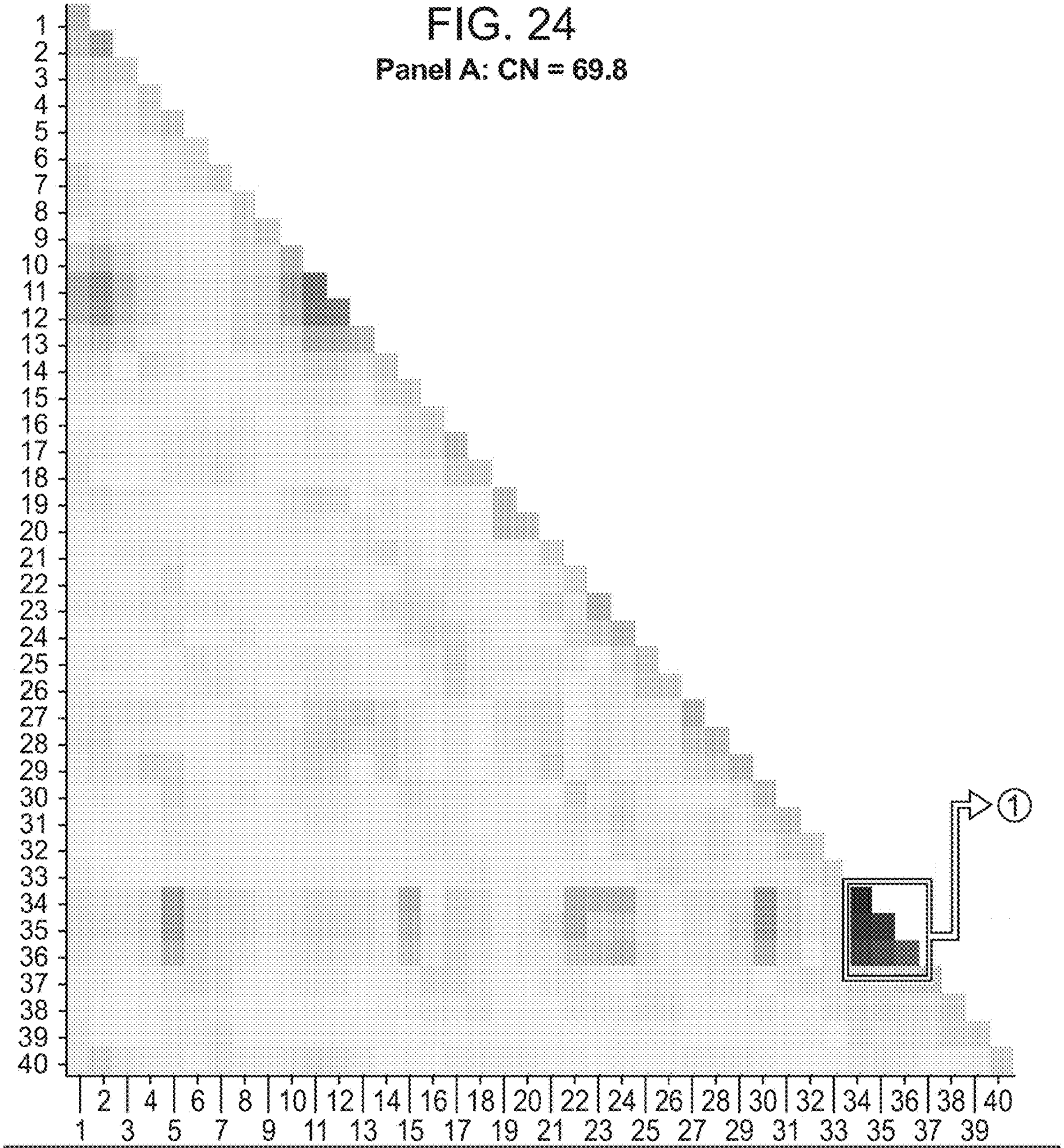
FIG. 24 demonstrates how a panel hotspot analysis correctly identifies spread problem areas in a fluorochrome panel.
Figure 24:
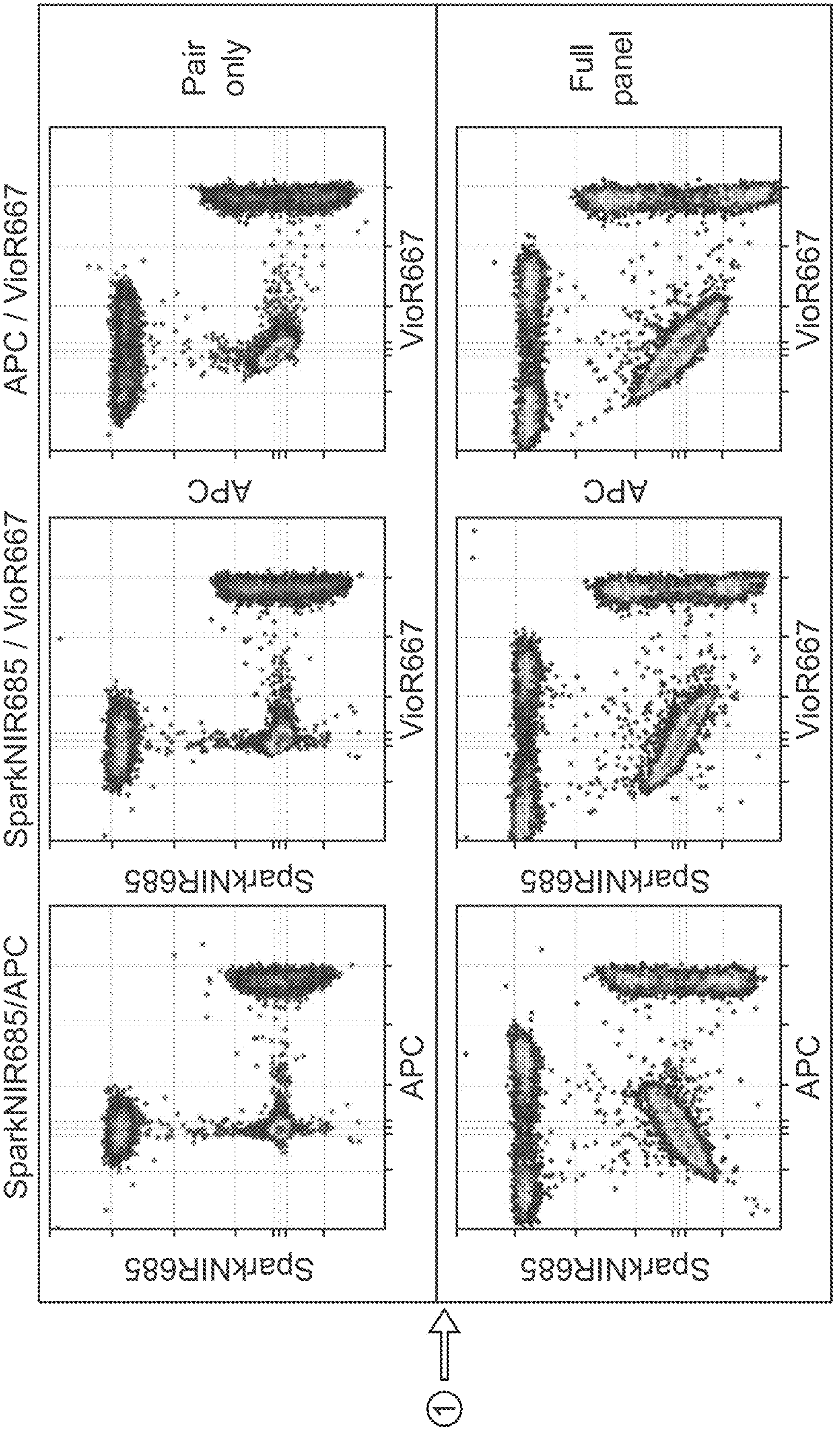
Figure 25:
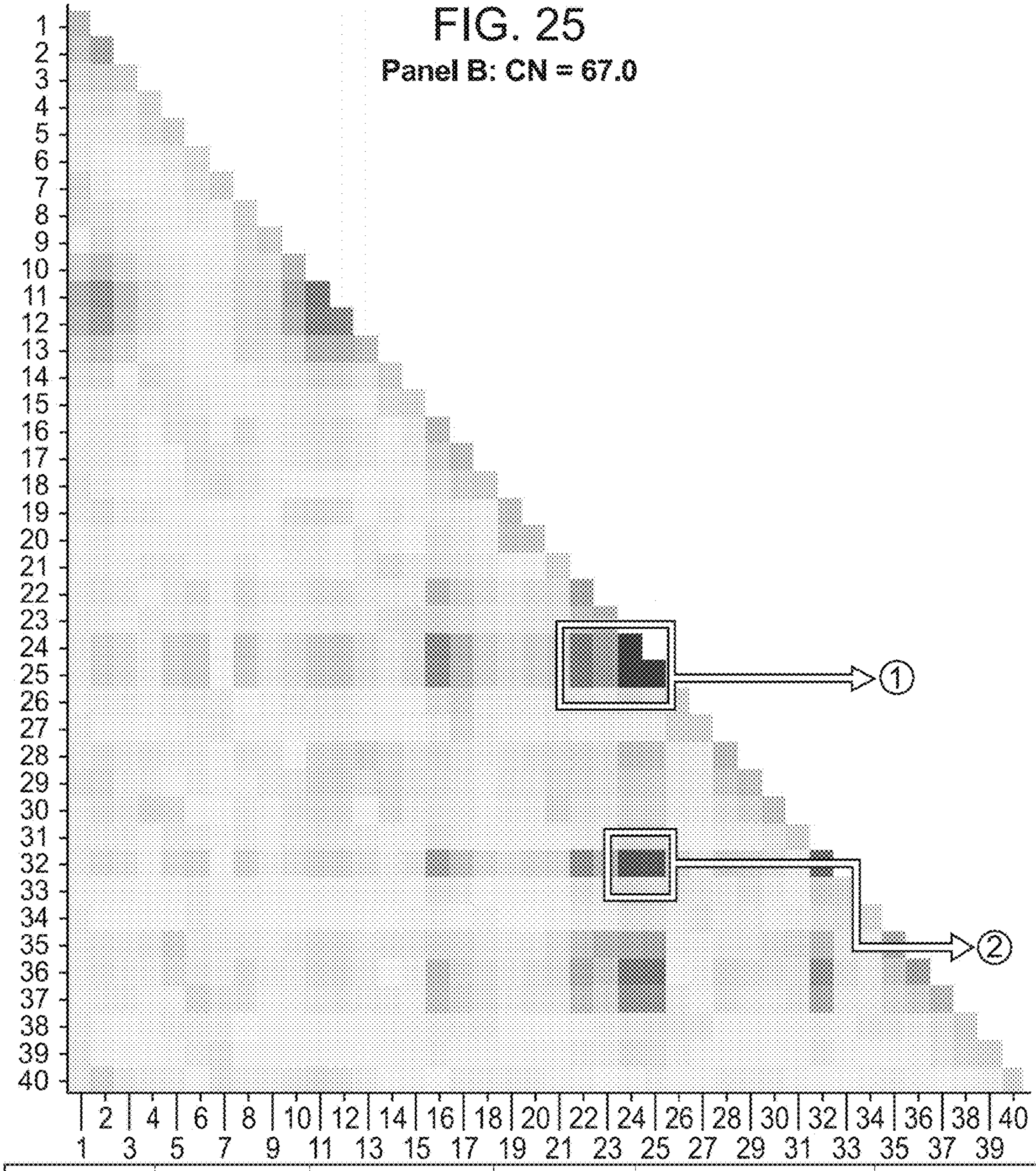
FIG. 25 demonstrates how a panel hotspot analysis correctly identifies spread problem areas in a fluorochrome panel.
Figure 25:
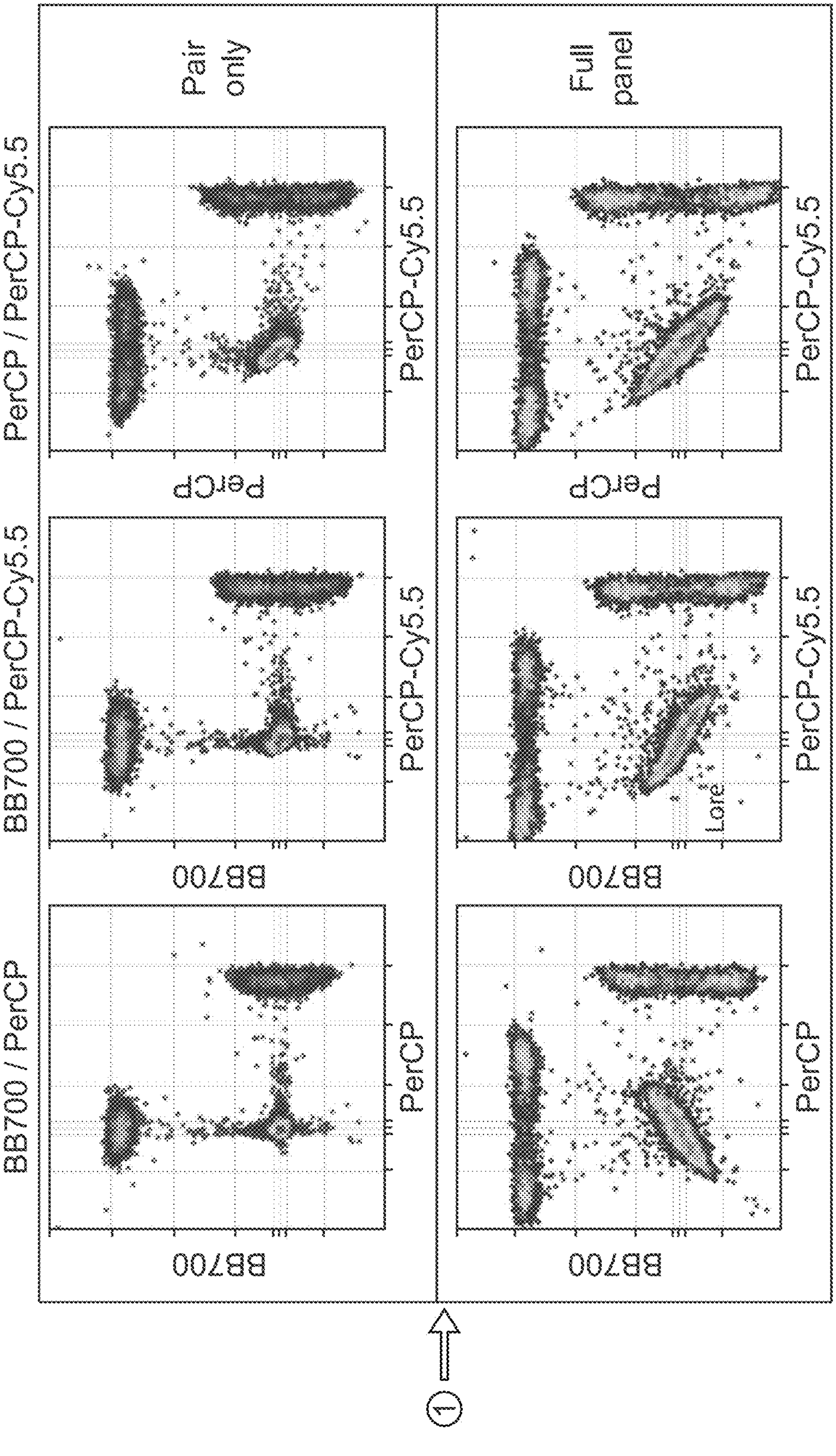
Figure 25:
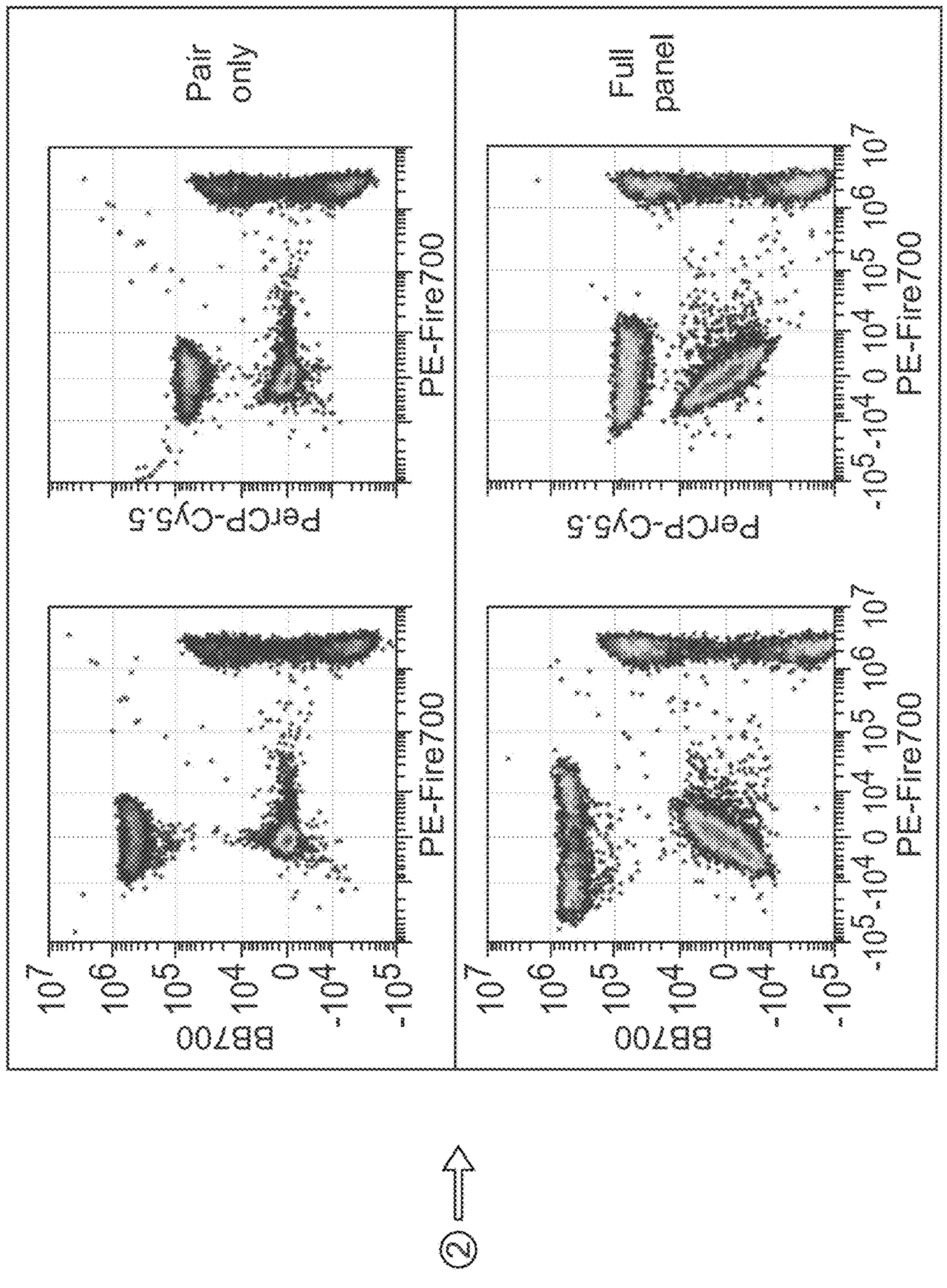

To further demonstrate this ability of the panel hotspot matrix, flow cytometer data plots associated with fluorochromes identified by the panel hotspot matrix as being affected by spread were produced for each of Panel A (FIG. 24) and Panel B (FIG. 25). As shown in FIG. 24 and FIG. 25, fluorochromes identified by the panel hotspot matrices as being affected by spread are, indeed, affected by spread. In the panel hotspot matrices, high-magnitude diagonal entries indicate the most-impacted fluorochromes, while high-magnitude off-diagonal entries indicate problematic pairs of dyes.

Example 5

Figure 26:
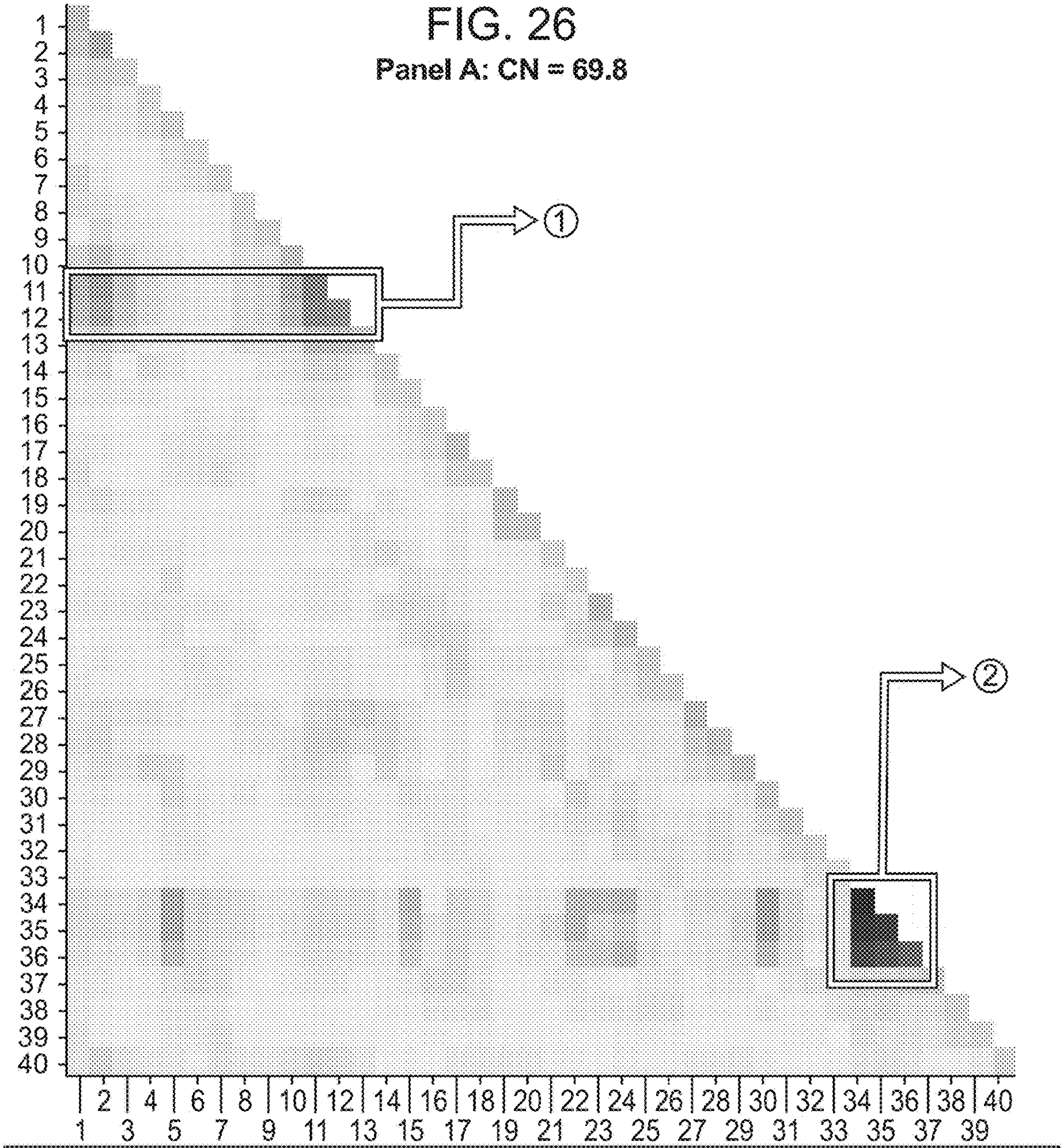
FIG. 26 demonstrates how a panel hotspot analysis semi-quantitatively indicates spread severity.
Figure 26:
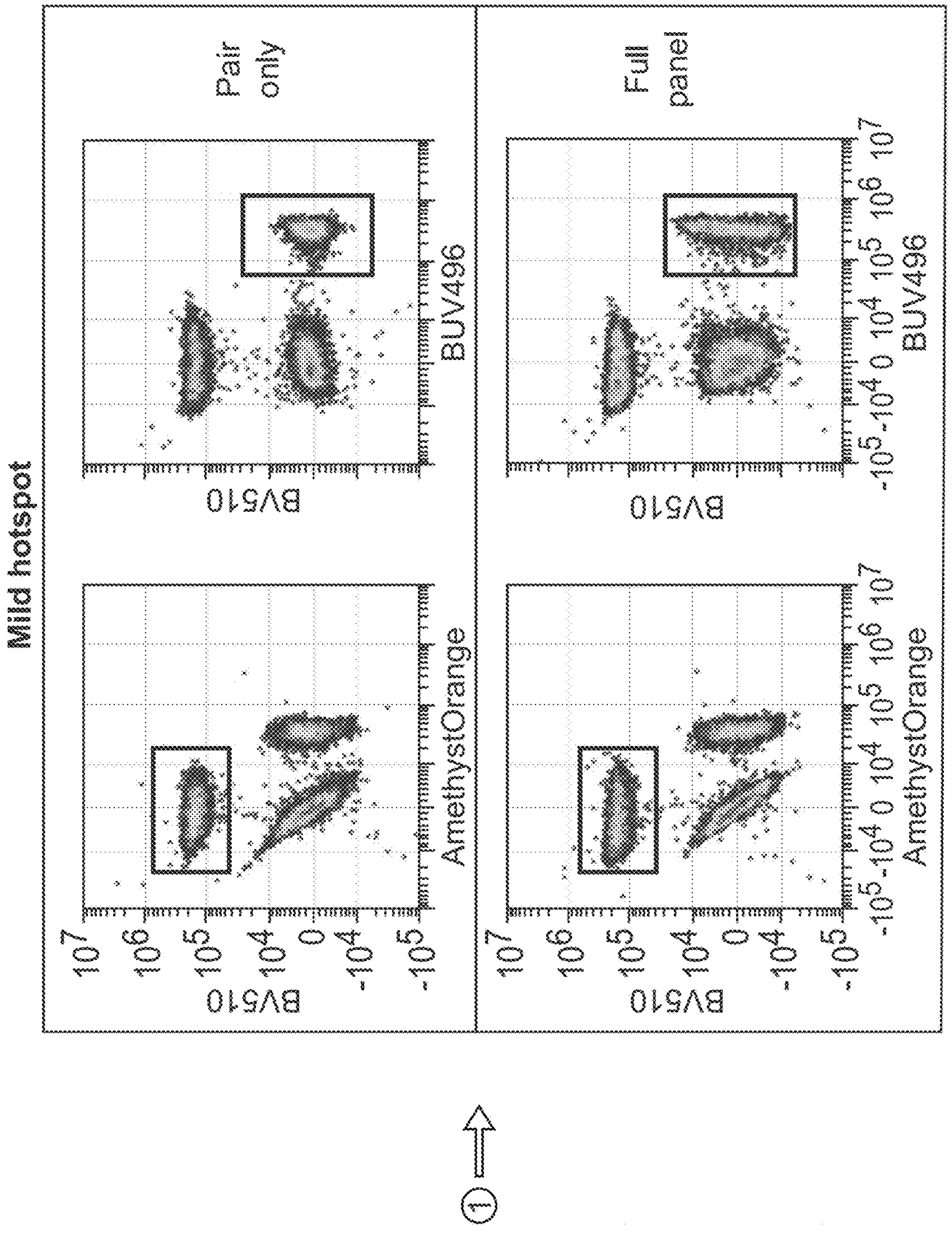
Figure 26:
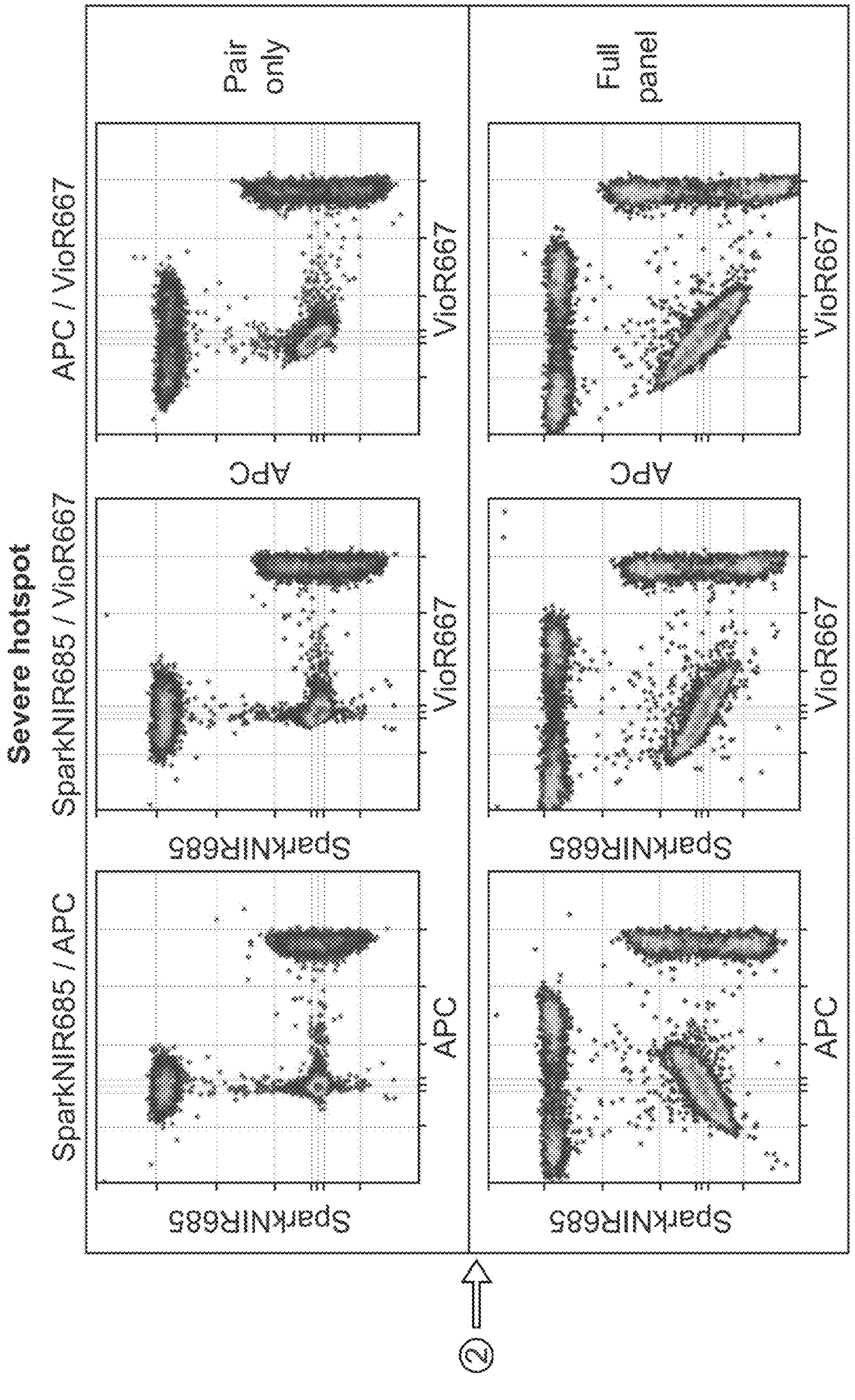

The ability of the panel hotspot matrix to estimate spread severity was investigated. To accomplish this, the Panel A hotspot matrix described above was analyzed. The results are shown in FIG. 26. The magnitude of the quantitative metrics as depicted by color density in cells of the Panel A hotspot matrix tracks hotspot severity. Hotspots in the region of the matrix having higher quantitative metric magnitudes were shown to have severe spread, while hotspots having relatively lower quantitative metric magnitudes had correspondingly lower spread. This information indicates where in the panel unmixing-dependent spread will be most problematic, and could be used for panel design when assigning fluorochromes to markers (e.g., ensure "hotspot" fluorochromes are not coexpressed and are not dim/sensitive markers in the panel, because their biological resolution will be impacted).

Example 6

Figure 27A:
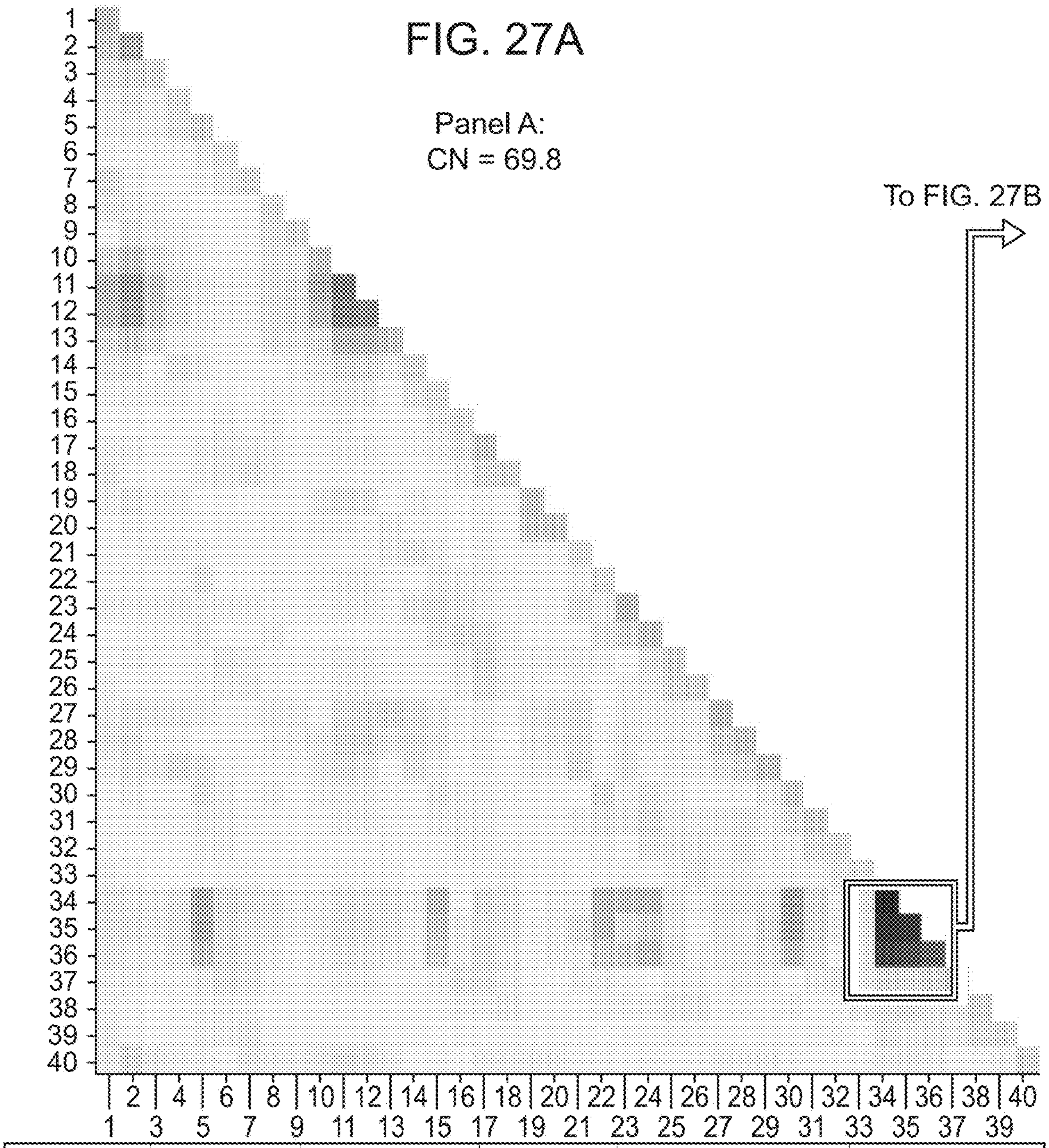
FIG. 27A-27C demonstrates how a panel hotspot analysis can facilitate improving or expanding existing panels.
Figure 27B:
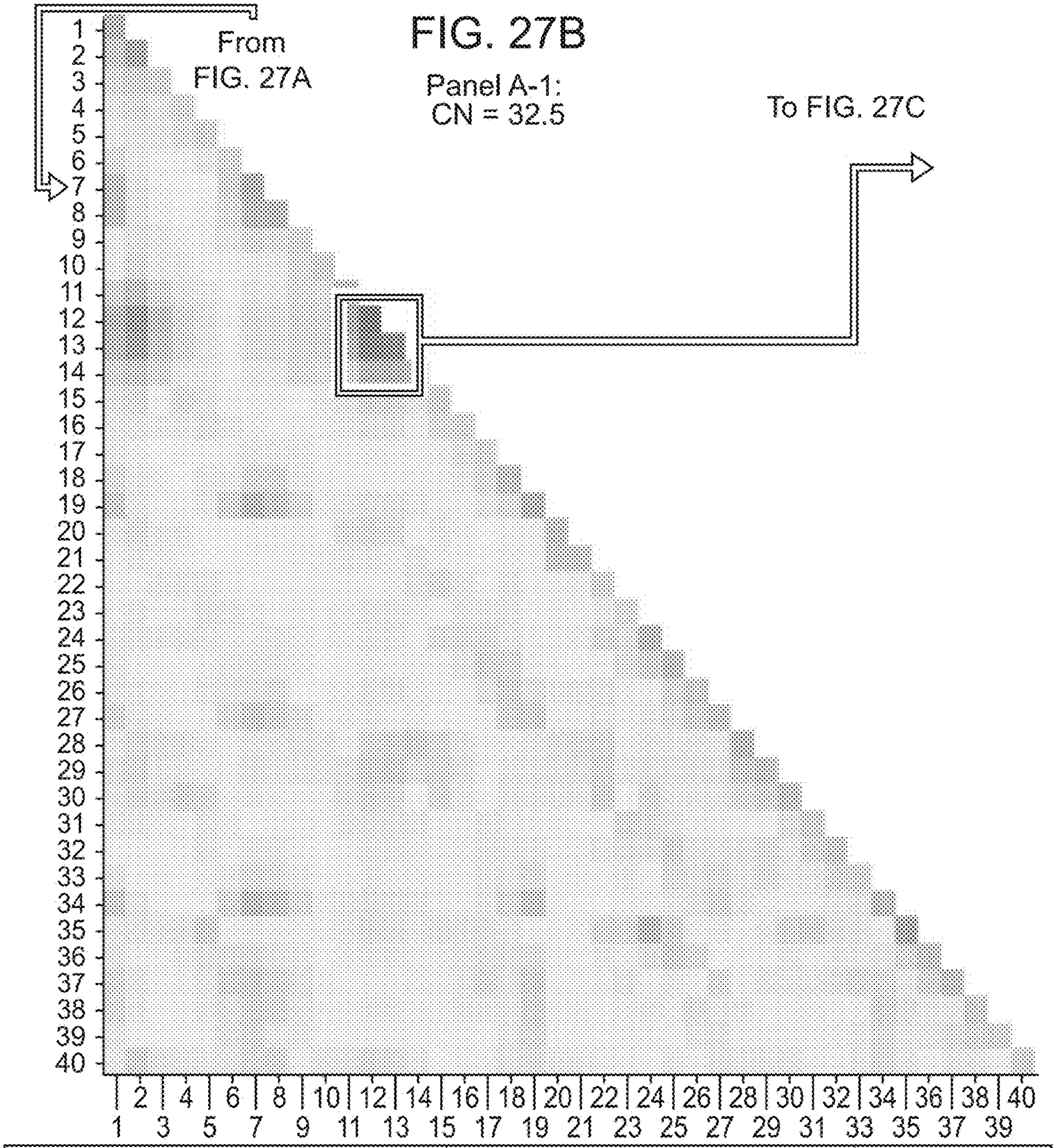
Figure 27C:
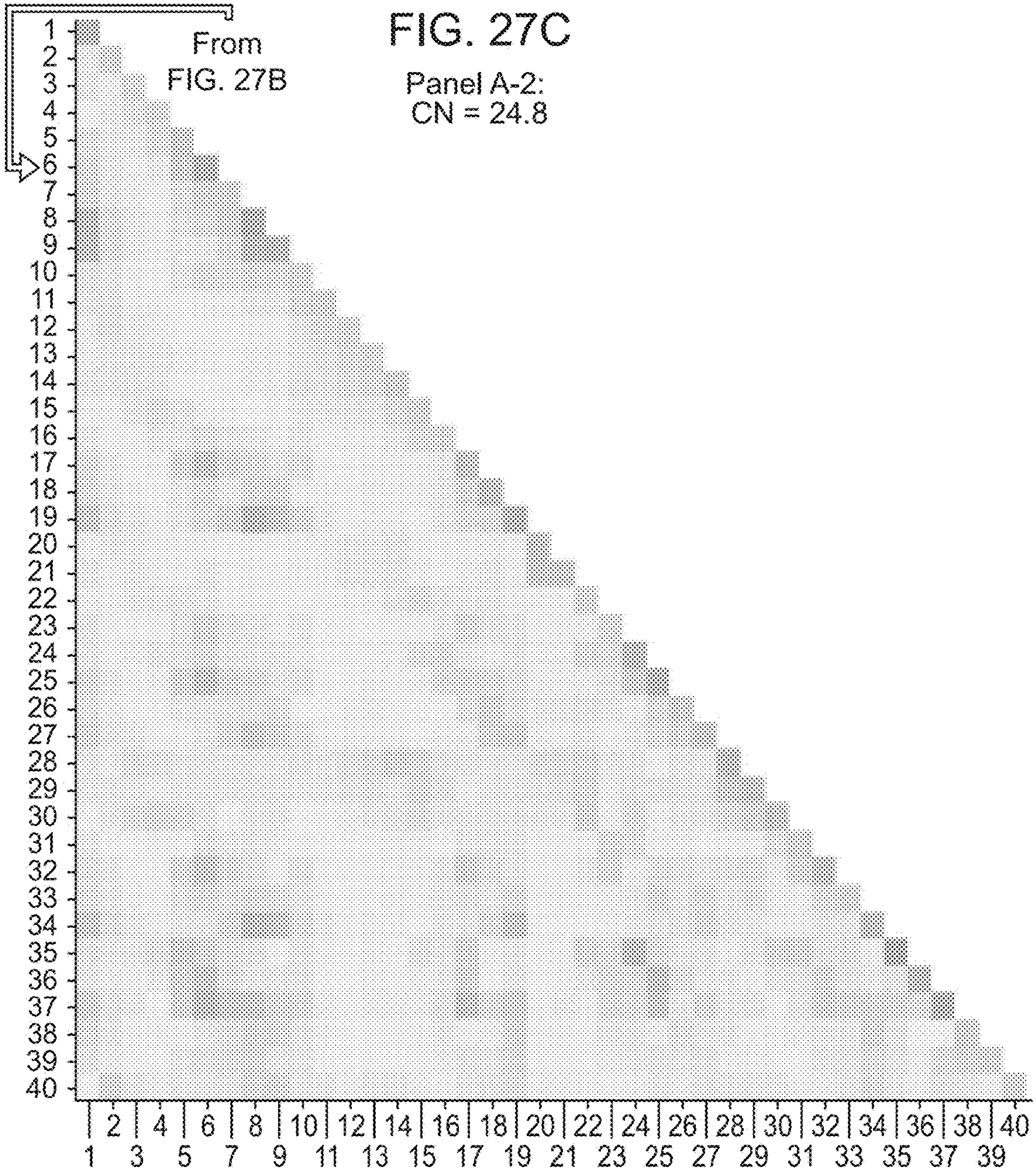

The Panel A hotspot matrix was used to improve Panel A. Panel improvements may be achieved by manual trial and error using the Panel Hotspot Matrix as a guide, or through an automated algorithm that minimizes an objective function derived from the matrix (e.g., magnitude of the maximum entry). The Panel A hotspot matrix is shown in FIG. 27A. The hotspot in the APC spectral neighborhood was subsequently resolved by replacing VioR667 with QDot 800. This swap resulted in Panel A-1, presented below in Table 1. A panel hotspot matrix for Panel A-1 is depicted in FIG. 27B. As shown in the Panel A-1 hotspot matrix, the hotspot in the APC spectral neighborhood was eliminated as a result of swapping VioR667 with QDot 800. The condition number was also reduced from 69.8 to 32.5. However, a hotspot was still visible in the Panel A-1 hotspot matrix in the BV510 spectral neighborhood. This hotspot was resolved by replacing BV510 with QDot 705, resulting in Panel A-2 which is also presented below in Table 1. A panel hotspot matrix for Panel A-2 is depicted in FIG. 27C. As shown in the Panel A-2 hotspot matrix, the hotspot in the BV510 spectral neighborhood was eliminated as a result of swapping BV510 with QDot 705. This swap also had the effect of reducing the condition number of the fluorochrome panel from 32.5 to 24.8. Thus, it was shown that panel hotspot analysis can facilitate improving or expanding existing panels.

Example 7

Figure 28A:
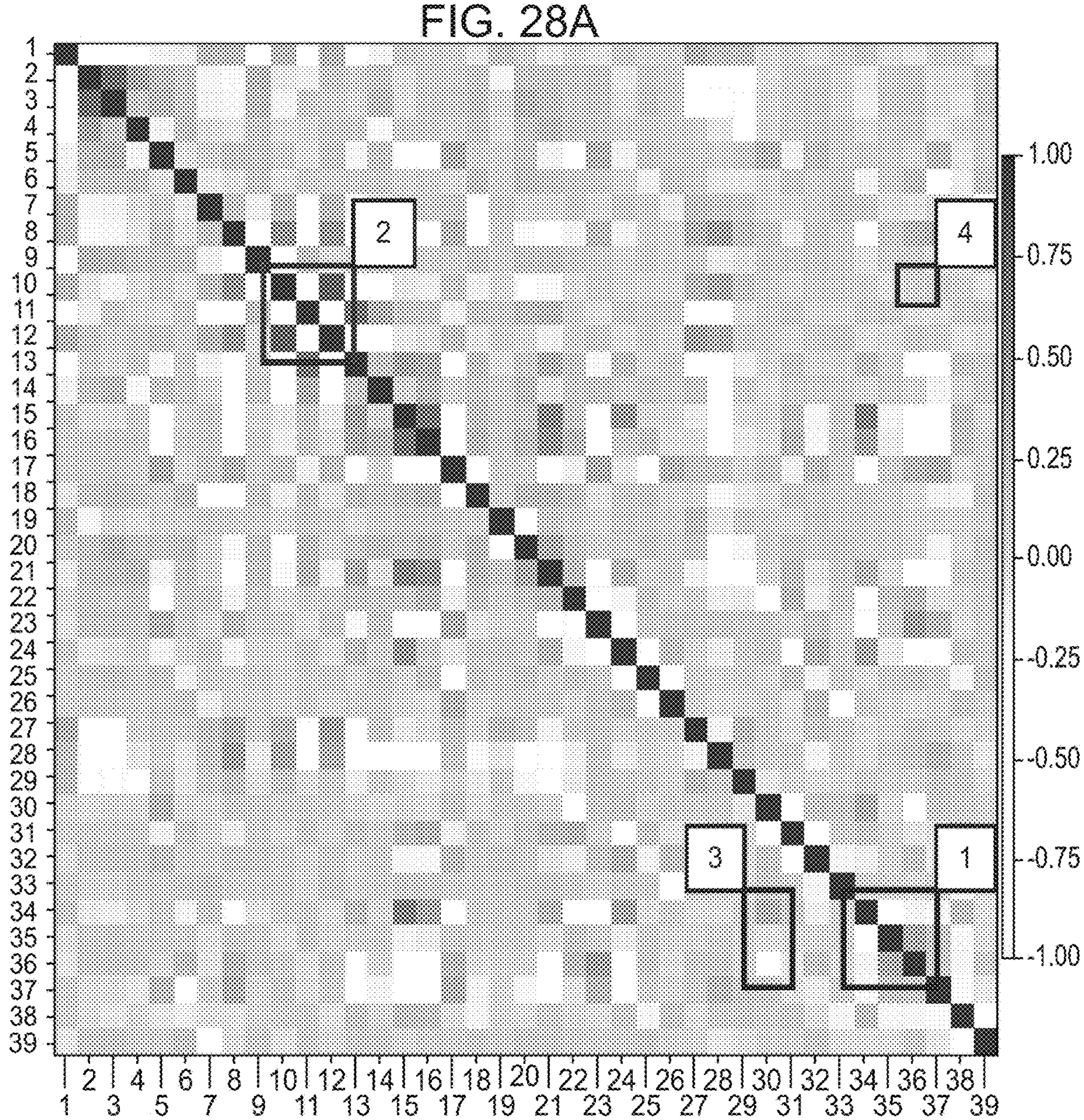
FIG. 28A-28F present supporting data for the spread correlation matrix.
Figure 28B:
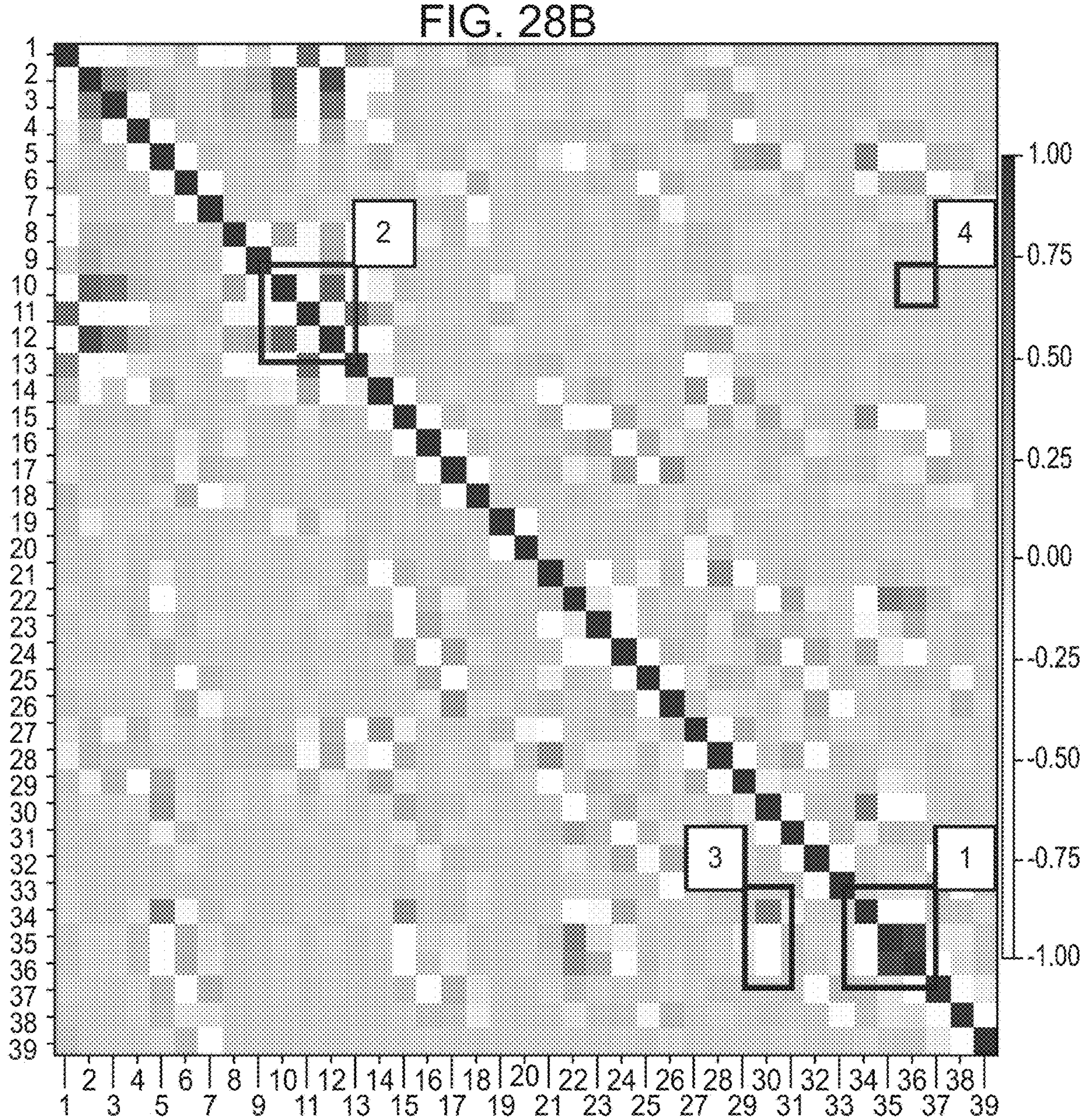
Figure 28C:
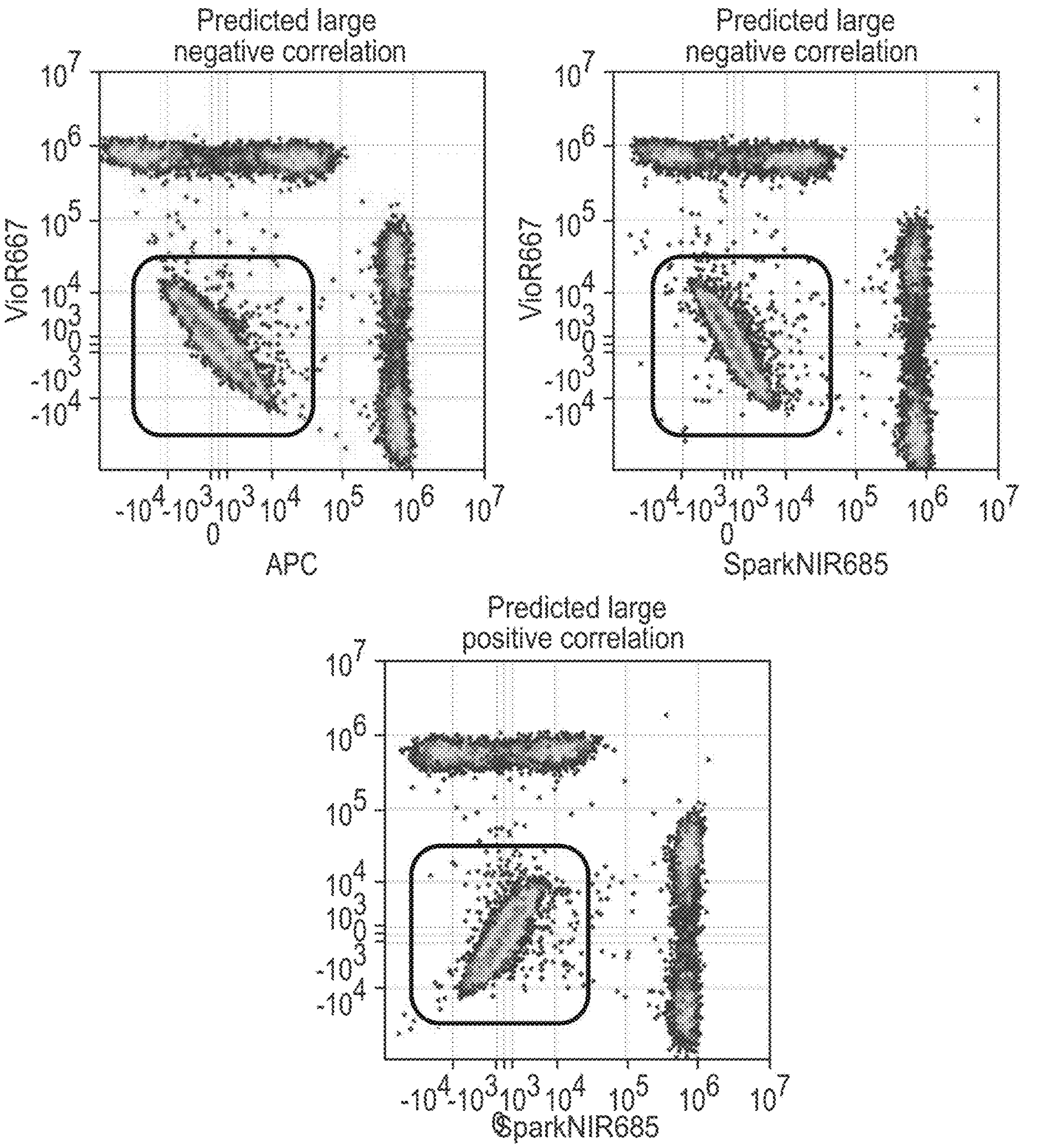
Figure 28D:
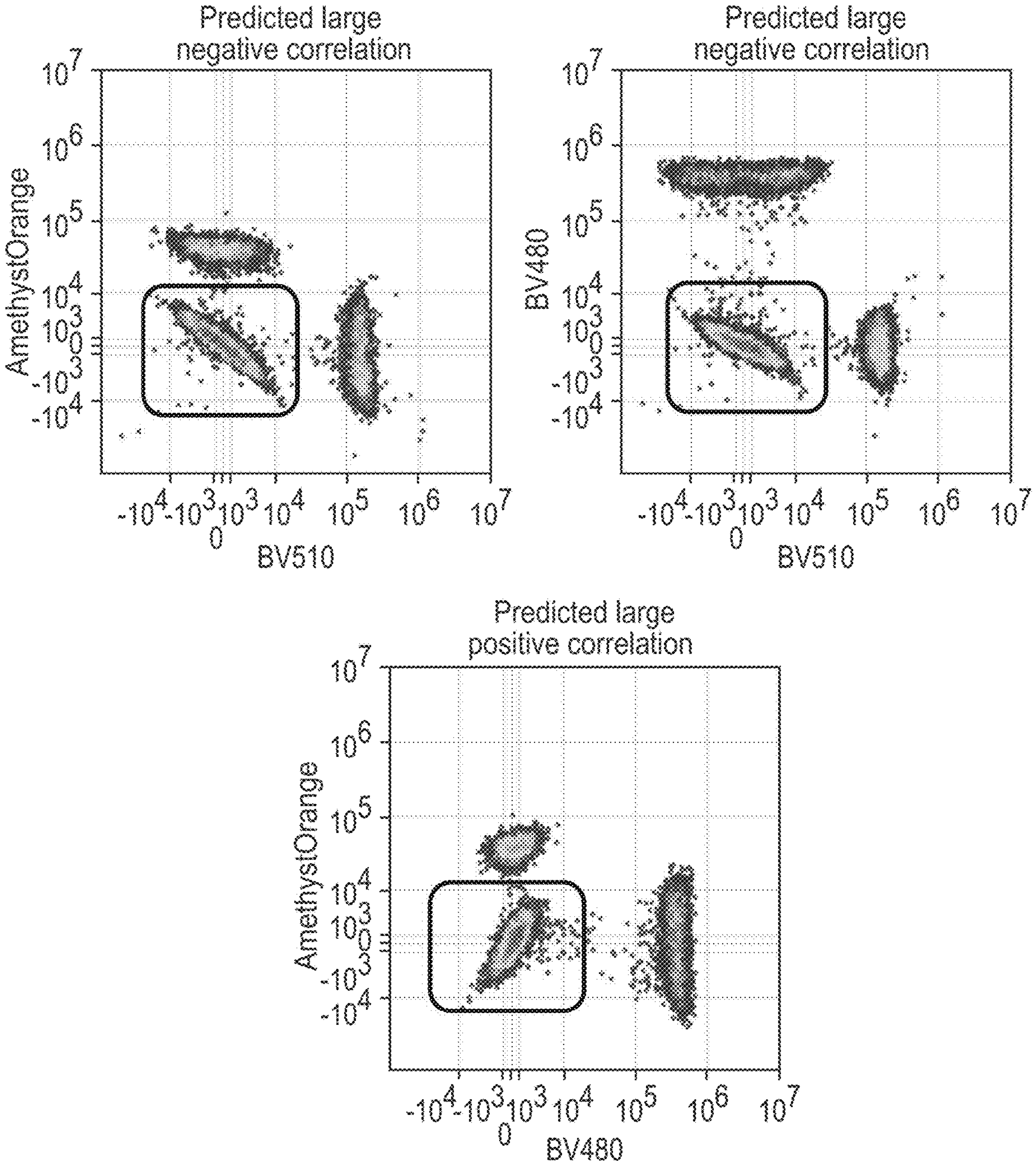
Figure 28E:
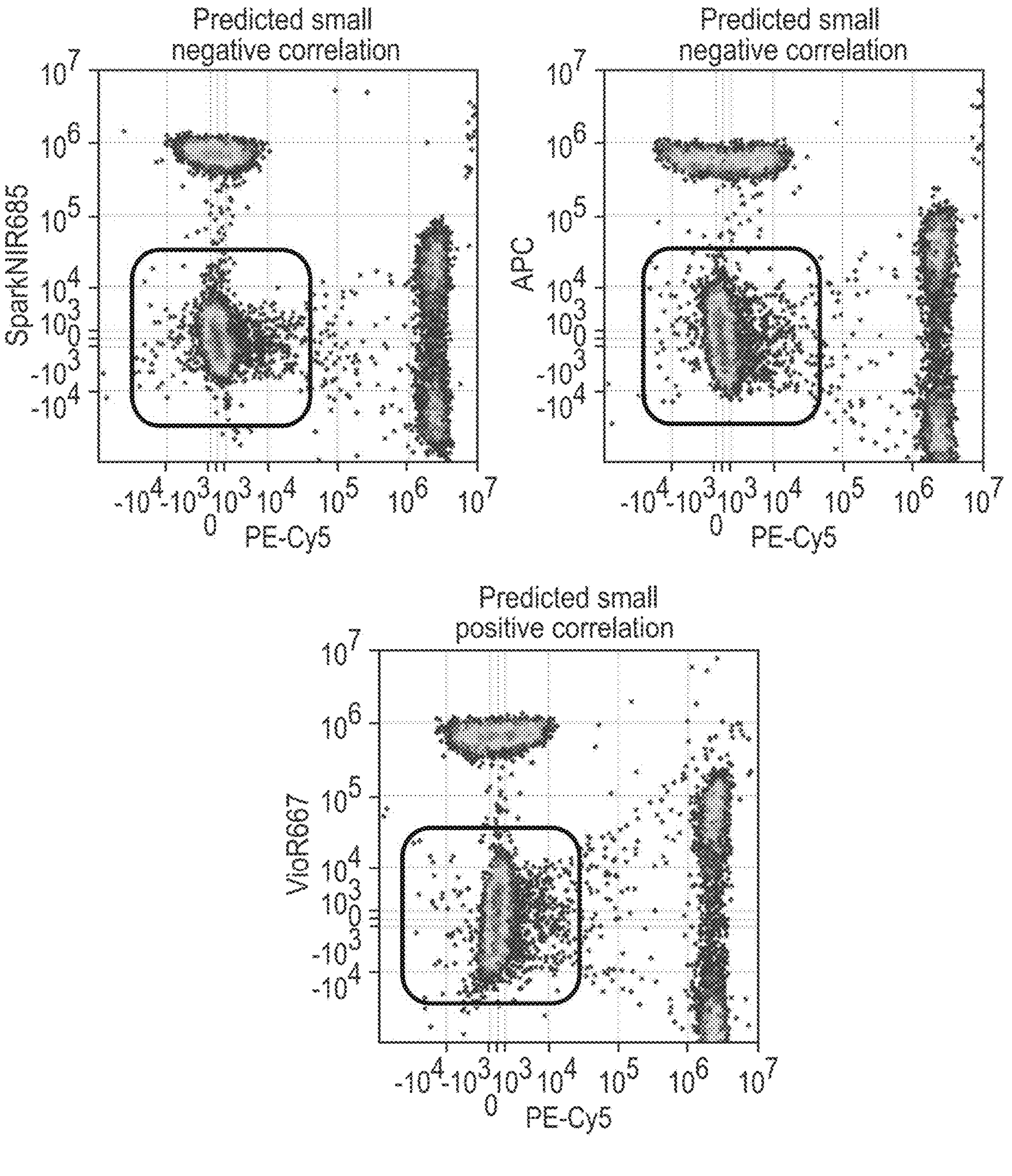
Figure 28F:
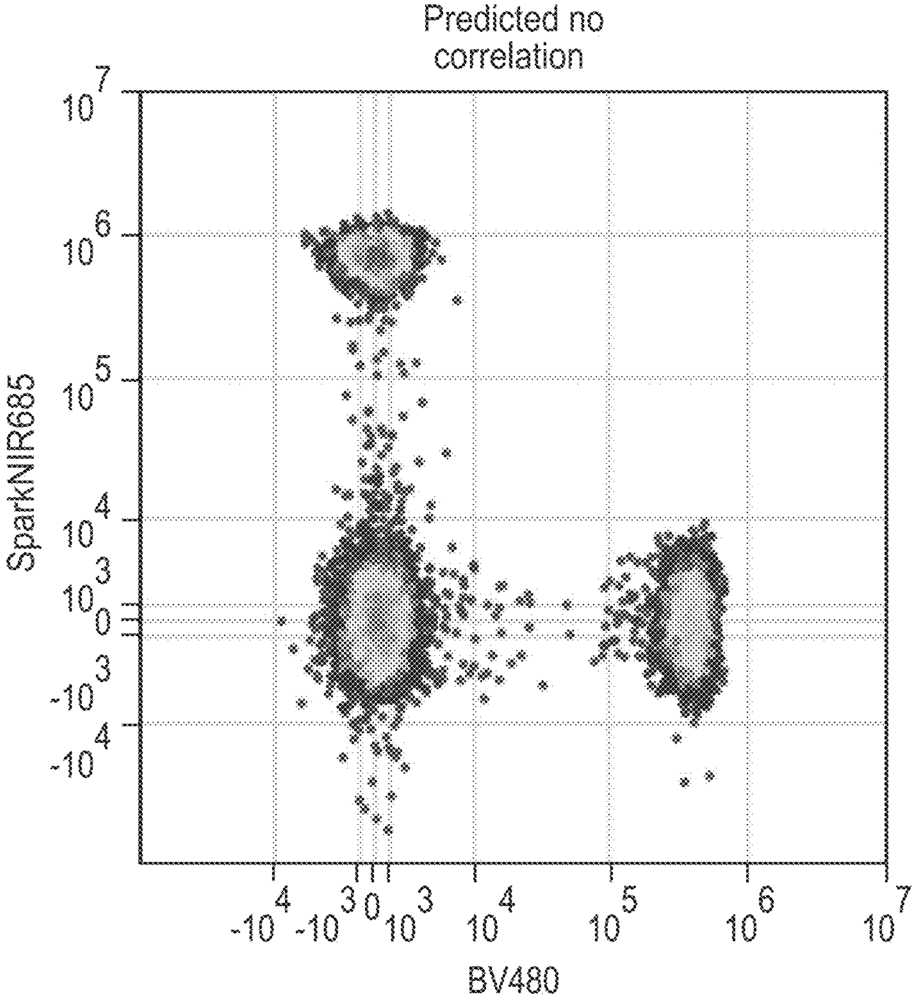

The fluorochromes in Panel A were used to generate flow cytometer data. The resulting data was used to populate a spread correlation matrix shown in FIG. 28A. Cells in the matrix are color coded such that the color of the cell is associated with the extent to which the double negative population is tilted, i.e., having a positive or negative correlation. This matrix was compared to a spread correlation matrix produced as described above with respect to FIG. 7A-7B. The resulting matrix predicts correlations derived from the gramian inverse and is shown in FIG. 28B. Regions of interest 1-4 are identified in FIG. 28A and FIG. 28B. Flow cytometer data pertaining to the fluorochrome pairs identified in regions of interest 1-4 are shown in FIG. 28C-28F, respectively. As demonstrated in FIG. 28C-28F, the spread correlation matrix (FIG. 28B) accurately predicts the measured correlation data (FIG. 28A).

TABLE 1

| | Reference Panels | | | |
|---|---|---|---|---|
| | 39A | 39A-1 | 39A-2 | 39B |
| 1 | BUV395 | BUV395 | BUV395 | BUV395 |
| 2 | BUV496 | BUV496 | BUV496 | BUV496 |
| 3 | Autofluorescence | Autofluorescence | Autofluorescence | Autofluorescence |
| 4 | BUV563 | BUV563 | BUV563 | BUV563 |
| 5 | BUV615 | BUV615 | BUV615 | BUV615 |
| 6 | BUV661 | BUV661 | BUV661 | BUV661 |
| 7 | BUV737 | BUV737 | QDot705 | BUV737 |
| 8 | BUV805 | QDot800 | BUV737 | BUV805 |
| 9 | BV421 | BUV805 | QDot800 | BV421 |
| 10 | VioBlue | BV421 | BUV805 | VioBlue |
| 11 | BV480 | VioBlue | BV421 | BV480 |
| 12 | BV510 | BV480 | VioBlue | BV510 |
| 13 | AmethystOrange | BV510 | BV480 | AmethystOrange |
| 14 | BV570 | AmethystOrange | AmethystOrange | BV570 |
| 15 | BV605 | BV570 | BV570 | BV605 |
| 16 | BV650 | BV605 | BV605 | BV650 |
| 17 | BV711 | BV650 | BV650 | BV711 |
| 18 | BV750 | BV711 | BV711 | BV750 |
| 19 | BV786 | BV750 | BV750 | BV786 |
| 20 | BB515 | BV786 | BV786 | BB515 |
| 21 | cFluorB532 | BB515 | BB515 | cFluorB532 |
| 22 | BB630 | cFluorB532 | cFluorB532 | BB630 |
| 23 | PerCP | BB630 | BB630 | PerCP |
| 24 | BB660 | PerCP | PerCP | BB660 |
| 25 | BB700 | BB660 | BB660 | PerCP-Cy5.5 |
| 26 | BB755 | BB700 | BB700 | BB700 |
| 27 | RB780 | BB755 | BB755 | BB755 |
| 28 | PE | RB780 | RB780 | RB780 |
| 29 | RY586 | PE | PE | PE |
| 30 | PE-CF594 | RY586 | RY586 | RY586 |
| 31 | PE-Cy5 | PE-CF594 | PE-CF594 | PE-CF594 |
| 32 | PE-Fire700 | PE-Cy5 | PE-Cy5 | PE-Cy5 |
| 33 | NovaFluorY730 | PE-Fire700 | PE-Fire700 | PE-Fire700 |
| 34 | PE-Cy7 | NovaFluorY730 | NovaFluorY730 | NovaFluorY730 |
| 35 | VioR667 | PE-Cy7 | PE-Cy7 | PE-Cy7 |
| 36 | APC | APC | APC | APC |
| 37 | SparkNIR685 | SparkNIR685 | SparkNIR685 | SparkNIR685 |
| 38 | R718 | R718 | R718 | R718 |
| 39 | APC-Cy7 | APC-Cy7 | APC-Cy7 | APC-Cy7 |
| 40 | APC-Fire810 | APC-Fire810 | APC-Fire810 | APC-Fire810 |

Although the foregoing invention has been described in some detail by way of illustration and example for purposes of clarity of understanding, it is readily apparent to those of ordinary skill in the art in light of the teachings of this invention that some changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method of assessing the suitability of a fluorochrome panel for use in generating flow cytometer data, the method comprising:

obtaining:

a fluorochrome panel;

an instrument identifier; and a spectral matrix associated with the fluorochrome panel and the instrument identifier;

calculating an inverse matrix from the obtained spectral matrix; and identifying fluorochromes in the fluorochrome panel that would be associated with variance in flow cytometer data generated using the fluorochrome panel by analyzing the calculated inverse matrix to assess a suitability of the fluorochrome panel for use in generating the flow cytometer data.

2. The method according to claim 1, wherein the fluorochromes in the fluorochrome panel that would be associated with variance in the flow cytometer data would contribute to variance in the flow cytometer data.

3. The method according to claim 1, wherein the fluorochromes in the fluorochrome panel that would be associated with variance in the flow cytometer data would be affected by variance in the flow cytometer data.

4. The method according to claim 1, wherein the inverse matrix is a pseudoinverse matrix.

5. The method according to claim 4, wherein the pseudoinverse matrix is a Moore-Penrose pseudoinverse matrix.

6. The method according to claim 1, wherein the inverse matrix is a gramian inverse matrix.

7. The method according to claim 6, wherein the inverse matrix is calculated according to the following equation:

$$G=(M^T M)^{-1}$$

wherein:

G is the gramian inverse matrix;

M is the spectral matrix; and $M^T$ is the transpose of the spectral matrix.

8. The method according to claim 1, wherein analyzing the calculated inverse matrix comprises deriving a quantitative metric from the inverse matrix.

9. The method according to claim 8, wherein the quantitative metric is a matrix norm.

10. The method according to claim 8, wherein the quantitative metric is a vector norm.

11. The method according to claim 1, further comprising optimizing the fluorochrome panel based on the assessment of the suitability of the fluorochrome panel for use in generating the flow cytometer data.

12. The method according to claim 11, wherein optimizing the fluorochrome panel comprises using a panel optimization algorithm.

13. The method according to claim 11, wherein optimizing the fluorochrome panel comprises adjusting the fluorochromes in the fluorochrome panel and assessing a suitability of the adjusted fluorochrome panel for use in generating flow cytometer data.

14. The method according to claim 13, wherein optimizing the fluorochrome panel comprises iteratively adjusting the fluorochrome panel and assessing a suitability of each iteratively adjusted fluorochrome panel.

15. The method according to claim 1, wherein the flow cytometer data comprises a number of dimensions that is equal to the number of fluorochromes in the plurality of fluorochromes.

16. The method according to claim 15, wherein the flow cytometer data is spectrally unmixed flow cytometer data.

17. The method according to claim 15, wherein the flow cytometer data is compensated flow cytometer data.

18. The method according to claim 1, wherein the variance comprises noise in the flow cytometer data.

19. The method according to claim 1, further comprising producing a visualization of the assessed suitability of the fluorochrome panel for use in generating the flow cytometer data.

20. The method according to claim 19, wherein the visualization highlights fluorochromes in the fluorochrome panel that would be associated with variance in the flow cytometer data generated using the fluorochrome panel.

21. The method according to claim 7, further comprising generating a panel hotspot matrix configured to describe an impact of spread on the fluorochromes in the fluorochrome panel.

22. The method according to claim 21, wherein generating the panel hotspot matrix comprises obtaining a square root of the absolute value of the inverse matrix.

23. The method according to claim 22, wherein the method comprises generating the panel hotspot matrix, as follows:

$$P=\sqrt{\text{abs}\left((M^T M)^{-1}\right)}$$

$$P_{jk}=\sqrt{\text{abs}\left(\sum_{i}^{n_d}(M_{ji}^{\dagger})(M_{ki}^{\dagger})\right)}$$

$$=\sqrt{\text{abs}\left(M_j^{\dagger}\cdot M_k^{\dagger}\right)}$$

wherein:

P is the panel hotspot matrix;

M is the spectral matrix;

$M^T$ is the transpose of the spectral matrix;

$M^{\dagger}$ is the Moore-Penrose pseudoinverse of the spectral matrix;

j and k represent different fluorochromes in the fluorochrome panel; and i represents a detector.

* * * * *